(12) United States Patent
Horio et al.

(10) Patent No.: US 9,284,426 B2
(45) Date of Patent: Mar. 15, 2016

(54) HARD COAT FILM AND CURABLE RESIN COMPOSITION FOR HARD COAT LAYER

(75) Inventors: Tomoyuki Horio, Tokyo-to (JP); Takashi Kuroda, Tokyo-to (JP); Emi Shimano, Tokyo-to (JP); Kana Yamamoto, Tokyo-to (JP); Yoshiko Kiyohara, Tokyo-to (JP); Keiko Tasaki, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 394 days.

(21) Appl. No.: 12/580,406

(22) Filed: Oct. 16, 2009

(65) Prior Publication Data
US 2010/0104858 A1    Apr. 29, 2010

(30) Foreign Application Priority Data

| Oct. 23, 2008 | (JP) | 2008-273514 |
| Oct. 23, 2008 | (JP) | 2008-273540 |
| Nov. 17, 2008 | (JP) | 2008-293541 |

(51) Int. Cl.
- *B32B 5/16* (2006.01)
- *C08K 3/34* (2006.01)
- *C08J 7/04* (2006.01)

(52) U.S. Cl.
CPC .............. *C08J 7/047* (2013.01); *C08J 2301/12* (2013.01); *C08J 2433/00* (2013.01); *Y10T 428/259* (2015.01)

(58) Field of Classification Search
USPC .................................. 428/331, 337
See application file for complete search history.

(56) References Cited

U.S. PATENT DOCUMENTS

| 2005/0261389 A1* | 11/2005 | Bratolavsky et al. | 522/71 |
| 2006/0093786 A1* | 5/2006 | Ohashi et al. | 428/131 |
| 2007/0047087 A1* | 3/2007 | Fukuda et al. | 359/582 |
| 2007/0172646 A1* | 7/2007 | Tanabe et al. | 428/328 |

FOREIGN PATENT DOCUMENTS

| JP | 2000-103987 A | 4/2000 |
| JP | 2002-107503 A | 4/2002 |
| JP | 2004-083846 A | 3/2004 |
| JP | 2005-181543 A | 7/2005 |
| JP | 2005-186435 A | 7/2005 |
| JP | 2008-163252 A | 7/2008 |
| JP | 2008-165040 A | 7/2008 |

OTHER PUBLICATIONS http://www.nissanchem-usa.com/snowtex.php.*
English Translation of Oba JP 11-092690, Apr. 1999.*

* cited by examiner

*Primary Examiner* — Ronak Patel
(74) *Attorney, Agent, or Firm* — Ladas & Parry LLP

(57) ABSTRACT

A curable resin composition for a hard coat layer capable of forming a hard coat layer having high hardness even with thin thickness and/or excellent in abrasion resistance and hardness, and a hard coat film using the curable resin composition.

1 Claim, 3 Drawing Sheets

HARD COAT FILM AND CURABLE RESIN COMPOSITION FOR HARD COAT LAYER

TECHNICAL FIELD

The present invention relates to a hard coat film in which a hard coat layer is provided on a transparent substrate film, and which is used for protecting the surface of a display, and a curable resin composition for forming the hard coat layer.

BACKGROUND ART

It has been required that the image display surface of an image display device such as a liquid crystal display, a CRT display, a projection display, a plasma display or an electroluminescence display is imparted with abrasion resistance to avoid being scratched upon handling. To meet the request, in general, a hard coat film (an optical laminate), which comprises a hard coat (HC) layer provided on a substrate film or further imparted with optical functions such as anti-reflection properties and anti-glare properties, is used to increase the abrasion resistance of the image display surface of an image display device.

A hard coat layer is generally formed on a substrate film using a photopolymerizable resin such as heat-curable resin or an ultraviolet ray-curable resin. The thickness is adjusted according to the performance required for a hard coat film, preferably from 3 to 25 μm. However, a thin film having a layer thickness of about 3 to 25 μm cannot exhibit sufficient mechanical strength (pencil hardness) as affected by modification of a base substrate.

As a method of improving the hardness of a hard coat layer, there is a method of merely increasing the thickness of a hard coat layer. The hardness can be improved by increasing thickness, however, there are problems that cracking easily occurs in a hard coat layer, and curling occurs in a whole laminate due to curing shrinkage of components in the hard coat layer causing significant deterioration of workability upon applying the laminate on a display.

Also, as a method of improving the hardness of a hard coat layer, there is a method of adding inorganic fine particles. Generally, a hard coat film provided with a hard coat layer having inorganic fine particles added on a substrate film is produced (Patent Literatures 1 and 2).

However, in recent years, a hard coat film further excellent in abrasion resistance or hardness is required. It has been difficult for a hard coat film having a thickness of a hard coat layer capable of satisfying the required performance of a hard coat film to attain the mechanical strength by pencil hardness of 4 H or more even if inorganic fine particles are added in the hard coat layer.

CITATION LIST

[Patent Literature 1] Japanese Patent Application Laid-Open (JP-A) No. 2002-107503
[Patent Literature 2] JP-A No. 2008-165040

SUMMARY OF INVENTION

Technical Problem

The present invention has been achieved in light of the above-stated problems, and an object of the present invention is to solve one or both of the following objects.

<First Object>
The object of the present invention is to provide a curable resin composition for a hard coat layer capable of forming a hard coat layer having high hardness even in thin thickness, and a hard coat film using the curable resin composition.

<Second Object>
The object of the present invention is to provide a curable resin composition for a hard coat layer capable of forming a hard coat layer having excellent abrasion resistance and hardness, and a hard coat film using the curable resin composition.

Solution to Problem

As a result of diligent researches made to attain the above objects, the inventors of the present invention found out that the above objects can be solved by containing irregularly shaped silica fine particles having a specific structure in a hard coat layer. Based on the above knowledge, the inventor has reached the present invention.

The present invention is to provide the following hard coat film.

A hard coat film in which a hard coat layer is provided on one side of a transparent substrate film,
wherein the hard coat layer comprises a matrix in a crosslinked state and an aggregate in which 3 to 100 silica fine particles having an average primary particle diameter of 1 to 100 nm are aggregated, and
wherein the aggregate is cross-linked to the matrix, and an irregularly shaped silica fine particle constituted with 3 to 20 silica fine particles having an average primary particle diameter of 1 to 100 nm connected to each other by inorganic chemical bonding is contained as a part of the aggregates.

Also, the present invention provides the following hard coat film.

A hard coat film in which a hard coat layer is provided on one side of a transparent substrate film,
wherein the hard coat layer is a cured product of a curable resin composition for the hard coat layer comprising a reactive irregularly shaped silica fine particle (A) constituted with 3 to 20 silica fine particles having an average primary particle diameter of 1 to 100 nm connected to each other by inorganic chemical bonding and having a reactive functional group (a) on its surface, and a curable binder system containing a binder component (C) having a reactive functional group (c) cross-linkingly reactive with the reactive functional group (a), and has curing reactivity in the system.

According to the above aspects of the present invention, since the irregularly shaped silica fine particle constituted with 3 to 20 silica fine particles having an average primary particle diameter of 1 to 100 nm connected to each other by inorganic chemical bonding in the hard coat layer is present in the cross-linked state to the matrix, a high-hardness hard coat film even the hard coat layer is in thin thickness can be provided.

Also, the present invention provides the following hard coat film.

A hard coat film in which a hard coat layer is provided on one side of a transparent substrate film,
wherein the hard coat layer is a cured product of a curable resin composition for the hard coat layer comprising a reactive irregularly shaped silica fine particle (A) constituted with 3 to 20 silica fine particles having an average primary particle diameter of 1 to 100 nm connected to each other by inorganic chemical bonding and having a reactive functional group (a) on its surface, a reactive silica fine particle (B) having an average primary particle diameter of 1 to 100 nm and having a reactive functional group (b) on its particle surface, and a binder component (C) having a reactive functional group (c), and each of the reactive functional groups (a), (b) and "c" has cross-linking reactivity with a reactive functional group of the same or different kind, wherein a irregularly shaped silica fine particle, which is at least a part of the reactive irregularly shaped silica fine particles (A) cross-linked to the binder component (C), is contained in the hard coat layer, and wherein the irregularly shaped silica fine particle, which is cross-linked, is projected from an interface on a side opposite to a transparent substrate side of the hard coat layer by less than 50 nm from a lowest surface of the interface or is not projected from the interface.

According to the above aspect of the present invention, since the hard coat layer contains the irregularly shaped silica fine particle crosslinked to the matrix and the silica fine particle crosslinked to the matrix, a high-hardness hard coat film having excellent abrasion resistance and hardness as well as ensuing transparency can be provided.

Also, the present invention provides the following hard coat film.

A hard coat film in which a hard coat layer is provided on one side of a transparent substrate film, wherein the hard coat layer comprises a matrix in a crosslinked state and an aggregate in which 3 to 100 silica fine particles having an average primary particle diameter of 1 to 100 nm are aggregated and which is crosslinked to the matrix, wherein an irregularly shaped silica fine particle constituted with 3 to 20 silica fine particles having an average primary particle diameter of 1 to 100 nm connected to each other by inorganic chemical bonding is contained as a part of the aggregates, and a silica fine particle having an average primary particle diameter of 1 to 100 nm cross-linked to the matrix is further contained, and wherein a total content of the irregularly shaped silica fine particle and the silica fine particles is from 20 to 70 wt % with respect to the total weight of the hard coat layer, and the content of the irregularly shaped silica fine particle is 50 wt % or more with respect to a total weight of the irregularly shaped silica fine particle and the silica fine particles.

According to the above aspect of the present invention, a high-hardness hard coat film particularly excellent in hardness even in thin thickness as well as excellent in transparency and abrasion resistance of the hard coat surface can be provided.

In the hard coat film of the present invention, it is preferable that the curable resin composition for a hard coat layer further contains the reactive silica fine particle (B) having an average primary particle diameter of 1 to 100 nm and having the reactive functional group (b) on its particle surface, the total content of the reactive irregularly shaped silica fine particle (A) and the reactive silica fine particle (B) is from 20 to 70 wt % with respect to the total solid content of the curable resin composition for the hard coat layer, and the content of the reactive irregularly shaped silica fine particle (A) is 50 wt % or more with respect to the total weight of the reactive irregularly shaped silica fine particle (A) and the reactive silica fine particle (B) from the viewpoint of increasing hardness of a cured layer (hard coat layer).

Also, the present invention provides the following curable resin composition for a hard coat layer.

A curable resin composition for a hard coat layer comprising a reactive irregularly shaped silica fine particle (A) which is a irregularly shaped silica fine particle constituted with 3 to 20 silica fine particles having an average primary particle diameter of 1 to 100 nm connected to each other by inorganic chemical bonding and having a reactive functional group (a) on its surface, and a curable binder system containing a binder component (C) having a reactive functional group (c) crosslinkingly reactive with the reactive functional group (a), and has curing reactivity in the system.

It is preferable that the curable resin composition further comprises a reactive silica fine particle (B).

According to the present invention, since the curable resin composition for a hard coat layer contains the reactive irregularly shaped silica fine particle (A) having the above specified structure, a high-hardness hard coat film can be obtained even if the thickness of a cured layer (hard coat layer) is thin.

BRIEF DESCRIPTION OF DRAWINGS

In the accompanying drawings.

REFERENCE SIGNS LIST

The sign in each figure refers to the following: 10: transparent substrate film; 20: hard coat layer; 21: interface on the side opposite to the transparent substrate film side of a hard coat layer; 30: cross-linked silica fine particle; and 40: cross-linked irregularly shaped silica fine particle.

DESCRIPTION OF EMBODIMENTS

Hereinafter, the present invention will be explained in detail.

In the present invention, "(meth)acrylate" means acrylate and/or methacrylate.

In the present invention, the "hard coat layer" generally means a layer which can obtain a hardness of "H" or more in the pencil hardness test defined in JIS K5600-5-4 (1999) with a load of 500 g or 4.9 N (conversion of 500 g to its equivalent in Newton unit).

Also, "light" in the present invention includes not only electromagnetic waves having a wavelength in the visible or nonvisible region but also particle beams (e.g. electron beams) and radiation (a general term for electromagnetic waves and particle beams) or ionizing radiation.

In the present invention, "layer thickness" means the thickness of a dried layer (the dried layer thickness).

In the present invention, "molecular weight" means a polystyrene-equivalent weight average molecular weight measured by gel permeation chromatography (GPC) in the case where a compound has a molecular weight distribution. In the case where a compound has no molecular weight distribution, "molecular weight" means the molecular weight of the compound itself.

In the present invention, the average particle diameter of fine particles means the 50% particle diameter (d50 median diameter) of the particles, which is obtained by measuring the particles in a solution by dynamic light scattering and expressing the thus-obtained particle size distribution by a cumulative distribution. The average particle diameter may be measured by means of Microtrac particle size analyzer or Nanotrac particle size analyzer manufactured by Nikkiso Co., Ltd.

Figure 1:
FIG. 1 is a sectional view schematically showing an example of a layer structure of a hard coat film of the present invention.

FIG. 1 is a sectional view schematically showing an example of a layer structure of a hard coat film of the present invention. In the sectional view of FIG. 2, the scale size of the thickness direction (vertical direction in the figure) is largely exaggerated (enlarged) than the scale size of the planar direction (horizontal direction in the figure) for simplification of explanation.

In the hard coat film 1, the hard coat layer 20 is provided on one side of the transparent substrate film 10.

<Hard Coat Film>

(1) First Hard Coat Film

A first hard coat film provided by the present invention is a hard coat film in which a hard coat layer is provided on one side of a transparent substrate film, wherein the hard coat layer comprises a matrix in a crosslinked state and an aggregate in which 3 to 100 silica fine particles having an average primary particle diameter of 1 to 100 nm are aggregated, and wherein the aggregate is cross-linked to the matrix, and an irregularly shaped silica fine particle constituted with 3 to 20 silica fine particles having an average primary particle diameter of 1 to 100 nm connected to each other by inorganic chemical bonding is contained as a part of the aggregates.

Figure 2:
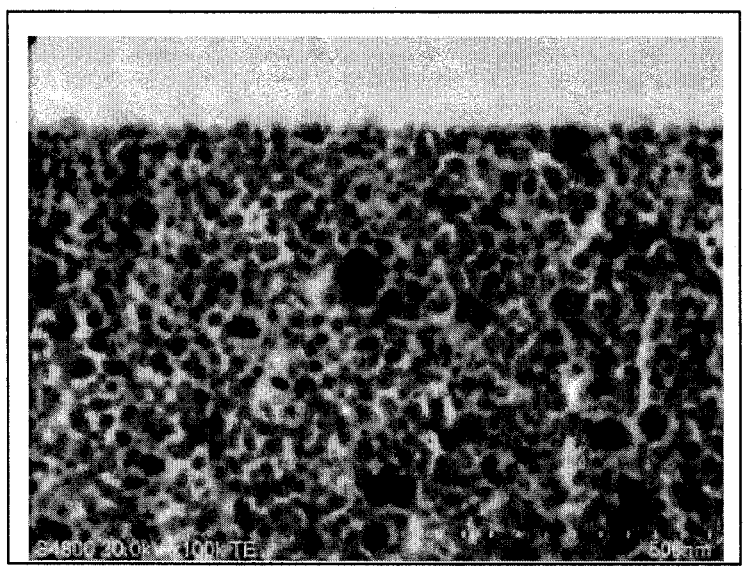
FIG. 2 is a sectional view of an embodiment of a first hard coat film of the present invention.

FIG. 2 is a SEM photography of a cross section of a first hard coat film taken by means of a scanning electron microscope (SEM).

An irregularly shaped silica fine particle constituted with 3 to 20 silica fine particles having an average primary particle diameter of 1 to 100 nm connected to each other by inorganic chemical bonding is contained as a part of the aggregates contained in the hard coat layer. Particularly, from the viewpoint of increasing hardness of a cured layer, it is preferable that a chain particle constituted with 3 to 20 silica fine particles connected in a chain form by inorganic chemical bonding is contained as at least a part of the irregularly shaped silica fine particles.

Also, the above aggregates may include an aggregate in which the reactive functional groups introduced on the surface of the irregularly shaped silica fine particle are crosslinked to each other, an aggregate in which the reactive functional groups introduced on the surface of the silica fine particle are crosslinked to each other, and an aggregate in which the reactive functional group introduced on the surface of the irregularly shaped silica fine particle and the reactive functional group introduced on the surface of the silica fine particle are crosslinked to each other. In the present invention, the hard coat layer contains such aggregates, at least a part of which is an aggregate of irregularly shaped silica fine particles.

The reactive functional group introduced on the surface of the silica fine particle may be the same kind as the reactive functional group introduced on the surface of the irregularly shaped silica fine particle.

The aggregate is constituted with aggregated 3 to 100 silica fine particles, preferably 3 to 30 silica fine particles, more preferably 3 to 10 silica fine particles. Herein, "aggregation" means bonding of the silica fine particles to each other by inorganic chemical bonding, crosslinking of the reactive functional groups introduce on the surface of the irregularly shaped silica fine particle to each other, and crosslinking of the reactive functional groups introduced on the surface of the silica fine particle to each other.

If more than 100 silica fine particles aggregate, the transparency of the hard coat layer decreases, which may cause decrease of transmittance and increase of haze.

If the aggregate crosslinked to the matrix in the hard coat layer is the aggregate in which the reactive functional groups introduced on the surface of the silica fine particle are crosslinked to each other alone, it is difficult to attain the hardness of the hard coat layer of 5 H or more when a pencil hardness test in accordance with JIS K5600-5-4 (1999) is performed with a load of 500 g or 4.9 N.

To the contrary, if the irregularly shaped silica fine particle constituted with 3 to 20 silica fine particles having an average primary particle diameter of 1 to 100 nm connected to each other by inorganic chemical bonding, and crosslinked to the matrix in the hard coat layer, is contained in the hard coat layer, the hardness of the hard coat layer of 5 H or more when a pencil hardness test in accordance with JIS K5600-5-4 (1999) is performed with a load of 500 g or 4.9 N can be attained.

It is unknown why the hardness of the hard coat layer of 5 H or more when a pencil hardness test in accordance with JIS K5600-5-4 (1999) is performed with a load of 500 g or 4.9 N can be attained in the case that the irregularly shaped silica fine particle having the above-specified structure and crosslinked to the matrix in the hard coat layer is contained in the hard coat layer, however, it can be considered as below.

It is can be presumed that the inorganic chemical bonding of the irregularly shaped silica fine particles can impart excellent hardness to the hard coat layer since the inorganic chemical bonding has less flexibility and degree of freedom than bonding between reactive functional groups being organic components, and the silica fine particles are strongly bound to each other.

In the case that the reactive silica fine particle having the reactive functional group introduced on the surface of the silica fine particle is present in the film not alone but in a chained state in a line that the reactive functional groups of the reactive silica fine particle are crosslinked to each other and aggregated, such an aggregate of the reactive silica fine particles breaks when tension is applied to the film since there is no inorganic chemical bonding between silica fine particles. To the contrary, in the present invention, since the silica fine particles constituting the irregularly shaped silica fine particle are strongly connected to each other by inorganic chemical bonding, the bond does not break and functions to strengthen the network in the film even if tension is applied to the film.

Hence, according to the present invention, by containing the irregularly shaped silica fine particle in the hard coat layer, which is constituted with 3 to 20 silica fine particles having an average primary particle diameter of 1 to 100 nm connected to each other by inorganic chemical bonding, and crosslinked to the matrix in the hard coat layer, the hard coat film having high hardness even the hard coat layer is in thin layer can be provided.

In the hard coat film of the first invention, the layer thickness of the hard coat layer is preferably from 5 to 20 μm, more preferably from 5 to 15 μm. If the layer thickness is less than 5 μm, sufficient strength cannot be obtained. If the layer thickness exceeds 20 μm, cost may increase. In the case of using a film having a thin substrate such as triacetyl cellulose film having a thickness of 100 μm or less, as a substrate, curling and cracking are likely to occur if the layer thickness of the hard coat layer exceeds 20 μm. Also, if the layer thickness of the hard coat layer exceeds 20 μm, it is difficult for a solvent (such as an organic solvent or water) used in an adhesive for attaching the hard coat film of the present invention to a polarizer to be removed, so that drying efficiency may be significantly deteriorated. Also, if the solvent used in the adhesive remains, the polarization degree may change, so that performance of polarizer itself may decrease.

The content of the irregularly shaped silica fine particle is preferably from 20 to 70 wt %, more preferably from 40 to 65 wt %, with respect to the total weight of the hard coat layer. If the content is less than 20 wt %, hardness sufficient for a hard coat layer may not be able to be imparted. If the content exceeds 70 wt %, the filling rate may excessively increase and the adhesion between the irregularly shaped silica fine particle and the binder component may decrease, so that the hardness of the hard coat layer may even decrease.

When the layer thickness of the hard coat layer is from 5 to 10 μm, the content of the irregularly shaped silica fine particle is preferably from 35 to 65 wt %, more preferably from 40 to 65 wt %, with respect to the total weight of the hard coat layer. When the layer thickness of the hard coat layer is more than 10 μm and 20 μm or less, the content of the irregularly shaped silica fine particle is preferably from 20 to 70 wt %, more preferably from 40 to 65 wt %, with respect to the total weight of the hard coat layer.

A hard coat film having high hardness can be provided by setting the content of the irregularly shaped silica fine particle with respect to the total weight of the hard coat layer in the above range according to the layer thickness of the hard coat layer.

(2) Second Hard Coat Film

A second hard coat film provided by the present invention is a hard coat film in which a hard coat layer is provided on one side of a transparent substrate film, wherein the hard coat layer is a cured product of a curable resin composition for the hard coat layer comprising a reactive irregularly shaped silica fine particle (A) constituted with 3 to 20 silica fine particles having an average primary particle diameter of 1 to 100 nm connected to each other by inorganic chemical bonding and having a reactive functional group (a) on its surface, a reactive silica fine particle (B) having an average primary particle diameter of 1 to 100 nm and having a reactive functional group (b) on its particle surface, and a binder component (C) having a reactive functional group (c), and each of the reactive functional groups "a", "b" and "c" has cross-linking reactivity with a reactive functional group of the same or different kind, wherein a irregularly shaped silica fine particle, which is at least a part of the reactive irregularly shaped silica fine particles (A) cross-linked to the binder component (C), is contained in the hard coat layer, and wherein the irregularly shaped silica fine particle, which is cross-linked, is projected from an interface on a side opposite to a transparent substrate side of the hard coat layer by less than 50 nm from a lowest surface of the interface or is not projected from the interface.

Since the reactive irregularly shaped silica fine particle (A) is constituted with 3 to 20 silica fine particles having an average primary particle diameter of 1 to 100 nm connected to each other by inorganic chemical bonding and has the reactive functional group (a) on its surface, dispersibility is excellent, and excellent abrasion resistance and hardness can be imparted to the hard coat film when the hard coat layer is formed by curing the curable resin composition for the hard coat layer while ensuring transparency of the hard coat film. The reactive irregularly shaped silica fine particle (A) is superior in hardness to the reactive silica fine particle (B) crosslinked to the binder component by the reactive functional group (b).

On the other hand, the reactive silica fine particle (B) has the reactive functional group (b) on the surface of the silica fine particle having an average primary particle diameter of 1 to 100 nm and is crosslinked to the reactive functional group (c) of the binder component (C), and thereby, contributes to improvement of abrasion resistance and hardness of the hard coat film when the hard coat layer is formed by curing the curable resin composition for the hard coat layer.

The reactive irregularly shaped silica fine particle (A) is preferably constituted with spherical silica fine particles connected to each other by inorganic chemical bonding, and the reactive silica fine particle (B) is preferably a spherical reactive silica fine particle.

The second hard coat film is excellent in abrasion resistance and hardness since the irregularly shaped silica fine particle, which is at least a part of the irregularly shaped silica fine particles (A) cross-linked to the binder component (C), is contained in the hard coat layer, and the irregularly shaped silica fine particle, which is cross-linked, is projected from the interface on the side opposite to the transparent substrate side of the hard coat layer by less than 50 nm from the lowest surface of the interface or is not projected from the interface.

If the projection height of the irregularly shaped silica fine particle is 50 nm or more, the shape of the whole irregularly shaped silica fine particle is not spherical causing scratch in the pencil or steel wool test and the projection is removed, thus, the pencil hardness and the abrasion resistance may decrease.

In the hard coat layer, at least a part of the reactive irregularly shaped silica fine particles (A) and a part of the reactive silica fine particles (B) are cured by crosslinking of the reactive functional groups (a) and (b) to each other, or by crosslinking of the reactive functional groups (a) and (b) to the reactive functional group (c) of the binder component.

In the suitable embodiment of the second hard coat film, the hardness of the hard coat layer when a pencil hardness test in accordance with JIS K5600-5-4 (1999) is performed with a load of 500 g or 4.9 N can be 5 H or more.

Figure 3:
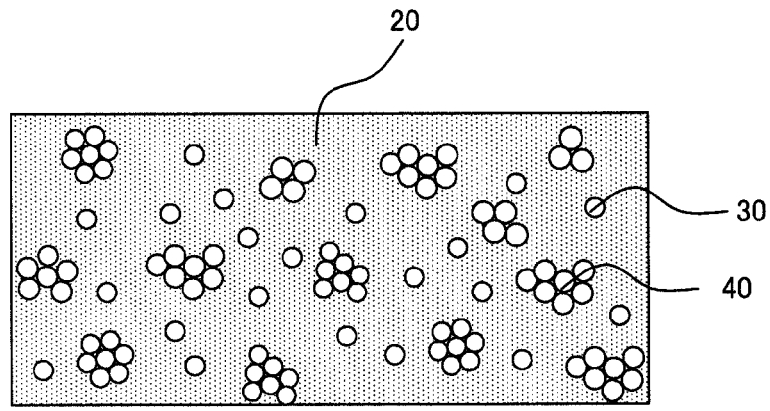
FIG. 3 is a view schematically showing an example of the distribution of the cross-linked silica fine particles and the cross-linked irregularly shaped silica fine particles of the hard coat layer of the second hard coat film of the present invention.

FIG. 3 is a view schematically showing an example of the distribution of the silica fine particles which are cross-linked and the irregularly shaped silica fine particles which are cross-linked of the hard coat layer of the second hard coat film.

In the hard coat layer 20, the silica fine particles 30, in which the reactive silica fine particles (B) are cross-linked, and the irregularly shaped silica fine particles 40, in which the reactive irregularly shaped silica fine particles (A) are cross-linked, are contained.

Figure 4:
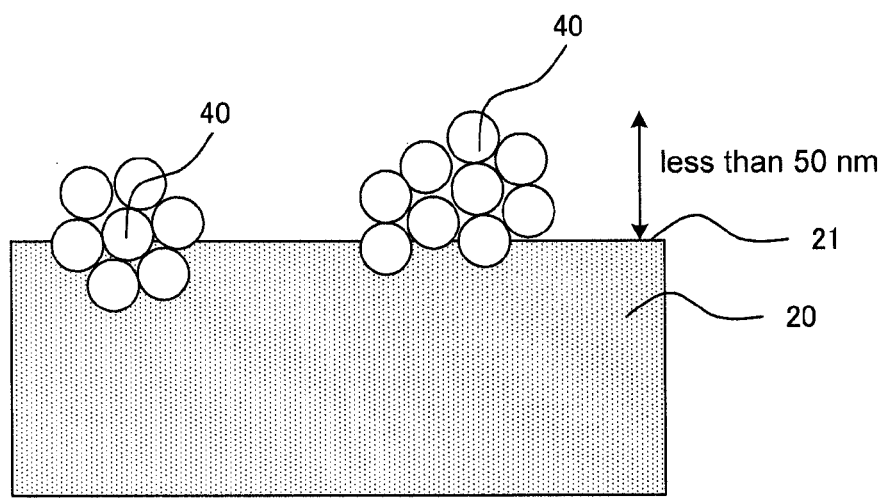
FIG. 4 is a sectional view schematically showing an example of a part of an interface on the side opposite to the transparent substrate film side of a hard coat layer of a second hard coat film of the present invention.

FIG. 4 is a sectional view schematically showing an example of a part of the interface on the side opposite to the transparent substrate film side of the hard coat layer of the second hard coat film.

The irregularly shaped silica fine particle 40, which is cross-linked, is projected from the interface 21 on the side opposite to the transparent substrate side of the hard coat layer 20 by less than 50 nm from the lowest surface of the interface.

Figure 5:
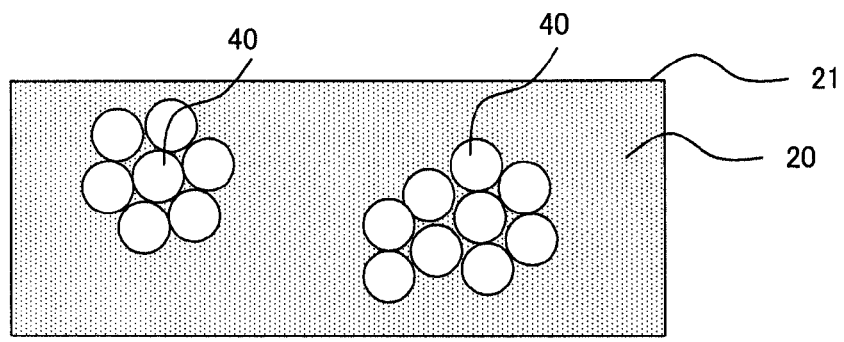
FIG. 5 is a sectional view schematically showing another example of a part of an interface on the side opposite to the transparent substrate film side of a hard coat layer of a second hard coat film of the present invention.
Figure 6:
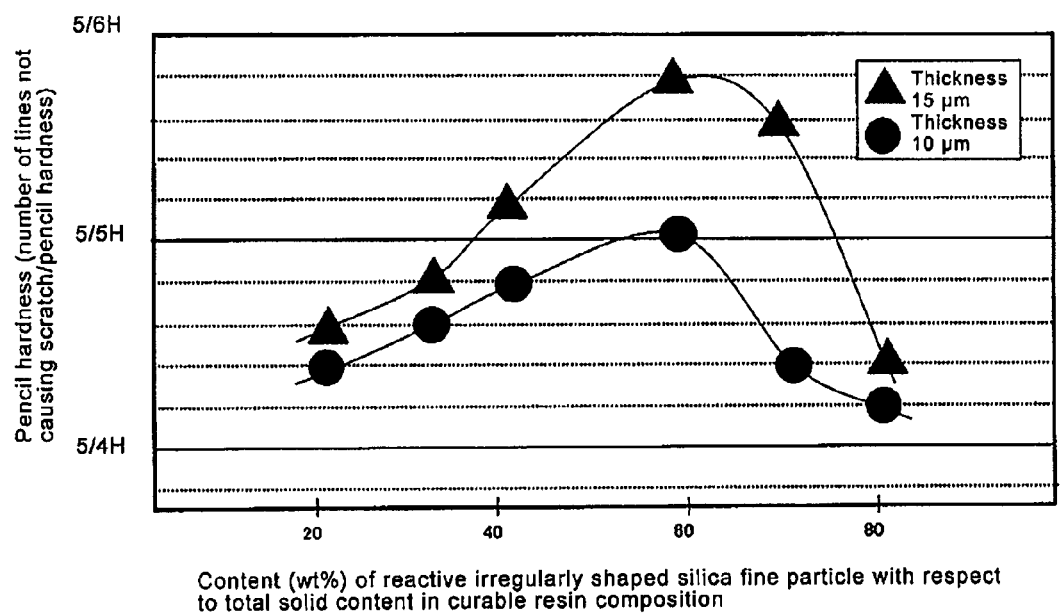
FIG. 6 is a graph showing the relationship between the content of the reactive irregularly shaped silica fine particle with respect to the total solid content in the curable resin composition and the pencil hardness of the obtained hard coat film when the layer thickness of the hard coat layer is 10 μm and 15 μm respectively in Table A4.

FIG. 5 is a sectional view schematically showing another example of a part of an interface on the side opposite to the transparent substrate film side of the hard coat layer of the second hard coat film.

In the hard coat layer 20, the cross-linked irregularly shaped silica fine particle 40 does not project from the interface on the side opposite to the transparent substrate film side of the hard coat layer.

(2) Third Hard Coat Film

The third hard coat film provided by the present invention is a hard coat film in which a hard coat layer is provided on one side of a transparent substrate film, wherein the hard coat layer comprises a matrix in a crosslinked state and an aggregate in which 3 to 100 silica fine particles having an average primary particle diameter of 1 to 100 nm are aggregated, wherein the aggregate is cross-linked to the matrix, and an irregularly shaped silica fine particle constituted with 3 to 20 silica fine particles having an average primary particle diameter of 1 to 100 nm connected to each other by inorganic chemical bonding is contained as a part of the aggregates, and a silica fine particle having an average primary particle diameter of 1 to 100 nm cross-linked to the matrix is further contained, and wherein a total content of the irregularly shaped silica fine particle and the silica fine particles is from 20 to 70 wt % with respect to the total weight of the hard coat layer, and the content of the irregularly shaped silica fine particle is 50 wt % or more with respect to a total weight of the irregularly shaped silica fine particle and the silica fine particles.

The first hard coat film has high hardness even in thin layer, and the second hard coat film is superior in abrasion resistance of the surface of the hard coat to the first hard coat film. The third hard coat film is particularly excellent in hardness and abrasion resistance.

<Layers Constituting Hard Coat Film of the Present Invention>

(1) Transparent Substrate Film

The transparent substrate film used for the present invention is not particularly limited, and can be accordingly selected and used as long as it is a plastic film or sheet having high transparency (light transmittability) and satisfies physicalities to be a transparent substrate of an optical laminate.

The substrate film generally used for an optical laminate may be transparent, semi-transparent, colorless or colored, but light transmittability is required. Light transmittance is measured by means of an ultraviolet-visible spectrophotometer (such as UV-3100PC manufactured by Shimadzu Corporation) and using values obtained at room temperature in the atmosphere.

In the present invention, the thickness of the transparent substrate film may be accordingly selected for use. From the viewpoint of preventing cracking on the surface of the hard coat film and imparting hardness, the thickness of the transparent substrate used is preferably from 20 to 120 μm, more preferably from 20 to 80 μm.

Examples of preferred material of the transparent substrate film include materials mainly comprising cellulose acylate, a cycloolefin polymer, polycarbonate, an acrylate-based polymer or polyester. The "mainly comprising" used herein means a component that has the highest content rate among the components of the substrate.

Specific examples of the cellulose acylate include cellulose triacetate, cellulose diacetate and cellulose acetate butyrate.

Examples of the cycloolefin polymer include norbornene polymers, monocyclic olefin polymers, cyclic conjugated diene polymers and vinyl alicyclic hydrocarbon polymer resins. More specifically, there may be ZEONEX and ZEONOR (product names; manufactured by ZEON CORPORATION; norbornene resins), SUMILITE FS 1700 (product name; manufactured by SUMITOMO BAKELITE CO., LTD.), ARTON (product name; manufactured by JSR Corporation; modified norbornene resin), APEL (product name; manufactured by MITSUI CHEMICALS, INC.; cycloolefin copolymer), Topas (product name; manufactured by Ticona; cycloolefin copolymer), and OZ 1000 Series of OPTOREZ (product name; manufactured by Hitachi Chemical Company, Ltd.; alicyclic acrylic resin).

Specific examples of the polycarbonate include aromatic polycarbonates based on bisphenols (such as bisphenol A) and aliphatic polycarbonates such as diethylene glycol bis (allyl carbonate).

Specific examples of the acrylate-based polymer include poly(methyl(meth)acrylate), poly(ethyl(meth)acrylate) and methyl(meth)acrylate-butyl(meth)acrylate copolymers.

Specific examples of the polyester include polyethylene terephthalate and polyethylene naphthalate.

A material which may be used as the transparent substrate film used in the present invention and which is most excellent in transparency is cellulose acylate. Particularly, triacetyl cellulose is preferably used.

Triacetyl cellulose (TAC) films are able to have an average light transmittance of 50% or more, preferably 70% or more, more preferably 85% or more, in the visible light region from 380 to 780 nm.

Because of having optical isotropy, TAC films may be suitably used also in liquid crystal display applications.

As the triacetyl cellulose used in the present invention, besides pure triacetyl cellulose, there may be used one also containing a component other than acetate as a fatty acid forming cellulose ester such as cellulose acetate propionate and cellulose acetate butyrate. As needed, the triacetyl cellulose may be mixed with other cellulose lower fatty acid ester such as diacetyl cellulose, or various kinds of additives such as a plasticizer, an anti-static agent and a UV absorbing agent.

Also in the present invention, a surface treatment (such as a saponification treatment, a glow discharge treatment, a corona discharge treatment, an ultraviolet (UV) treatment and a flame treatment) may be performed on the TAC film. A primer layer (adhesive layer) may be formed thereon. The transparent substrate film in the present invention may be subjected to a surface treatment or have a primer layer formed thereon.

(2) Hard Coat Layer and Curable Resin Composition for Hard Coat Layer

The hard coat layer is provided on one side of the transparent substrate using the curable resin composition containing the reactive irregularly shaped silica fine particle (A) and the binder component (C), and further containing the reactive silica fine particle (B) preferably, directly or via other layers. The hard coat layer may be provided on both sides of the transparent substrate.

The layer thickness of the hard coat layer may be adjusted accordingly to the performance required for the hard coat film, and is preferably from 3 to 25 μm, more preferably from 5 to 20 μm. If the layer thickness is 3 μm or more, sufficient strength can be easily obtained. If the layer thickness exceeds 25 μm, cost may increase. If triacetyl cellulose is used for the substrate and the layer thickness exceeds 25 μm, curling and cracking easily occurs. Also, for examples, if the layer thickness exceeds 25 μm, it is difficult for a solvent (such as an organic solvent or water) used in an adhesive for attaching the hard coat film of the present invention to a polarizer to be removed, so that drying efficiency may be significantly deteriorated. Also, if the solvent used in the adhesive remains, the polarization degree may change, so that performance of polarizer itself may decrease.

Particularly, the layer thickness of the first and third hard coat films is preferably from 5 to 20 μm from the viewpoint of obtaining high hardness even in thin thickness.

Hereinafter, the composition of the curable resin composition for forming the hard coat layer of the present invention will be explained.

(Reactive Irregularly Shaped Silica Fine Particle (A))

The reactive irregularly shaped silica fine particle (A) is constituted with the irregularly shaped silica fine particle constituted with 3 to 20 silica fine particles having an average primary particle diameter of 1 to 100 nm connected to each other by inorganic chemical bonding and a reactive functional group (a) introduced on the surface of the irregularly shaped silica fine particle. Since the reactive irregularly shaped silica fine particle (A) has the reactive functional group (a), the fine particles (A) to each other and the fine particle (A) and the binder component (B) therearound can be crosslinkingly cured, so that abrasion resistance and hardness can be imparted to the hard coat layer.

Since the reactive irregularly shaped silica fine particle (A) has larger surface area than that of a non-aggregated reactive silica fine particle having equivalent particle diameter as the reactive irregularly shaped silica fine particle (A), the adhesion with the binder component (C) is excellent, and the hardness of the hard coat layer is excellent.

In the case of a substrate having a low refractive index (e.g., a resin substrate comprising a resin such as triacetyl cellulose), because the refractive index of the silica fine particle of the reactive irregularly shaped silica fine particle (A) and the reactive silica fine particle (B) hereinafter described is about 1.46 and lower than the refractive index of the binder component (B) of about 1.50, lowering the refractive index of the hard coat layer creates an effect in which there is a decrease in the difference between the refractive index of the hard coat layer and that of the resin substrate, thereby preventing occurrence of fringes. Also, there is an effect that the adhesion with the substrate becomes excellent. Furthermore, when other layers such as an anti-reflection layer, anti-fouling layer, hard coat layer, anti-static layer and an anti-glare layer are laminated on the hard coat layer, the adhesion between layers becomes excellent.

The average primary particle diameter of the silica fine particle constituting the reactive irregularly shaped silica fine particle (A) is from 1 to 100 nm, preferably from 5 to 80 nm. If the average primary particle diameter of the silica fine particle is less than 1 nm, only reactive irregularly shaped silica fine particle (A) having an average secondary particle diameter of about 3 nm can be obtained, and sufficient hardness cannot be imparted to the hard coat layer. If the average primary particle diameter of the silica fine particle exceeds 100 nm, the average secondary particle diameter of the reactive irregularly shaped silica fine particle (A) easily exceeds 500 nm, and if the average secondary particle diameter exceeds 500 nm, the transparency of the hard coat layer decreases and the transmittance may be deteriorated and the haze may increase.

The average secondary particle diameter of the reactive irregularly shaped silica fine particle (A) of the present invention is preferably from 5 to 300 nm, more preferably from 10 to 200 nm, even more preferably from 50 to 200 nm. If the average secondary particle diameter of the reactive irregularly shaped silica fine particle (A) is within the above range, the hardness can be easily imparted to the hard coat layer, and the transparency of the hard coat layer can be maintained.

The average primary particle diameter of the silica fine particle means 50% average particle diameter (d50 median diameter) when the particles in a solution is measured by dynamic light scattering and the particle size distribution is presented by cumulative distribution. The average primary particle diameter can be measured by means of Microtrac particle size analyzer manufactured by Nikkiso Co., Ltd.

The average secondary particle diameter of the reactive irregularly shaped silica fine particle (A) can be obtained similarly as the method for the primary particle diameter. The cured reactive irregularly shaped silica fine particle (A) in the cross section of the hard coat layer can be observed using a SEM photograph or TEM photograph, and the secondary particle diameter of 100 observed irregularly shaped silica fine particles are measured, and the average value can be specified.

The silica fine particle is preferably spherical. Also, the use of a particle having voids or porous structure inside such as a hollow particle as the silica fine particle is not excluded, however, it is preferable to use a solid particle having no void or porous structure inside from the viewpoint of improving the hardness.

The irregularly shaped silica fine particle is constituted with 3 to 20 silica fine particles, preferably 3 to 10 silica fine particles, connected to each other by inorganic chemical bonding. If the number of the fine particles connected to each other by inorganic chemical bonding is less than 3, it is substantially the same as a monodisperse particle, and is difficult to obtain a hard coat layer excellent in adhesion with the substrate, abrasion resistance and pencil hardness. If the number of the fine particles connected to each other by inorganic chemical bonding exceeds 20, the transparency of the hard coat layer decreases, so that the transmittance may decrease and the haze may increase.

Examples of the inorganic chemical bonding include ionic bonding, metal bonding, coordination bonding and covalent bonding. Among the above, bonding which does not disperse the connected fine particles after the irregularly shaped silica fine particles are added to a polar solvent, specifically, any of metal bonding, coordination bonding and covalent bonding is preferable, more preferably the covalent bonding. Examples of the polar solvent include water, and lower alcohols such as methanol, ethanol and isopropyl alcohol.

Conventional aggregates with no covalent bonding may be broken by a physical external force (for example, in the state of ink, by a shearing force applied upon stirring or coating using a doctor knife, etc.) From a chemical standpoint, aggregates with no covalent bonding may be broken by an additive such as a solvent which is able to break aggregates, a binder component, and a surfactant. Aggregates with no covalent bonding are not preferred because, even after forming a hard coat layer or an optical laminate, they are broken by physical external force (such as contact with a sharp object or the like), which may be a scratch of the hard coat layer or the optical laminate. In contrast, covalent bonding is less likely to cause decomposition by a physical or chemical force and is stable.

In the present invention, examples of the particle state of the irregularly shaped silica fine particle constituted with silica fine particles connected to each other by inorganic chemical bonding include a particle (aggregated particle) constituted with 3 to 20 silica fine particles connected to each other by inorganic chemical bonding and aggregated, and a chain particle constituted with 3 to 20 silica fine particles connected to each other by inorganic chemical bonding in a chain form. Particularly, from the viewpoint of increasing the hardness of a cured layer, the chain particle is preferable as the particle state of the irregularly shaped silica fine particle.

Also, in the curable resin composition for the hard coat layer of the present invention, it is preferable that a reactive irregularly shaped silica fine particle (A) in which the reactive functional group (a) is introduced on the surface of a chain irregularly shaped silica fine particle constituted with 3 to 20 silica fine particles connected by inorganic chemical bonding in a chain form is contained as at least a part of the reactive irregularly shaped silica fine particles (A) in which the reactive functional group (a) is introduced on the surface of an irregularly shaped silica fine particle constituted with 3 to 20 silica fine particles having an average primary particle diameter of 1 to 100 nm connected to each other by inorganic chemical bonding.

When the irregularly shaped silica fine particle is the chain particle, the average bond number of the silica fine particle can be obtained by observing the cross section of the hard coat layer using a SEM photograph or TEM photograph, selecting 100 cured irregularly shaped silica fine particles being observed, counting the number of silica fine particle contained in each irregularly shaped silica fine particle, and calculating the average value therefrom.

The method for producing the irregularly shaped silica fine particles is not particularly limited. It may be appropriately selected from conventionally known methods as long as it is possible to obtain silica fine particles connected to each other by inorganic chemical bonding. For example, the irregularly shaped silica fine particles can be obtained by performing a hydrothermal treatment at a high temperature of 100° C. or more on a monodisperse silica fine particle dispersion liquid after controlling the concentration or pH of the liquid. At this time, a binder component may be added as needed to promote the bonding of the silica fine particles. Also, the silica fine particles dispersion liquid to be used may be filtered through an ion-exchange resin to remove ions. The bonding of the silica fine particles can be promoted by such an ion-exchange treatment. After the hydrothermal treatment, another ion-exchange treatment may be performed thereon.

At least a part of the surface of the reactive irregularly shaped silica fine particle (A) is covered by the organic component, and the reactive irregularly shaped silica fine particle (A) has the reactive functional group (a) introduced by the organic component on its surface. Herein, "organic component" refers to a component containing a carbon. Embodiments in which at least part of the particle surface is covered with an organic component include, for example, an embodiment in which a compound containing an organic component such as a silane coupling agent reacts with hydroxyl groups present on the surface of the irregularly shaped silica fine particles, thereby binding the organic component to part of the particle surface; an embodiment in which a compound containing an organic component having isocyanate groups reacts with hydroxyl groups present on the surface of the irregularly shaped silica fine particles; and an embodiment in which an organic component is attached to hydroxyl groups present on the surface of the irregularly shaped silica fine particles by interaction such as hydrogen bonding; and an embodiment in which one or more of the irregularly shaped silica fine particles are contained in each polymer particle.

As the method of preparing the reactive irregularly shaped silica fine particles (A) in which at least a part of the surface is covered with an organic component and each particle has the reactive functional group (a) introduced onto the covered surface by the organic component, a conventionally-known method may be appropriately selected for use depending on the reactive functional group (a) to be introduced onto the irregularly shaped silica fine particle. Particularly in the present invention, it is preferred to accordingly select any of the following irregularly shaped silica fine particle (i) and (ii) for use, from the viewpoint of preventing aggregation of the irregularly shaped silica fine particles and increasing the hardness of a film:

(i) irregularly shaped silica fine particles having a reactive functional group (a) on the surface obtained by dispersing irregularly shaped silica fine particles in water and/or an organic solvent serving as a dispersion medium in the presence of one or more kinds of surface modification compounds having a molecular weight of 500 or less selected from the group consisting of saturated or unsaturated carboxylic acid, acid anhydride, acid chloride, ester and acid amide corresponding to the carboxylic acid, amino acid, imine, nitrile, isonitrile, an epoxy compound, amine, a β-dicarbonyl compound, silane and a metallic compound having a functional group; and (ii) irregularly shaped silica fine particle having a reactive functional group (a) on the surface obtained by bounding a compound containing the reactive functional group (a) being introduced on the irregularly shaped silica fine particle before being covered, a group represented by the following chemical formula (1), and a silanol group or a group producing the silanol group by hydrolysis, with metal oxide fine particles:

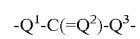   Chemical Formula (1)

wherein $Q^1$ is NH, O (oxygen atom) or S (sulfur atom); $Q^2$ is O or S; and $Q^3$ is NH or an organic group of divalent or more.

Hereinafter, the reactive irregularly shaped silica fine particle (A) which is suitably used in the present invention will be described in order.

(i) Irregularly shaped silica fine particles having a reactive functional group (a) on the surface obtained by dispersing irregularly shaped silica fine particles in water and/or an organic solvent serving as a dispersion medium in the presence of one or more kinds of surface modification compounds having a molecular weight of 500 or less selected from the group consisting of saturated or unsaturated carboxylic acid, acid anhydride, acid chloride, ester and acid amide corresponding to the carboxylic acid, amino acid, imine, nitrile, isonitrile, an epoxy compound, amine, a β-dicarbonyl compound, silane and a metallic compound having a functional group Use of the reactive irregularly shaped silica fine particle (A) (i) is advantageous in that the film strength can be increased even if the content of the organic component is small.

The surface modification compound used for the reactive inorganic fine particle (A) (i) has a functional group that can chemically bound to, upon dispersion, a group present on the surface of the inorganic fine particle, such as a carboxyl group, acid anhydride group, acid chloride group, acid amide group, ester group, imino group, nitrile group, isonitrile group, hydroxyl group, thiol group, epoxy group, primary, secondary or tertiary amino group, Si—OH group, hydrolyzable residue of silane, or C—H acid group such as a β-dicarbonyl compound. The chemical bonding herein preferably includes covalent bonding, ionic bonding or coordination bonding, and hydrogen bonding. Coordination bonding is considered to be complex forming. For example, an acid-base reaction according to the Brønsted or Lewis definition, complex formation or esterification occurs between the functional groups of the surface modification compound and the groups present on the surface of the inorganic fine particles. The surface modification compound used for the reactive inorganic fine particle (A) (i) may be one kind of component solely or a mixture of two or more kinds of components.

In addition to at least one functional group (hereinafter referred to as first functional group) that can participate in chemical bonding with the groups that are present on the surface of the irregularly shaped silica fine particles, the surface modification compound normally has molecular residues that impart, after being bound to the surface modification compound, a new property to the irregularly shaped silica fine particles via the functional group. The molecular residues or a part of the molecular residues are hydrophobic or hydrophilic and, for example, can stabilize, integrate or activate the irregularly shaped silica fine particles.

Examples of the hydrophobic molecular residue include an alkyl, aryl, alkaryl, and aralkyl group, all of which induce inactivation or repulsion. Examples of the hydrophilic group include a hydroxy group, alkoxy group and polyester group.

The reactive functional group (a), which is introduced to the surface of the reactive inorganic fine particle (A) so that the reactive inorganic fine particle (A) can react with the binder component (C) hereinafter described, is appropriately selected according to the reactive functional group (c) of the binder component (C). As the reactive functional group (a), polymerizable unsaturated group is suitably used, and photocurable unsaturated group is more preferable, ionizing radiation-curable unsaturated group is even more preferable. The specific examples include ethylenically unsaturated bonds (particularly, ethylenic double bonds) such as a (meth) acryloyl group, a vinyl group and an allyl group, and an epoxy group.

In the case where the reactive functional group (a) which is reactive with the binder component (C) is contained in the molecular residues of the surface modification compound, the reactive functional group (a) that is reactive with the binder component (C) can be introduced onto the surface of the reactive irregularly shaped silica fine particle (A) (i) by allowing the first functional group (s) contained in the surface modification compound to react with the surface of the irregularly shaped silica fine particles. For example, a surface modification compound having polymerizable unsaturated groups besides the first functional group(s) may be mentioned as a suitable one.

Meanwhile, by allowing a second reactive functional group to be contained in the molecular residues of the surface modification compound and by the aid of the second reactive functional group, the reactive functional group (a) reactive with the binder component (C) may be introduced onto the surface of the reactive irregularly shaped silica fine particle (A) (i). For example, it is preferable to introduce the reactive functional group (a) reactive with the binder component (C) in such a manner that a group capable of hydrogen bonding (hydrogen bond-forming group) such as a hydroxyl group or oxy group is introduced as the second reactive functional group so that the hydrogen bond-forming group is introduced onto the surface of the fine particle and further reacts with a hydrogen bond-forming group of a different surface modification compound. That is, as a suitable example, there may be mentioned use of a compound having a hydrogen bond-forming group in combination with the reactive functional group (a) reactive with the binder component (C) (such as a polymerizable unsaturated group) as the surface modification compound. Specific examples of the hydrogen bond-forming group include functional groups such as a hydroxyl group, carboxyl group, epoxy group, glycidyl group and amide group, and one capable of having an amide bond. The amide bond here refers to one containing —NHC(O) or >NC(O)— in the binding unit thereof. As the hydrogen bond-forming group used in the surface modification compound of the present invention, a carboxyl group, hydroxyl group or amide group is particularly preferred.

The surface modification compound used for the reactive irregularly shaped silica fine particle (A) (i) preferably has a molecular weight of 500 or less, more preferably 400 or less, even more preferably 200 or less. Because of having such a low molecular weight, the surface modification compound is presumed to be able to rapidly cover the surface of the irregularly shaped silica fine particles, so that the irregularly shaped silica fine particles are prevented from aggregation.

The surface modification compound used for the reactive irregularly shaped silica fine particle (A) (i) is preferably in liquid state in the reaction condition for surface modification, and it is preferable that the compound is soluble or at least can be emulsified in a dispersion medium. Particularly, it is preferable that the surface modification compound can be dissolved in a dispersion medium to exist as molecules or molecular ions dispersed uniformly in the dispersion medium.

The saturated or unsaturated carboxylic acid has 1 to 24 carbon atoms. Examples thereof include formic acid, acetic acid, propionic acid, butyric acid, valeric acid, caproic acid, acrylic acid, methacrylic acid, crotonic acid, citric acid, adipic acid, succinic acid, glutaric acid, oxalic acid, maleic acid, fumaric acid, itaconic acid and stearic acid, and acid anhydrides, chlorides, esters and amides corresponding thereto, such as caprolactam. Further, it is possible to introduce polymerizable unsaturated groups by using an unsaturated carboxylic acid.

An example of preferred amine is one having the chemical formula $Q_{3-n}NH_n$ (n=0, 1 or 2), wherein the residue Q independently represents an alkyl (such as methyl, ethyl, n-propyl, i-propyl and butyl) having 1 to 12 carbon atoms, more preferably 1 to 6 carbon atoms, even more preferably 1 to 4 carbon atoms, and an aryl, alkaryl or aralkyl (such as phenyl, naphthyl, tolyl and benzyl) having 6 to 24 carbon atoms. Also, an example of preferred amine is polyalkyleneamine. Specific examples thereof include methylamine, dimethylamine, trimethylamine, ethylamine, aniline, N-methylaniline, diphenylamine, triphenylamine, toluidine, ethylenediamine and diethylenetriamine.

The β-dicarbonyl compound is preferably one having 4 to 12 carbon atoms, more preferably 5 to 8 carbon atoms, such as diketone (acetylacetone, etc.), 2,3-hexanedione, 3,5-heptanedione, acetoacetic acid, acetoacetic acid-$C_1$-$C_4$-alkyl ester (acetoacetic acid ethyl ester, etc.), diacetyl and acetonylacetone.

Examples of the amino acid include β-alanine, glycine, valine, amino caproic acid, leucine and isoleucine.

Preferred silane is hydrolyzable organosilane having at least one hydrolyzable group or hydroxy group and at least one nonhydrolyzable residue. Examples of the hydrolyzable group include a halogen, alkoxy group and acyloxy group. As the nonhydrolyzable residues, nonhydrolyzable residues having the reactive functional groups (a) and/or having no reactive functional groups (a) is used. Alternatively, there may be used silane at least partly having fluorine-substituted organic residues.

The silane used herein is not particularly limited and may be, for example, $CH_2=CHSi(OOCCH_3)_3$, $CH_2=CHSiCl_3$, $CH_2=CHSi(OC_2H_5)_3$, $CH_2=CH-Si(OC_2H_4OCH_3)_3$, $CH_2=CH-CH_2-Si(OC_2H_5)_3$, $CH_2=CH-CH_2-Si(OOCCH_3)_3$, γ-glycidyloxypropyltrimethoxysilane (GPTS), γ-glycidyloxypropyldimethylchlorosilane, 3-aminopropyltrimethoxysilane (APTS), 3-aminopropyltriethoxysilane (APTES), N-(2-aminoethyl)-3-aminopropyltrimethoxysilane, N—[N'-(2'-aminoethyl)-2-aminoethyl]-3-aminopropyltrimethoxy silane, hydroxymethyltrimethoxysilane, 2-[methoxy(polyethyleneoxy)propyl]trimethoxysilane, bis-(hydroxyethyl)-3-aminopropyltriethoxysilane, N-hydroxy-ethyl-N-methylaminopropyltriethoxysilane, 3-(meth)acryloxypropyltriethoxysilane and 3-(meth)acryloxypropyltrimethoxysilane.

The silane-coupling agent is not particularly limited and may be a known one such as KBM-502, KBM-503, KBE-502 and KBE-503 (product names; manufactured by: Shin-Etsu Chemical Co., Ltd.)

As the metallic compound having functional groups, there may be mentioned a metallic compound of a metal M selected from the primary groups III to V and/or the secondary groups II to IV of the periodical table of the elements. Examples of the metallic compound include zirconium alkoxide and titanium alkoxide, and $M(OR)_4$ (M=Ti or Zr) wherein a part of the OR group is replaced with a β-dicarbonyl compound or a complexing agent such as monocarboxylic acid. In the case of using a compound having a polymerizable unsaturated group (such as methacrylic acid) as the complexing agent, it is possible to introduce polymerizable unsaturated groups.

As the dispersion medium, water and/or an organic solvent is suitably used. A particularly preferred dispersion medium is distilled (pure) water. As the organic solvent, a polar solvent, nonpolar solvent or aprotic solvent is preferred. Examples thereof include alcohols such as aliphatic alcohols having 1 to 6 carbon atoms (in particular, methanol, ethanol, n- (normal) and i- (iso) propanol and butanol); ketones such as acetone and butanone; esters such as ethyl acetate; ethers such as diethyl ether, tetrahydrofuran and tetrahydropyran; amides such as dimethylacetamide and dimethylformamide; sulfoxides and sulfones such as sulfolane and dimethylsulfoxide; and aliphatic (optionally halogenated) hydrocarbons such as pentane, hexane and cyclohexane. These dispersion media may be used as a mixture.

The dispersion medium preferably has a boiling point at which it can be easily removed by distillation (optionally under reduced pressure). Preferred as the dispersion medium is a solvent having a boiling point of 200° C. or less, more preferably 150° C. or less.

In preparation of the reactive irregularly shaped silica fine particles (A) (i), the concentration of the dispersion medium is normally from 40 to 90 wt %, preferably from 50 to 80 wt %, more preferably from 55 to 75 wt %. The rest of the dispersion is composed of untreated inorganic fine particles and the above surface modification compound. Herein, the weight ratio of the inorganic fine particles to the surface modified compound is preferably from 100:1 to 4:1, more preferably from 50:1 to 8:1, still more preferably from 25:1 to 10:1.

Preparation of the reactive irregularly shaped silica fine particles (A) (i) is preferably carried out at a temperature from room temperature (about 20° C.) to the boiling point of the dispersion medium. The dispersion temperature is particularly preferably from 50 to 100° C. The dispersion time particularly depends on the kind of raw materials used, and is normally from few minutes to few hours, for example, from 1 to 24 hours.

(ii) Irregularly shaped silica fine particle having a reactive functional group (a) on the surface obtained by bounding a compound containing the reactive functional group (a) being introduced on the irregularly shaped silica fine particle before being covered, a group represented by the following chemical formula (1), and a silanol group or a group producing the silanol group by hydrolysis, with metal oxide fine particles:

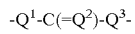   Chemical Formula (1)

wherein $Q^1$ is NH, O (oxygen atom) or S (sulfur atom); $Q^2$ is O or S; and $Q^3$ is NH or an organic group of divalent or more.

Use of the reactive irregularly shaped silica fine particle (A) (ii) is advantageous in that the amount of the organic component is increased, so that the dispersibility of the reactive irregularly shaped silica fine particle (A) and the film strength are further increased.

Firstly, a compound having the reactive functional group (a), which is required to be introduced onto the irregularly shaped silica fine particle before being covered, the group represented by the above chemical formula (1), and a silanol group or a group that is able to become a silanol group by hydrolysis will be described. Hereinafter, this compound may be referred to as a reactive functional group modified hydrolyzable silane.

In the reactive functional group modified hydrolyzable silane, the reactive functional group (a), which is required to be introduced onto the irregularly shaped silica fine particle, is not particularly limited if it is appropriately selected so as to react with the binder component (C) hereinafter described. The reactive functional group modified hydrolyzable silane is suitable to introduce the above-mentioned polymerizable unsaturated group.

In the reactive functional group modified hydrolyzable silane, examples of the $[-Q^1-C(=Q^2)-]$ moiety of the group represented by the above chemical formula (1) include the following six kinds of [—O—C(=O)—], [—O—C(=S)—], [—S—C(=O)—], [—NH—C(=O)—], [—NH—C(=S)—] and [—S—C(=S)—]. They may be used solely or in combination of two or more kinds. Particularly from the viewpoint of thermal stability, it is preferable to use the [—O—C(=O)—] group in combination with at least one of the [—O—C(=S)—] and [—S—C(=O)—] groups. The group represented by the above chemical formula (1), $[-Q^1-C(=Q^2)-Q^2-]$, causes appropriate intermolecular cohesion by hydrogen bonding. When a cured product is formed with the group, it is considered possible to impart properties such as excellent mechanical strength, adhesion to the substrate and heat resistance to the product.

Examples of the groups that are able to become silanol groups by hydrolysis include groups having an alkoxy group, aryloxy group, acetoxy group, amino group, halogen atom or the like on a silicon atom thereof. Preferred is an alkoxysilyl group or aryloxysilyl group. The silanol groups or groups that are able to become silanol groups by hydrolysis can be combined to the metal oxide fine particles by a condensation reaction that occurs after a condensation reaction or hydrolysis.

A preferred specific example of the reactive functional group modified hydrolyzable silane may be compounds represented by the following chemical formulas (2) and (3). Among the above, the compound represented by the formula (3) is more preferably used from the viewpoint of the hardness of the hard coat layer:

Chemical formula (2)

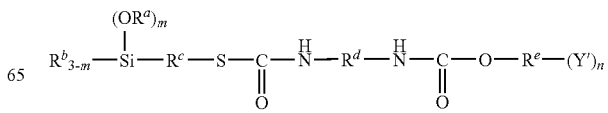

-continued

Chemical formula (3)

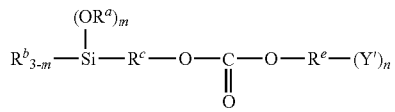

In the chemical formulae (2) and (3), $R^a$ and $R^b$ may be the same or different from each other, and are a hydrogen atom or a $C_1$-$C_8$ alkyl or aryl group such as a methyl, ethyl, propyl, butyl, octyl, phenyl and xylyl group, and m is 1, 2 or 3.

As the group represented by $[(R^aO)_m R^b_{3-m}Si\text{—}]$, for example, there may be mentioned a trimethoxysilyl group, triethoxysilyl group, triphenoxysilyl group, methyldimethoxysilyl group and dimethylmethoxysilyl group. Among these groups, preferred are trimethoxysilyl and triethoxysilyl groups.

In the chemical formulae (2) and (3), $R^c$ is a $C_1$-$C_{12}$ divalent organic group having an aliphatic or aromatic structure, and may contain a chain, branched or cyclic structure. As such an organic group, for example, there may be mentioned methylene, ethylene, propylene, butylene, hexamethylene, cyclohexylene, phenylene, xylylene and dodecamethylene. Among them, preferred are methylene, propylene, cyclohexylene and phenylene.

In the chemical formula (2), $R^d$ is a divalent organic group and is normally selected from divalent organic groups having a molecular weight of 14 to 10,000, preferably a molecular weight of 76 to 500. For example, there may be mentioned a chain polyalkylene group such as hexamethylene, octamethylene and dodecamethylene; an alicyclic or polycyclic divalent organic group such as cyclohexylene and norbornylene; a divalent aromatic group such as phenylene, naphthylene, biphenylene and polyphenylene; and alkyl group-substituted derivatives and aryl group-substituted derivatives thereof. These divalent organic groups may contain an atom group that contains an element other than carbon and hydrogen atoms, and may further contain a polyether bond, a polyester bond, a polyamide bond, a polycarbonate bond, and a group represented by the chemical formula (1).

In the chemical formulae (2) and (3), $R^e$ is a (n+1)-valent organic group and is preferably selected from a chain, branched or cyclic saturated or unsaturated hydrocarbon group.

In the chemical formulae (2) and (3), Y' denotes a monovalent organic group having a reactive functional group (a) and may be the above-mentioned reactive functional group a. In the case of selecting the reactive functional groups a from polymerizable unsaturated groups, the examples include a (meth)acryloyl(oxy) group, vinyl(oxy) group, propenyl(oxy) group, butadienyl(oxy) group, styryl(oxy) group, ethinyl (oxy) group, cinnamoyl(oxy) group, maleate group and (meth)acrylamide group. Preferably, n is a positive integer of 1 to 20, more preferably 1 to 10, particularly preferably 1 to 5.

Synthesis of the reactive functional group modified hydrolyzable silane used in the present invention may be performed by the method disclosed in, for example, JP-A No. 9-100111. That is, for example, if introduction of polymerizable unsaturated groups is required, the synthesis may be performed by: (I) addition reaction between mercaptoalkoxysilane, a polyisocyanate compound and an active hydrogen group-containing polymerizable unsaturated compound reactive with an isocyanate group. The synthesis may be also performed by (II) direct reaction between a compound having an alkoxysilyl group and isocyanate group in a molecule thereof and an active hydrogen group-containing polymerizable unsaturated compound. Furthermore, the reactive, hydrolyzable, functional group modification silane may be directly synthesized by (III) addition reaction between a compound having a polymerizable unsaturated group and isocyanate group in a molecule thereof and mercaptoalkoxysilane or aminosilane.

In the production of the reactive irregularly shaped silica fine particle (A) (ii), a method may be selected from the following: a method in which after the reactive functional group modified hydrolyzable silane is separately hydrolyzed, the resultant and the irregularly shaped silica fine particles are mixed together, followed by heating and stirring; a method in which the reactive functional group modified hydrolyzable silane is hydrolyzed in the presence of the irregularly shaped silica fine particles; and a method in which a surface treatment is performed on the irregularly shaped silica fine particles in the presence of other component such as a polyvalent unsaturated organic compound, a monovalent unsaturated organic compound and a radiation polymerization initiator. Preferred is the method in which the reactive functional group modified hydrolyzable silane is hydrolyzed in the presence of the irregularly shaped silica fine particles. In the production of the irregularly shaped silica fine particle (A) (ii), the production temperature is normally from 20° C. to 150° C., and the treating time is in the range from 5 minutes to 24 hours.

To accelerate the hydrolysis reaction, acid, salt or base may be added as a catalyst. Suitable examples of acid include organic acids and unsaturated organic acids, and suitable examples of base include tertiary amines and quaternary ammonium hydroxides. The added amount of acid, salt or base catalyst is from 0.001 to 1.0 wt %, preferably from 0.01 to 0.1 wt %, with respect to the reactive functional group modified hydrolyzable silane.

Also, as the reactive irregularly shaped silica fine particles (A), powdery fine particles containing no dispersion media may be used, but a sol comprising fine particles dispersed in a solvent is preferably used since the dispersion process is not necessary and the productivity is high.

Also, the content of the reactive irregularly shaped silica fine particle (A) is preferably from 20 to 70 wt %, more preferably from 40 to 65 wt %, with respect to the total solid content of the curable resin composition for the hard coat layer. If the content is less than 20 wt %, sufficient hardness cannot be imparted to the hard coat layer. If the content exceeds 70 wt %, the filling rate excessively increases, adhesion between the irregularly shaped silica fine particle and the binder component may deteriorate, and the hardness of the hard coat layer may be even decreased.

When the layer thickness of the hard coat layer is from 5 μm to 10 μm, the content of the reactive irregularly shaped silica fine particle (A) is preferably from 35 to 65 wt %, more preferably from 40 to 65 wt %, with respect to the total solid content of the curable resin composition for the hard coat layer Also, when the layer thickness of the hard coat layer is more than 10 μm and 20 μm or less, the content of the reactive irregularly shaped silica fine particle (A) is from 20 to 70 wt %, more preferably from 40 to 65 wt %, with respect to the total solid content of the curable resin composition for the hard coat layer.

By setting the content of the reactive irregularly shaped silica fine particle (A) with respect to the total solid content of the curable resin composition for the hard coat layer according to the layer thickness of the hard coat layer, the hardness of the hard coat layer to be obtained can be increased.

In the present invention, the solid content means components contained in the curable resin composition for the hard coat layer except for a solvent.

Examples of commercial products of the reactive irregularly shaped silica fine particle (A) include DP1039, DP1040, DP1071, DP1072 and DP1073 (product names; manufactured by: JGC Catalysts and Chemicals Ltd.).

(Reactive Silica Fine Particle (B))

The curable resin composition for the hard coat layer of the present invention may further contain the reactive silica fine particle (B) which is a component which crosslinks to the binder component (C) hereinafter described and can improve the hardness and abrasion resistance of the hard coat layer.

The average primary particle diameter of the reactive silica fine particle (B) is from 1 to 100 nm, preferably from 12 to 50 nm. If the average primary particle diameter of the reactive silica fine particle (B) is less than 1 nm, the reactive silica fine particle (B) cannot contribute to improvement of the hardness of the hard coat layer, and the adhesion with the substrate may deteriorate since the contact area between the transparent substrate film adjacent to the hard coat layer or other layer provided, if necessary, on the side opposite to the transparent substrate film side of the hard coat layer and the silica fine particles increases. If the average primary particle diameter exceeds 100 nm, the average secondary particle diameter easily exceeds 500 nm, and if the average secondary particle diameter exceeds 500 nm, the transparency of the hard coat layer decreases, so that the transmittance may deteriorate and the haze may increase.

The reactive silica fine particle (B) is preferably spherical. Also, the reactive silica fine particle (B) preferably has narrow particle size distribution and is monodispersed from the viewpoint of capable of improving hardness without deteriorating the transparency while maintaining the restoration rate when the binder component (C) hereinafter described is used alone.

The reactive silica fine particle (B) may be a particle having single average primary particle diameter, but also may contain two or more kind of particles having different average primary particle diameter. If two or more kinds are used in combination, each kind of particle preferably has an average primary particle diameter of 1 to 100 nm.

The reactive functional group (b) on the surface of the reactive silica fine particle (B), which can react with the reactive irregularly shaped silica fine particle (A) and the binder component (C) hereinafter described, can be selected according to the reactive irregularly shaped silica fine particle (A) and the binder component (C). As the reactive functional group (b), a polymerizable unsaturated group is suitably used, more preferably a photocurable functional group, even more preferably an ionizing radiation-curable unsaturated group. The examples include an ethylenically unsaturated bond such as a (meth)acryloyl group, vinyl group and allyl group, and an epoxy group.

At least a part of the surface of the reactive silica fine particle (B) is covered by the organic component, and the reactive irregularly shaped silica fine particle (A) has the reactive functional group (b) introduced by the organic component on its surface. Herein, "organic component" refers to a component containing a carbon. Embodiments in which at least part of the particle surface is covered with an organic component include, for example, an embodiment in which a compound containing an organic component such as a silane coupling agent reacts with hydroxyl groups present on the surface of the silica fine particles, thereby binding the organic component to part of the particle surface; an embodiment in which a compound containing an organic component having isocyanate groups reacts with hydroxyl groups present on the surface of the silica fine particles; and an embodiment in which an organic component is attached to hydroxyl groups present on the surface of the irregularly shaped silica fine particles by interaction such as hydrogen bonding; and an embodiment in which one or more of the silica fine particles are contained in each polymer particle.

From the viewpoint of improving hardness of the film (hard coat layer) by introducing many reactive functional groups to the surface of the silica fine particle, it is preferable that the organic component covers almost entire particle surface. From this point of view, the organic component covering the silica fine particle is contained by $1.00 \times 10^{-3}$ g/m$^2$ or more in the reactive silica fine particle (B). In the embodiment that the organic component is attached or connected to the surface of the silica fine particle, it is more preferable that the organic component covering the silica fine particle is contained by $2.00 \times 10\text{-}3$ g/m2 or more, even more preferably $3.50 \times 10^{-3}$ g/m$^2$ or more, in the reactive silica fine particle (B). In the embodiment in which the silica fine particles are contained in the polymer particles, the organic component covering the reactive silica fine particle (A) is contained in the reactive silica fine particles (A) more preferably by $3.50 \times 10^{-3}$ g/m$^2$ or more, even more preferably by $5.50 \times 10^{-3}$ g/m$^2$ or more The ratio of the organic component covering the particle surface can be generally obtained by, for example, thermogravimetric analysis in air from room temperature generally to 800° C. as a constant mass value of percentage of weight reduction when dried powder is completely burned in air.

The amount of the organic component per unit area is obtained by the following method. Firstly, a value in which the weight of the organic component is divided with the weight of the inorganic component (the weight of the organic component/the weight of the inorganic component) is measured by differential thermogravimetric analysis (TG-DTA). Next, the volume of the whole inorganic component is calculated from the weight of the inorganic component and the specific gravity of the silica fine particle. Also, assuming that the silica fine particle before being covered is spherical form, the volume per silica fine particle before being covered and surface area are calculated from the average particle diameter of the silica fine particles before being covered. Next, the number of the silica fine particle before being covered is calculated by dividing the area of whole inorganic component by the volume per silica fine particle before being covered. Further, the amount of the organic component per reactive silica fine particle (B) is calculated by dividing the weight of the organic component by the number of reactive silica fine particle (B). Finally, the amount of the organic component per unit area is calculated by dividing the weight of the organic component per reactive silica fine particle (B) by the surface area per silica fine particle before being covered.

As a method of introducing the reactive functional group (b) to the surface of the silica fine particle to obtain the reactive silica fine particle (B), the above method of introducing the reactive functional group (a) to the silica fine particle of the reactive irregularly shaped silica fine particle (A) can be used.

The reactive functional group (a) of the reactive irregularly shaped silica fine particle (A) and the reactive functional group (b) of the reactive silica fine particle (B) may be the same or different kind.

The total content of the reactive irregularly shaped silica fine particle (A) and the reactive silica fine particle (B) may be accordingly adjusted but is preferably from 30 to 70 wt %, more preferably from 40 to 60 wt %, with respect to the total solid content of the curable resin composition for the hard coat layer. If the total content is less than 30 wt %, sufficient hardness may not be imparted to the hard coat layer. If the total content exceeds 70 wt %, the filling rate may excessively increase and the adhesion between the silica fine particle and the binder component may decrease, so that the hardness of the hard coat layer may even decrease.

Particularly, in the case of the third hard coat film, the total content of the reactive irregularly shaped silica fine particle (A) and the reactive silica fine particle (B) is preferably from 20 to 70 wt %, more preferably from 40 to 65 wt %, with respect to the total solid content of the curable resin composition for the hard coat layer, and the total content of the reactive irregularly shaped silica fine particle (A) is preferably 50 wt % or more, more preferably 80 wt % or more, with respect to the total weight of the reactive irregularly shaped silica fine particle (A) and the reactive silica fine particle (B).

By setting the total content of the reactive irregularly shaped silica fine particle (A) and the reactive silica fine particle (B) and the total content of the reactive irregularly shaped silica fine particle (A) with respect to the total weight of the reactive irregularly shaped silica fine particle (A) and the reactive silica fine particle (B) in the above range, the hardness of the hard coat layer to be obtained can be increased.

Examples of commercial products of the above reactive silica fine particle (B) include MIBK-SD, MIBK-SDMS, MIBK-SDL and MIBK-SDZL (product names; manufactured by Nissan Chemical Industries, Ltd.), and DP1021, DP1022, DP1032, DP1037, DP1041, DP1042 and DP1044 (product names; manufactured by JGC Catalysts and Chemicals Ltd.).

(Curable Binder System)

Herein, the constituent components of the curable binder system referrers to the binder component (C), and if necessary, curable binder components besides the binder component (C), polymer components, and ones to be matrix components of the hard coat layer after being cured hereinafter described such as a polymerization initiator.

(Binder Component (C))

In the curable resin composition for the hard coat layer of the present invention, the binder component (C) has the reactive functional group (c) cross-linking reactive with the reactive functional group (a) of the reactive irregularly shaped silica fine particle (A), and the reactive functional group (a) and the reactive functional group (c) are crosslinked to form a mesh structure. It is preferable that the binder component (C) has three or more reactive functional groups (c) to obtain sufficient crosslinking ability. As the reactive functional group (c), a polymerizable unsaturated group is suitably used. The preferred examples include photocurable unsaturated groups, and particularly preferred are ionizing radiation-curable unsaturated groups. Specific examples thereof include an ethylenically unsaturated bond such as a (meth) acryloyl group, vinyl group and allyl group, and an epoxy group.

The reactive functional group (c) and the reactive functional group (a) may be the same or different kind.

The binder component (C) is preferably a curable organic resin, which is preferably an optically-transparent resin that can let light through when formed into a coating layer, and may be selected from ionizing radiation-curable resins which are curable upon exposure to ionizing radiation typified by ultraviolet light or electron beams, and other conventional curable resins according to required performance. Examples of the ionizing radiation-curable resins include acrylate-based resins, oxetane-based resins and silicone-base resin.

As the binder component (C), one or more kinds of binder components (C) can be used.

Examples of the binder component (C) having three or more reactive functional groups (C) (tri- or more functional binder component) include pentaerythritol triacrylate (PDTA), dipentaerythritol hexaacrylate (DPHA), dipentaerythritol pentaacrylate (DPPA), trimethylolpropane triacrylate (TMPTA), trimethylolpropane hexaacrylate, ones having the acrylate structure thereof substituted by a methacrylate structure, and modified products thereof.

Examples of the modified products include EO (ethylene oxide)-modified products, PO (propylene oxide)-modified products, CL (caprolactone)-modified products and isocyanuric acid-modified products.

As the binder component, there may be also used a compound having a molecular weight of 10,000 or more, three or more functional groups, and a similar framework to that of the compound (E) described hereinafter, which has a molecular weight of less than 10,000 and two or more reactive functional groups (c). As such a compound, BEAMSET 371 (product name; manufactured by: Arakawa Chemical Industries, Ltd.) can be exemplified.

As the binder component (C), pentaerythritol triacrylate, dipentaerythritol hexaacrylate, pentaerythritol tetraacrylate or dipentaerhythritol pentaacrylate is preferably used, more preferably dipentaerythritol hexaacrylate, pentaerythritol tetraacrylate or dipentaerhythritol pentaacrylate is used.

Furthermore, from the viewpoint of increasing the hardness of the hard coat layer, it is preferable to use a polyalkylene oxide chain-containing polymer (D) represented by the following chemical formula (4) in combination with the compound (E) having a molecular weight of less than 10,000 and two or more reactive functional groups as the binder components (C).

Chemical formula (4)

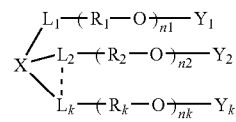

wherein X is a straight, branched or cyclic hydrocarbon chain solely or a combination thereof; the hydrocarbon chain may have a substituent; a heteroatom may be contained between the hydrocarbon chains; the hydrocarbon chain is a trivalent or more organic group having 3 to 10 carbon atoms excluding the substituent; k denotes an integer from 3 to 10; each of $L_1$ to $L_k$ is independently a direct bond or a divalent group having one or more kinds of bonds selected from the group consisting of an ether bond, ester bond and urethane bond; each of $R_1$ to $R_k$ is independently a straight-chain or branched hydrocarbon group having 1 to 4 carbon atoms; each of n1, n2 to nk is an independent number; and each of $Y_1$ to $Y_k$ independently denotes a compound residue having one or more reactive functional groups (c).

The polymer (D), the compound (E) and the reactive irregularly shaped silica fine particle (A) are reactive with each other. It is presumed that because the polymer (D) is cross-linked to the compound (E) and the reactive irregularly shaped silica fine particle (A), the hard coat film can be imparted with abrasion resistance.

[Polyalkylene Oxide Chain-Containing Polymer (D) Represented by Chemical Formula (4)]

The polyalkylene oxide chain-containing polymer (D) is a polyalkylene oxide chain-containing polymer having a molecular weight of 1,000 or more and three or more reactive functional groups (c) at the end positions thereof, and is represented by the following chemical formula (4):

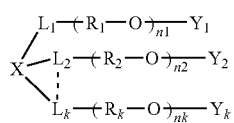

Chemical formula (4)

wherein X is a straight, branched or cyclic hydrocarbon chain solely or a combination thereof; the hydrocarbon chain may have a substituent; a heteroatom may be contained between the hydrocarbon chains; the hydrocarbon chain is a trivalent or more organic group having 3 to 10 carbon atoms excluding the substituent; k denotes an integer from 3 to 10; each of $L_1$ to $L_k$ is independently a direct bond or a divalent group having one or more kinds of bonds selected from the group consisting of an ether bond, ester bond and urethane bond; each of $R_1$ to $R_k$ is independently a straight-chain or branched hydrocarbon group having 1 to 4 carbon atoms; each of n1, n2 to nk is an independent number; and each of $Y_1$ to $Y_k$ independently denotes a compound residue having one or more reactive functional groups (c).

In the chemical formula (4), X corresponds to a short main chain having k branching point(s) (k denotes the number of the branching point(s) from which a polyalkylene oxide chain portion $(O—R_k)_{nk}$ being a linear side chain is branched.

The hydrocarbon chain X contains a saturated hydrocarbon like —CH$_2$— or an unsaturated hydrocarbon like —CH=CH—. The cyclic hydrocarbon chain may comprise an alicyclic compound or aromatic compound. A heteroatom such as O or S may be contained between the hydrocarbon chains, and an ether bond, thioether bond, ester bond, urethane bond or the like may be also contained between the hydrocarbon chains. A hydrocarbon chain that is branched from the straight or cyclic hydrocarbon chain via a heteroatom is included in the number of carbons of a substituent that will be described below.

Specific examples of the substituent that may be contained in the hydrocarbon chain include a halogen atom, hydroxyl group, carboxyl group, amino group, epoxy group, isocyanate group, mercapto group, cyano group, silyl group, silanol group, nitro group, acetyl group, acetoxy group and sulfonic group. The substituent is not limited to the above examples. As mentioned above, the substituent that may be contained in the hydrocarbon chain also contains said hydrocarbon chain that is branched from the straight or cyclic hydrocarbon via a heteroatom, such as an alkoxy group (RO—, wherein R is a straight, branched or cyclic saturated or unsaturated hydrocarbon chain), alkylthioether group (RS—, wherein R is a straight, branched or cyclic saturated or unsaturated hydrocarbon chain) and alkyl ester group (RCOO—, wherein R is a straight, branched or cyclic saturated or unsaturated hydrocarbon chain).

X is a trivalent or more organic group having 3 to 10 carbon atoms excluding the substituent. In X, if the number of the carbon atoms excluding the substituent is less than 3, it becomes difficult to have three or more polyalkylene oxide chain portions $(O—R_k)_{nk}$, which are linear side chains. On the other hand, if the number of the carbon atoms excluding the substituent of X exceeds 10, there are more soft parts in a cured film and the hardness of the film is thus decreased, which is not preferable. The number of the carbon atoms excluding the substituent is preferably 3 to 7, more preferably 3 to 5.

X is not particularly limited if the above conditions are met. As X, for example, there may be mentioned one having any of the following structures.

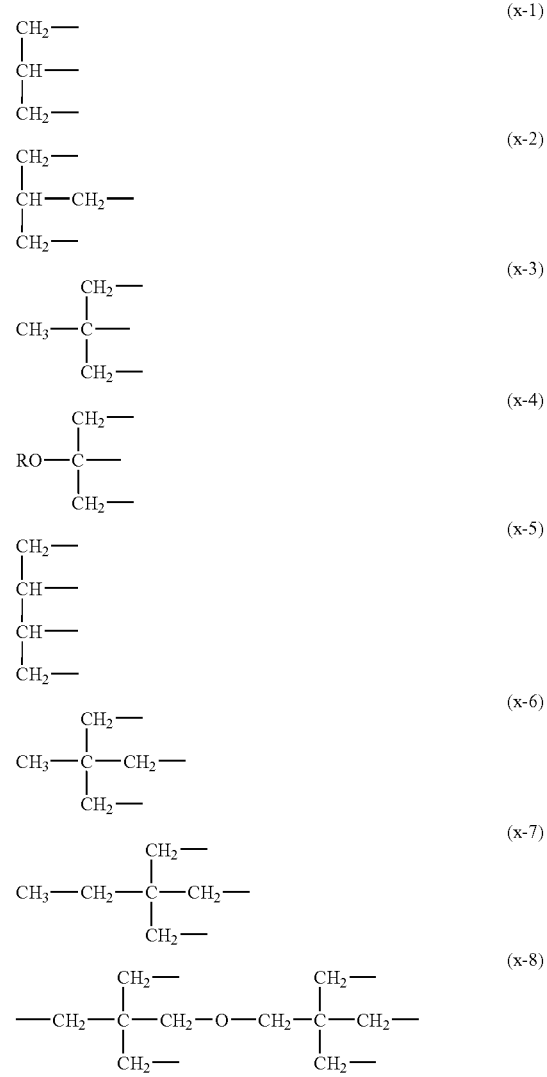

As the particularly preferred structure, there may be mentioned the above structures (x-1), (x-2), (x-3) and (x-7).

Examples of materials that are suitably used as the material of X include polyalcohols which have three or more hydroxyl groups in a molecule thereof and 3 to 10 carbon atoms, such as 1,2,3-propanetriol (glycerol), trimethylolpropane, pentaerythritol and dipentaerythritol; polycarboxylic acids which have three or more carboxyl groups in a molecule thereof and 3 to 10 carbon atoms; and C3-C10 multiamine acids having three or more amino groups in a molecule thereof.

In the chemical formula (4), k denotes the number of the polyalkylene oxide chain $(O—R_k)_{nk}$ in a molecule, which is an integer from 3 to 10. If k is less than 3, that is, if the number of the polyalkylene oxide chain is 2, no sufficient hardness can be obtained. If k exceeds 10, there are more soft parts in a cured film and the hardness of the film is thus decreased, which is not preferable. Preferably, k is 3 to 7. More preferably, k is 3 to 5.

In the chemical formula (4), each of $L_1$ to $L_k$ is independently a direct bond or a divalent group having one or more kinds of bonds selected from the group consisting of an ether bond, ester bond and urethane bond. The divalent group having one or more kinds of bonds selected from the group consisting of an ether bond, ester bond and urethane bond may be an ether bond (—O—), ester bond (—COO—) or urethane bond (—NHCOO—) itself. Because of these bonds, the molecular chain of these bonds can be easily lengthened and is thus highly flexible, so that it is easy to obtain high compatibility with other resin components.

Examples of the divalent group having one or more kinds of bonds selected from the group consisting of an ether bond, ester bond and urethane bond include —O—R—O—, —O(C=O)—R—O—, —O(C=O)—R—(C=O)O—, —(C=O)O—R—O—, —(C=O)O—R—(C=O)O—, —(C=O)O—R—O(C=O)—, —NHCOO—R—O—, —NHCOO—R—O(C=O)NH—, —O(C=O)NH—R—O—, —O(C=O)NH—R—O(C=O)NH—, —NHCOO—R—O(C=O)NH—, —NHCOO—R—(C=O)O—, —O(C=O)NH—R—(C=O)O—, —NHCOO—R—O(C=O)—, and —O(C=O)NH—R—O(C=O)—. The R used herein denotes a straight, branched or cyclic, saturated or unsaturated hydrocarbon chain.

Specific examples of the divalent group include residues formed by removing active hydrogens from a diol (such as (poly)ethylene glycol and (poly)propylene glycol), dicarboxylic acid (such as fumaric acid, maleic acid and succinic acid), and diisocyanate (such as tolylenediisocyanate, hexamethylene diisocyanate and isophorone diisocyanate). The divalent group is not limited to the above examples.

In the chemical formula (4), $(O-R_k)_{nk}$ is a polyalkylene oxide chain which is a linear side chain having alkylene oxide as the repeating unit. Herein, each of $R_1$ to $R_k$ is independently a straight-chain or branched hydrocarbon group having 1 to 4 carbon atoms. Examples of the alkylene oxide include methylene oxide, ethylene oxide, propylene oxide and isobutylene oxide. Suitably used as the alkylene oxide are ethylene oxide and propylene oxide, which are a straight-chain or branched hydrocarbon group having 2 to 3 carbon atoms.

In the chemical formula (4), each of n1, n2 to nk is the number of the repeating unit of alkylene oxide $R_k$—O, and is an independent number. No particular limitation is imposed on n1, n2 to nk as long as the weight average molecular weight of all the molecules is 1,000 or more. Each of n1, n2 to nk may be different; however, their chain lengths are preferably almost equal from the viewpoint of preventing the hard coat layer from cracking with retaining the original hardness of the hard coat layer when it is formed. Therefore, the difference in the repeating units between n1 to nk is preferably about 0 to 100, more preferably about 0 to 50, even more preferably about 0 to 10.

From the viewpoint of preventing the hard coat layer from cracking with retaining the original hardness of the hard coat layer when it is formed, each of n1, n2 to nk is preferably a number of 2 to 500, more preferably a number of 2 to 300.

Each of $Y_1$ to $Y_k$ independently denotes a reactive functional group b or a compound residue having one or more reactive functional groups (b). Because of this, three or more reactive functional groups (b) are provided to the end positions of the polyalkylene oxide chain-containing polymer.

In the case where each of $Y_1$ to $Y_k$ is a reactive functional group b itself, as each of $Y_1$ to $Y_k$, for example, there may be mentioned a polymerizable unsaturated group such as a (meth)acryloyl group and a vinyl group (CH2=CH—).

In the case where each of $Y_1$ to $Y_k$ is a compound residue having one or more reactive functional groups (c), examples of the reactive functional group (c) include polymerizable unsaturated groups such as a (meth) acryloyloxy group and $CH_2$=CR— (wherein R is a hydrocarbon group). No particular limitation is imposed on the compound residue as long as the reactive functional groups (c) are appropriately selected so as to be reactive with the reactive irregularly shaped silica fine particle (A) and/or the compound (E) that will be described below. In the case where each of $Y_1$ to $Y_k$ is a compound residue, the number of the reactive functional group (s) (c) of $Y_1$ to $Y_k$ may be one. However, from the viewpoint of hardness of the resulting hard coat layer, the number is more preferably two or more, so that the cross-linking density of the hard coat layer is increased further.

In the case where each of $Y_1$ to $Y_k$ is a compound residue having one or more reactive functional groups (c), the compound residue is a residue formed by removing the reactive substituent or a part of the reactive substituent (such as hydrogen) from a compound which has at least one or more reactive functional groups (c) and a different reactive substituent.

Specific examples of a compound residue having an ethylenically unsaturated group include residues formed by removing, from each of the following compounds, a reactive substituent other than the ethylenically unsaturated group or a part of the reactive substituent (such as hydrogen) such as (meth)acrylic acid, hydroxyethyl(meth)acrylate, hydroxypropyl(meth)acrylate and pentaerythritol tri(meth)acrylate, but may not be limited thereto.

The molecular weight of the polyalkylene oxide chain-containing polymer (D) used in the present invention is 1,000 or more, preferably 5,000 or more, more preferably 10,000 or more, from the viewpoint of imparting flexibility to a cured layer and preventing the same from cracking.

Examples of commercial products containing the polyalkylene oxide chain-containing polymer (D) represented by the chemical formula (4) include DIABEAM UK-4153 (product name; manufactured by: Mitsubishi Rayon Co., Ltd.; in the chemical formula (4), X is (x-7); k is 3; each of $L_1$ to $L_3$ is a direct bond; each of $R_1$ to $R_3$ is ethylene; the total of n1, n2 and n3 is 20; and each of $Y_1$ to $Y_3$ is an acryloyloxy group.).

The content of the polymer (D) is preferably 5 to 100 parts by weight, more preferably 10 to 50 parts by weight, with respect to 100 parts by weight of the compound (E) that will be described below. If the content of the polymer (D) is 5 parts by weight or more with respect to 100 parts by weight of the compound (E), flexibility and restoring property can be imparted to a cured film. If the content is 100 parts by weight or less, a cured film can retain its hardness.

(Compound (E) Having a Molecular Weight of Less than 10,000 and Two or More Reactive Functional Groups (c))

The compound (E) having a molecular weight of less than 10,000 and two or more reactive functional groups (c) increases the hardness of the hard coat layer in corporation with the reactive irregularly shaped silica fine particles (A), thereby imparting sufficient abrasion resistance and hardness to the hard coat layer. One having the structure of the polymer (D) is, however, excluded from the compound (E) having a molecular weight of less than 10,000 and two or more reactive functional groups (c).

In the present invention, the compound (E) may be selected from a wide range of compounds having sufficient abrasion resistance and reactive functional groups (c) which are, when combined with the polymer (D) and the reactive irregularly shaped silica fine particle (A), reactive with them. The compound (E) may be a single compound or a mixture of two or more kinds of compounds.

In the compound (E) having a molecular weight of less than 10,000 and two or more reactive functional groups (c), from the viewpoint of increasing the cross-linking density of a cured film and imparting hardness to the film, the number of the functional groups (c) which are contained in one molecule is preferably three or more. When the compound (E) is an oligomer having a molecular weight distribution, the number of the reactive functional groups (a) is expressed by an average number.

The molecular weight of the compound (E) is preferably less than 5,000 from the viewpoint of increasing the hardness of the hard coat layer.

Specific examples of the compound (E) are listed below. However, the compound (E) used in the present invention is not limited to the following examples.

Specific examples of the compounds having polymerizable unsaturated groups include polyfunctional (meth)acrylate monomers having two or more polymerizable unsaturated groups in a molecule including difunctional (meth)acrylate compounds such as 1,6-hexanediol di(meth)acrylate, neopentyl glycol di(meth)acrylate, ethylene glycol di(meth)acrylate, and isocyanuric acid ethylene oxide-modified di(meth)acrylate; trifunctional(meth)acrylate compounds such as trimethylolpropane tri(meth)acrylate and EO-, PO-, and epichlorohydrin-modified products thereof, pentaerythritol tri(meth)acrylate, glycerol tri(meth)acrylate and EO-, PO-, and epichlorohydrin-modified products thereof, isocyanuric acid EO-modified tri (meth)acrylate (e.g. ARONIX M-315 (product name; manufactured by: TOAGOSEI Co., Ltd.), tris(meth)acryloyl oxyethyl phosphate, phthalic acid-hydrogen-(2,2,2-tri-(meth)acryloyloxymethyl)ethyl, and glycerol tri(meth)acrylate and EO-, PO-, and epichlorohydrin-modified products thereof; tetrafunctional (meth)acrylate compounds such as pentaerythritol tetra(meth)acrylate and EO-, PO-, and epichlorohydrin-modified products thereof, and ditrimethylolpropane tetra(meth)acrylate; pentafunctional (meth)acrylate compounds such as dipentaerythritol penta(meth)acrylate and EO-, PO-, epichlorohydrin-, fatty acid-, alkyl-, and urethane-modified products thereof; hexafunctional(meth)acrylate compounds such as dipentaerythritol hexa(meth)acrylate and EO-, PO-, epichlorohydrin-, fatty acid-, alkyl-, and urethane-modified products thereof, and sorbitol hexa (meth)acrylate and EO-, PO-, epichlorohydrin-, fatty acid-, alkyl-, and urethane-modified products thereof.

As an acrylate resin of trifunctional or more, a commercial product can be used. The specific examples include KAYARAD and KAYAMER series such as DPHA, PET30, GP0303, TMPTA, THE330, TPA330, D310, D330, PM2, PM21, DPCA20, DPCA30, DPCA60 and DPCA120 (product names; manufactured by NIPPON KAYAKU CO., LTD.); ARONIX series such as M305, M309, M310, M315, M320, M327, M350, M360, M402, M408, M450, M7100, M7300K, M8030, M8060, M8100, M8530, M8560 and M9050 (product names; manufactured by Toagosei Co., Ltd.); NK ester series such as TMPT, A-TMPT, A-TMM-3, A-TMM3L, A-TMMT, A-TMPT-6EO, A-TMPT-3CL, A-GLY-3E, A-GLY-6E, A-GLY-9E, A-GLY-11E, A-GLY-18E, A-GLY-20E, A-9300, AD-TMP-4CL and AD-TMP (product names; manufactured by Shin-Nakamura Chemical Co., Ltd.); NK ECONOMER series such as ADP51, ADP33, ADP42, ADP26 and ADP15 (product names; manufactured by Shin-Nakamura Chemical Co., Ltd.); New Frontier series such as TMPT, TMP3, TMP15, TMP2P, TMP3P, PET3 and TEICA (product names; manufactured by Dai-ichi Kogyo Seiyaku Co., Ltd).; Ebecryl series such as TMPTA, TMPTAN, 160, TMPEOTA, OTA480, 53, PETIA, 2047, 40, 140, 1140, PETAK and DPHA (product names; manufactured by Daicel-Cytec Co., Ltd.); an CD501, CD9021, CD9052, SR351, SR351HP, SR351LV, SR368, SR368D, SR415, SR444, SR454, SR454HP, SR492, SR499, SR502, SR9008, SR9012, SR9020, SR9020HP, SR9035, CD9051, SR350, SR9009, SE9011, SR295, SR355, SR399, SR399LV, SR494 and SR9041 (product names; manufacture by Sartomer Company, Inc.).

The examples of (meth)acrylate oligomers (or prepolymers) include epoxy(meth)acrylate obtained by addition reaction of glycidyl ether with (meth)acrylic acid or a monomer having a carboxylic acid base; urethane(meth)acrylate obtained by addition reaction of a reactant of polyol and polyisocyanate with (meth)acrylate having a hydroxyl group; polyester acrylate obtained by esterification of polyester polyol obtained from polyol and polyprotic acid with (meth)acrylic acid; and polybutadiene (meth)acrylate which is a (meth)acrylic compound having polybutadiene or a hydrogenated butadiene skeleton. If the reactive functional groups (c) are polymerizable unsaturated groups, urethane(meth)acrylate is particularly suitably used since it can impart hardness and flexibility to a cured layer.

Examples of glycidyl ether used in the epoxy (meth)acrylates include 1,6-hexanediglycidyl ether, polyethyleneglycol glycidyl ether, bisphenol A type epoxy resins, naphthalene type epoxy resins, cardo epoxy resins, glycerol triglycidyl ether and phenolic novolac type epoxy resins.

Examples of polyol used in the urethane(meth)acrylate include 1,6-hexanediglycidyl ether, polyethylene glycol, polypropylene glycol, polytetramethylene glycol, polycaprolactone diol, polycarbonate diol, polybutadiene polyol and polyester diol. Examples of polyisocyanate used in the urethane(meth)acrylate include tolylene diisocyanate, xylylene diisocyanate, diphenylmethane diisocyanate, tetramethylxylene diisocyanate, hexamethylene diisocyanate, isophorone diisocyanate and dicyclohexylmethane diisocyanate. Examples of (meth)acrylate having a hydroxyl group used in the urethane(meth)acrylate include 2-hydroxyethyl(meth)acrylate, 2-hydroxypropyl(meth)acrylate, 4-hydroxybutyl (meth)acrylate, pentaerythritol(meth)acrylate and caprolactone-modified 2-hydroxyethyl(meth)acrylate.

Examples of polyol used to produce the polyester polyol used in the polyester acrylates include ethylene glycol, polyethylene glycol, propylene glycol, polypropylene glycol, neopentyl glycol, 1,4-butanediol, trimethylolpropane and pentaerythritol. Examples of the polyprotic acid include succinic acid, adipic acid, sebacic acid, phthalic acid, isophthalic acid, terephthalic acid, trimellitic acid and pyromellitic acid.

As the compound (E) used in the present invention, a polymer represented by the following chemical formula (5) and having a molecular weight of less than 10,000 may be also used.

Chemical formula (5)

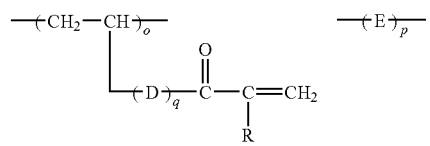

wherein D denotes a linking group having 1 to 10 carbon atoms; q denotes 0 or 1; R denotes a hydrogen atom or methyl group; E denotes the polymeric unit of an optional vinyl monomer and may comprise a single component or a plurality of components; each of o and p denotes mol % of each polymeric unit; and p may be 0.

D in the chemical formula (5) denotes a linking group having 1 to 10 carbon atoms, preferably a linking group having 1 to 6 carbon atoms, more preferably a linking group having 2 to 4 carbon atoms. D may have a straight-chain, branched or cyclic structure. D may have a hetero atom selected from O, N and S.

Preferred examples of the linking group D in the chemical formula (5) include *—$(CH_2)_2$—O—**, *—$(CH_2)_2$—NH—**, *—$(CH_2)_4$—O—**, *—$(CH_2)_6$—O—**, *—$(CH_2)$—O—$(CH)_2$—O—**, *—CONH—$(CH_2)_3$—O—**, *—$CH_2CH(OH)CH_2$—O—** and *—$CH_2CH_2OCONH(CH_2)_3$—O—**. The * used here represents a site linked to the main chain of the polymer, and the ** represents a site linked to a (meth)acryloyl group.

In the chemical formula (5), R denotes a hydrogen atom or methyl group. From the viewpoint of curing reactivity, R is preferably a hydrogen atom.

In the chemical formula (5), o may be 100 mol %, that is, a single polymer. Also, o may be 100 mol % or a copolymer produced by mixing two or more kinds of polymeric units which are represented by o mol and contain a (meth) acryloyl group. The ratio of o to p is not particularly limited and may be appropriately selected from the viewpoints of hardness, solubility in a solvent, optical transparency, etc.

In the chemical formula (5), E means the polymeric unit of an optional vinyl monomer. E is not particularly limited and may be appropriately selected from the viewpoints of hardness, solubility in a solvent, optical transparency, etc. Furthermore, E may comprise a single vinyl monomer or a plurality of vinyl monomers depending on the intended purpose.

Examples of the vinyl monomer include vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether and allyl vinyl ether; vinyl esters such as vinyl acetate, vinyl propionate and vinyl butyrate; (meth)acrylates such as methyl (meth)acrylate, ethyl(meth)acrylate, hydroxyethyl(meth) acrylate, glycidyl methacrylate, allyl(meth)acrylate and (meth)acryloyloxypropyltrimethoxysilane; styrene derivatives such as styrene and p-hydroxymethylstyrene; unsaturated carboxylic acids such as crotonic acid, maleic acid and itaconic acid; and derivatives thereof.

As the compound (E), reactive oligomers may be used, which have a weight average molecular weight of less than 10,000 and an ethylenically unsaturated bond at the end positions thereof or as a side chain thereof. Examples of the reactive oligomers include resins having, as the framework component, any of poly(methyl(meth)acrylate), polystyrene, poly(butyl (methacrylate), poly(acrylonitrile/styrene), poly (2-hydroxymethyl(meth)acrylate/methyl(meth)acrylate), poly(2-hydroxymethyl(meth)acrylate/butyl(meth)acrylate), and copolymers of these resins with a silicone resin.

As the above-mentioned compounds, commercial products may be used. Examples of urethane acrylates which have a weight average molecular weight of less than 10,000 and two or more polymerizable unsaturated groups include AH-600, AT-600, UA-306H, UA-306T and UA-3061 (product names; manufactured by: Kyoeisha Chemical Co., Ltd.). Among the above, examples of urethane(meth)acrylate that is suitably used in combination with the polymer (D) of the present invention include urethane(meth)acrylate which is obtained by the reaction between a monomer or multimer of isophorone diisocyanate, pentaerythritol polyfunctional acrylate and dipentaerythritol polyfunctional acrylate. Commercial products of the urethane(meth)acrylate include, for example, UV-1700B (product name; manufactured by: Nippon Synthetic Chemical Industry Co., Ltd.).

As the urethane(meth)acrylate resins, commercial products may be used. The specific examples include UV series such as UV1700B, UV6300B, UV765B, UV7640B and UV7600B (product names; manufactured by: Nippon Synthetic Chemical Industry Co., Ltd.); ART RESIN series such as ART RESINHDP, ART RESINUN9000H, ART RESINUN3320HA, ART RESINUN3320HB, ART RESINUN3320HC, ART RESINUN3320HS, ART RESINUN901M, ART RESINUN902MS and ART RESINUN903 (product names; manufactured by: Negami Kogyo Industries Co., Ltd.); UA100H, U4H, U6H, U15HA, UA32P, U6LPA, U324A and U9HAMI (product names; manufactured by: Shin-Nakamura Chemical Co., Ltd.); Ebecryl series such as 1290, 5129, 254, 264, 265, 1259, 1264, 4866, 9260, 8210, 204, 205, 6602, 220 and 4450 (product names; manufactured by: Daicel-Cytec Co., Ltd.); BEAMSET series such as 371, 371MLV, 371S, 577, 577BV and 577AK (product names; manufactured by: Arakawa Chemical Industries, Ltd.); RQ series manufactured by Mitsubishi Rayon Co., Ltd.; UNIDIC series manufactured by DIC CORPORATION; DPHA40H (product name; manufactured by: NIPPON KAYAKU CO., LTD.); and CN9006 and CN968 (product names; manufactured by: Sartomer Company, Inc.). Among the above, UV1700B (product name; manufactured by: Nippon Synthetic Chemical Industry Co., Ltd.), DPHA40H (product name; manufactured by: NIPPON KAYAKU CO., LTD.), ART RESINHDP (product name; manufactured by: Negami Kogyo Industries Co., Ltd.), BEAMSET 371 and BEAMSET 577 (product names; manufactured by: Arakawa Chemical Industries, Ltd.) and U15HA (product name; manufactured by: Shin-Nakamura Chemical Co., Ltd.) are preferable.

Examples of epoxy acrylates that have a weight average molecular weight of less than 10,000 and two or more polymerizable unsaturated groups include SP series such as SP-4060 and SP-1450 and VR series such as VR-60, VR-1950, VR-90 and VR-1100 (product names; manufactured by: Showa Highpolymer Co., Ltd.); UV-9100B and UV-9170B (product names; manufactured by: Nippon Synthetic Chemical Industry Co., Ltd.); and EA-6320/PGMAc and EA-6340/PGMAc (product names; manufactured by: Shin-Nakamura Chemical Co., Ltd.).

Examples of reactive oligomers that have a weight average molecular weight of less than 10,000 and two or more polymerizable unsaturated groups include Macromonomer series such as AA-6, AS-6, AB-6, and AA-714SK (product names; manufactured by: TOAGOSEI Co., Ltd.).

In consideration of curling and cracking properties of the hard coat layer, a compound which comprises the same repeating unit as that of the chemical formula (5) and has a molecular weight of 10,000 or more and less than 100,000 may be added as the binder component (C).

Examples of the binder component (C) having a molecular weight of 10,000 or more and less than 100,000 include BS371, BS371MLV, DK1, DK2 and DK3 (product names; manufactured by: Arakawa Chemical Industries, Ltd.).

(Other Components)

In addition to the above components, a solvent, polymerization initiator, anti-static agent, anti-glare agent, etc., may be appropriately added to the curable resin composition for a hard coat layer. Furthermore, the composition may be mixed with various kinds of additives such as a reactive or non-reactive leveling agent and various kinds of sensitizers. In the case of containing an anti-static agent and/or anti-glare agent, anti-static properties and/or anti-glare properties may be further imparted to the hard coat layer.

(Solvent)

The solvent is not particularly limited. From the viewpoint of increasing the hardness of the hard coat film, an impenetrable solvent is preferable. Herein, penetration means dissolving or swelling the transparent substrate.

In the case that the transparent substrate film is a triacetyl cellulose film (TAC film), specific examples of the impenetrable solvent include methyl isobutyl ketone, propylene glycol monomethyl ether, n-propanol, isopropanol, n-butanol, sec-butanol, isobutanol and tert-butanol.

(Polymerization Initiator)

To initiate or promote the polymerization of the above-mentioned radical polymerizable functional group or cationic polymerizable functional group, a radical polymerization initiator, a cationic polymerization initiator, a radical and cationic polymerization initiator or the like may be appropriately selected for use, if necessary. These polymerization initiators decompose by light irradiation and/or heating to produce radicals or cations, thereby promoting radical polymerization or cationic polymerization.

The radical polymerization initiator may be any radical polymerization initiator capable of releasing a substance which can initiate radical polymerization by light irradiation and/or heating. Examples of photo-radical polymerization initiators include imidazole derivatives, bisimidazole derivatives, N-aryl glycine derivatives, organic azide compounds, titanocenes, aluminate complexes, organic peroxides, N-alkoxypyridinium salts and thioxanthone derivatives. Specific examples include 1,3-di(tert-butyldioxycarbonyl)benzophenone, 3,3',4,4'-tetrakis(tert-butyldioxycarbonyl)benzophenone, 3-phenyl-5-isoxazolone, 2-mercapto benzimidazole, bis(2,4,5-triphenyl)imidazole, 2,2-dimethoxy-1,2-diphenylethane-1-on (product name: Irgacure 651; manufactured by: Chiba Specialty Chemicals, Inc.), 1-hydroxy-cyclohexyl-phenyl-ketone (product name: Irgacure 184; manufactured by: Chiba Specialty Chemicals, Inc.), 2-benzyl-2-dimethylamino-1-(4-morpholinophenyl)-butane-1-on (product name: Irgacure 369; manufactured by: Chiba Specialty Chemicals, Inc.), bis($\eta$5-2,4-cyclopentadiene-1-yl)-bis(2,6-difluoro-3-(1H-pyrrole-1-yl)-phenyl)titanium) (product name: Irgacure 784; manufactured by: Chiba Specialty Chemicals, Inc.), but may not be limited thereto.

Commercial products besides the above may also be used. The specific examples include Irgacure 907, Irgacure 379, Irgacure 819, Irgacure 127, Irgacure 500, Irgacure 754, Irgacure 250, Irgacure 1800, Irgacure 1870, Irgacure OXE01, DAROCUR TPO and DAROCUR1173 (product names; manufactured by: Chiba Specialty Chemicals, Inc.); Speedcure MBB, Speedcure PBZ, Speedcure ITX, Speedcure CTX, Speedcure EDB, Esacure ONE, Esacure KIP150, Esacure KT046 (product names; manufactured by: DKSH Japan); and KAYACURE DETX-S, KAYACURE CTX, KAYACURE BMS and KAYACURE DMBI (product names; manufactured by NIPPON KAYAKU CO., LTD.).

The cationic polymerization initiator may be any cationic polymerization initiator capable of releasing a substance which can initiate cationic polymerization by light irradiation and/or heating. Examples of the cationic polymerization initiator include sulfonic esters, imide sulfonates, dialkyl-4-hydroxysulfonium salts, arylsulfonic acid-p-nitrobenzyl esters, silanol-aluminum complexes and ($\eta$6-benzene)($\eta$5-cyclopentadienyl)iron(II), and specific examples include benzointosylate, 2,5-dinitro benzyl tosylate and N-tosilphthalic imide, but may not be limited thereto.

Examples of the polymerization initiator that can be used as both radical polymerization initiator and cationic polymerization initiator include aromatic iodonium salts, aromatic sulfonium salts, aromatic diazonium salts, aromatic phosphonium salts, triazine compounds and iron arene complexes, and specific examples include iodonium salts such as chloride, bromide or borofluoride salts, hexafluorophosphate salts and hexafluoroantimonate salts of iodonium such as diphenyl iodonium, ditolyliodonium, bis(p-tert-butylphenyl)iodonium and bis(p-chlorophenyl)iodonium; sulfonium salts such as chloride, bromide or borofluoride salts, hexafluorophosphate salts and hexafluoroantimonate salts of sulfonium such as triphenylsulfonium, 4-tert-butyltriphenylsulfonium and tris(4-methylphenyl)sulfonium; and 2,4,6-substituted-1,3,5-triazine compounds such as 2,4,6-tris(trichloromethyl)-1,3,5-triazine, 2-phenyl-4,6-bis(trichloromethyl)-1,3,5-triazine and 2-methyl-4,6-bis(trichloromethyl)-1,3,5-triazine, but may not be limited thereto.

(Anti-Static Agent)

Specific examples of the anti-static agent include various kinds of cationic compounds having a cationic group, such as a quaternary ammonium salt, a pyridinium salt and a primary, secondary or tertiary amino group; anionic compounds having an anionic group such as a sulfonic acid base, a sulfuric ester base, a phosphoric ester base and a phosphonic acid base; amphoteric compounds such as an amino acid-based amphoteric compound and an aminosulfuric ester-based amphoteric compound; nonionic compounds such as an amino alcohol-based nonionic compound, a glycerin-based nonionic compound and a polyethylene glycol-based nonionic compound; organometallic compounds such as alkoxides of tin and titanium; and metal chelate compounds such as acetylacetonate salts of the organometallic compounds. Furthermore, compounds produced by increasing the molecular weight of the above compounds may also be mentioned. In addition, as the anti-static agent, there may be used monomers or oligomers which contain a tertiary amino group, quaternary ammonium group or metallic chelate moiety and are polymerizable upon exposure to ionizing radiation, or polymerizable compounds including organometallic compounds such as a coupling agent having a functional group polymerizable upon exposure to ionizing radiation.

As the anti-static agent, there may be also used electroconductive polymers. No particular limitation is imposed on the electroconductive polymers usable in the present invention, and there may be mentioned, for example, aromatic conjugated poly(paraphenylene), heterocyclic conjugated polypyrrole or polythiophene, aliphatic conjugated polyacetylene, heteroatom-containing conjugated polyaniline, mixed conjugated poly(phenylenevinylene), a multi-chain type conjugated system which is a conjugated system having a plurality of conjugated chain in a molecule thereof, and an electroconductive complex which is a polymer formed by graft- or block-copolymerization of said conjugated polymer chain with a saturated polymer.

Also, electroconductive fine particles can be exemplified as other examples of the anti-static agent. Specific examples of the electroconductive fine particles include fine particles of metal oxides. Such metal oxides include, for example, ZnO (refractive index: 1.90; hereinafter, each of the numerical values in parentheses refers to the refractive index), $CeO_2$ (1.95), $Sb_2O_2$ (1.71), $SnO_2$ (1.997), indium tin oxide (often abbreviated as ITO; 1.95), $In_2O_3$ (2.00), $Al_2O_3$ (1.63), antimony-doped tin oxide (abbreviated as ATO; 2.0) and aluminum-doped zinc oxide (abbreviated as AZO; 2.0). The average particle diameter of the electroconductive fine particles is preferably from 0.1 nm to 0.1 μm. By setting the average particle diameter in this range, the electroconductive fine particles dispersed in a binder gives a composition which is able to form a highly transparent layer which causes almost no haze and has excellent total light transmittance.

(Anti-Glare Agent)

As an anti-glare agent, there may be fine particles, the form of which may be a spherical form, an elliptic form, etc., preferably spherical form. There are inorganic and organic fine particles, in which one formed by organic material is preferable. The fine particles preferably have anti-glare properties and transparency. Specific examples of the fine particles include plastic beads, and one having transparency is preferable. Specific examples of the plastic beads include a styrene bead (refractive index: 1.59), a melamine bead (refractive index: 1.57), an acrylic bead (refractive index: 1.49), an acrylic-styrene bead (refractive index: 1.54), a polycarbonate bead and a polyethylene bead. The added amount of the fine particles is from 2 to 30 parts by weight, preferably from 10 to 25 parts by weight, with respect to 100 parts by weight of the resin composition.

(Leveling Agent)

The curable resin composition for the hard coat layer of the present invention may have a leveling agent added. Examples of preferred leveling agents include fluorine-contained and silicone-contained leveling agents. The curable resin composition for the hard coat layer having the leveling agent added can improve coatability toward the surface of a coating layer upon coating or drying, can impart slidability and anti-fouling properties as well as the effect of abrasion resistance.

The added amount of the leveling agent is preferably from 0 to 0.5 wt %, more preferably from 0 to 0.2 wt %, with respect to the total solid content of the curable resin composition for the hard coat layer.

As commercial products of the leveling agent, MEGAFACE F443, F444 and F445 (product names; manufactured by: DIC CORPORATION) can be exemplified.

(3) Other Layers

As described above, the hard coat film basically comprises the transparent substrate film and the hard coat layer. However, considering the functions and applications of the hard coat film, one or more layers that will be described below may be provided on the surface on the transparent substrate film side or on the side opposite to the transparent substrate film side of the hard coat layer, without departing from the scope of the present invention.

(Anti-Static Layer)

The anti-static layer comprises a cured product of a curable resin composition for an anti-static layer comprising an anti-static agent and a curable resin. The thickness of the anti-static layer is preferably from about 30 nm to about 3 μm.

As the anti-static agent, anti-static agents that are the same as those described in connection with the hard coat layer may be used.

(Anti-Glare Layer)

The anti-glare layer comprises a cured product of a curable resin composition for an anti-glare layer containing an anti-glare agent and a curable resin composition. The curable resin can be accordingly selected from known curable resins, which may be one or more kinds.

As the anti-glare agent, anti-glare agents that are the same as those described in connection with the hard coat layer may be used.

(Anti-Fouling Layer)

According to the preferred embodiment of the present invention, an anti-fouling layer may be provided for the purpose of preventing fouling of the outermost surface of the hard coat film. The anti-fouling layer can further improve anti-fouling properties and abrasion resistance of the hard coat film. The anti-fouling layer comprises a cured product of a curable resin composition for an anti-fouling layer containing an anti-fouling agent and a curable resin composition.

The anti-fouling agent and curable resin contained in the curable resin composition for the anti-fouling layer can be accordingly selected from known anti-fouling agents and curable resins, which may be one or more kinds.

(Low Refractive Index Layer)

The low refractive index layer is a layer which has a lower refractive index than that of a layer adjacent to the substrate side of the low refractive index layer. It comprises a cured product of a curable resin composition for a low refractive index layer. A known low refractive index curable resin or known fine particles may be appropriately used in the curable resin composition so that the low refractive index layer is imparted with a lower refractive index than that of said adjacent layer.

(Second Hard Coat Layer)

From the viewpoint of further increasing the hardness of the hard coat film, a second hard coat layer having a smooth surface may be provided on the transparent substrate film side of the hard coat layer.

As the second hard coat layer, one which is similar to the above-mentioned hard coat layer may be used, and these two hard coat layers may be the same with or different from each other in the composition.

<Method of Forming Hard Coat Layer>

The hard coat layer may be formed by any conventional method.

For example, the hard coat layer is formed by applying the curable resin composition for the hard coat layer on one side of the transparent substrate film, drying thus formed to coating layer if necessary, and curing the coating layer by applying light and/or heat.

In the case of forming the second hard coat film, the projection of the irregularly shaped silica fine particle from the interface of the hard coat layer may be accordingly adjusted to be less than 50 nm by kinds of solid contents and solvents contained in the curable resin composition for the hard coat layer, a method of drying a coating layer of the curable resin composition for the hard coat layer, and addition of the leveling agent.

For example, the projection height can be lowered by adding 0.5 wt % of the leveling agent with respect to the total solid content of the curable resin composition for the hard coat layer. Also, the projection height can be easily less than 50 nm by lowering the content of the reactive irregularly shaped silica fine particle (A) and the reactive silica fine particle (B).

The curable resin composition for the hard coat layer is prepared by mixing and dispersing the reactive irregularly shaped silica fine particle (A), the reactive silica fine particle (B), the binder component (C) and the polymerization initiator in the solvent according to a general preparation method. For mixing and dispersing, a paint shaker or a bead mill may be used.

The coating method is not particularly limited as long as it can uniformly apply the curable resin composition for the hard coat layer onto the surface of the transparent substrate film. For example, there may be used various kinds of methods such as a spin coating method, a dipping method, a spraying method, a slide coating method, a bar coating method, a roll coating method, a meniscus coating method, a flexo printing method, a screen printing method and a bead coater method.

The amount of the curable resin composition for the hard coat layer applied onto the transparent substrate film varies depending on the performance required for the hard coat film to be obtained. It may be appropriately adjusted so that the hard coat layer can have a thickness from 3 to 25 μm when dried, and is preferably at coverage of 3 g/m² to 30 g/m², more preferably 5 g/m² to 25 g/m².

As the drying method, for example, there may be drying under reduced pressure, drying by heating, or a combination thereof. In the case of drying at normal pressure, drying at a temperature from 30 to 110° C. is preferable. For example, in the case of using methyl isobutyl ketone as the solvent for the curable resin composition for the hard coat layer, the drying step is performed at a temperature in the range normally from room temperature to 80° C., preferably from 40° C. to 70° C., and for a time period from 20 seconds to 3 minutes, preferably from 30 seconds to 1 minute.

Next, the dried coating layer is cured by light irradiation and/or heating depending on the reactive functional groups of the reactive irregularly shaped silica fine particle (A), reactive silica fine particle (B) and binder component (C) contained in the curable resin composition, thereby, a hard coat layer comprising the cured product of the curable resin composition for the hard coat layer is formed.

For light radiation, mainly, UV, visible light, electron beam, ionizing radiation, etc. is used. In the case of UV curing, UV from ray of a super high pressure mercury lamp, high pressure mercury lamp, low pressure mercury lamp, carbon-arc lamp, xenon arc lamp or metalhallide lamp is used. The dose of energy beam source is about 50 to 5,000 mJ/cm² as the integral exposure amount at the UV wavelength of 365 nm.

In the case of heating after the light irradiation, the coating layer is heated normally at a temperature from 40° C. to 120° C. The coating layer may be left at room temperature (25° C.) for 24 hours or more to promote the reaction.

Also, in the above method of forming the hard coat layer, the hard coat layer may be formed by applying the curable resin composition for the hard coat layer on one side of the transparent substrate film, drying thus formed coating layer if necessary, contacting a smooth surface having a surface roughness Ra of 10 nm or less to the coating layer, curing the coating layer by light irradiation and/or heating, and peeling the smooth surface.

Specifically, after forming the coating layer of the curable resin composition for the hard coat layer on one side of the transparent substrate film, the smooth surface having a surface roughness Ra of 10 nm or less is contacted to the side opposite to the transparent substrate film side of the coating layer.

The smooth surface contacted to the coating layer has a surface roughness Ra of 10 nm or less, is not particularly limited, and can be selected taking workability, strength of smooth surface, economical efficiency and so on into consideration. For example, a smooth surface made of metal such as glass, chrome or iron can be used. From the viewpoint of strength and less likeliness of abrasion at repeated use, chrome is preferable. From the viewpoint of economical efficiency, an iron-made roller, the surface of which is plated with chrome is preferable.

Next, the hard coat layer comprising the cured product comprising the curable resin composition for the hard coat layer can be formed by curing the coating layer of the curable resin composition for the hard coat layer contacted with the smooth surface depending on the reactive functional groups of the reactive irregularly shaped silica fine particle (A), reactive silica fine particle (B) and binder component (C) contained in the curable resin composition by light irradiation and/or heating. Then, the smooth surface contacted to the surface on the side opposite to the transparent substrate film side of the hard coat layer is peeled, thereby, smoothness is imparted to the surface of the hard coat layer by surface roughness of 1 nm or less and abrasion resistance can be improved.

Also, in the method of forming the hard coat layer, undulation of the obtained hard coat film can be reduced by applying the curable resin composition for the hard coat layer on one side of the transparent substrate film, drying thus obtained coating layer if necessary, curing the coating layer by light in which the dose of energy beam source is 5 to 300 mJ/cm² as the integral exposure amount at the UV wavelength of 365 nm, and stretching the laminate in the width direction by tension which is 1/100 or more of that in the longitudinal direction using an expander before and after forming the hard coat layer.

The stretch in the width direction is preferably performed within about 700 mm from a radiation device at a place in which the temperature is decreased to atmosphere temperature.

Also, curling of the hard coat film can be decreased while maintaining the hardness of the hard coat film by feeding the hard coat film obtained in the above process between two rollers contacted to each other in the long axis direction while heating at 60 to 150° C. and applying pressure.

If the heating temperature is lower than 60° C., curling cannot be sufficiently decreased. If the heating temperature is higher than 150° C., the transparent substrate film may shrink.

The pressure of pressing may be adjusted according to the cured resin. The pressure is preferably from 300 to 2,000 kg/cm from the viewpoint of further decreasing curling. If the pressure is 300 kg/cm or more, curling can be sufficiently decreased. If the pressure exceeds 2,000 kg/cm, fracture may occur, thus it is not preferable.

In the above process, a method of passing the hard coat film is not particularly limited as long as the hard coat film can pass through two rollers contacted to each other in the long axis direction while applying heat and pressure as described above. Known methods used for pringing etc. can be used, for example, the press method or calendar method.

In addition, in the case of using a TAC film as the transparent substrate film, a solvent containing one or more main solvent selected from aceton, hexane, dimethyl glycol and methyl acetate, the total amount of the main solvents being 70 wt % or more with respect to the total amount of solvents, is preferably applied on the side opposite to the side where the hard coat layer is formed of the TAC film by a coating amount of 4 to 20 g/m². By applying the above solvent on the side opposite to the side where the hard coat layer is formed of the TAC film, curling of the hard coat film can be decreased while maintaining the hardness of the hard coat film.

If the total amount of the main solvents is less than 70 wt % with respect to the total amount of solvents, the hardness of the hard coat layer cannot be maintained.

The coating amount of the above solvent is from 4 to 20 g/m², preferably from 5 to 10 g/m². If the coating amount of the above solvent is less than 4 g/m², curling cannot be sufficiently decreased. If the coating amount of the above solvent exceeds 20 g/m², the hardness of the hard coat film may decrease.

Herein, the hardness is maintained means that when the hardness of the surface of the hard coat layer of a hard coat film not having the solvent coated and a hard coat film in which the above solvent is applied, dried in an oven at 80° C. for 1 minute and left for one day, in the pencil hardness test defined in JIS K5600-5-4 (1999) with a load of 500 g or 4.9 N using a pencil are compared, the evaluation of the pencil hardness test in the case of applying the solvent is not inferior to the evaluation in the case of not applying the solvent.

(Formation of Other Layer)

In the case of forming other layer on the transparent substrate film, other layer is formed by applying a curable resin composition of other layer before applying the curable resin composition for the hard coat layer, drying the composition and applying light and/or heat. Then, the curable resin composition for the hard coat layer is applied and cured to form the hard coat layer.

In the case of forming other layer on the hard coat layer, after forming the hard coat layer by applying and curing the curable resin composition for the hard coat layer, other layer may be provided by applying a curable resin composition of other layer, drying the composition, and applying light and/or heat.

Thus obtained hard coat film of the present invention can have a hardness of 5H or more in the pencil hardness test defined in JIS K5600-5-4 (1999) with a load of 500 g or 4.9 N even if the layer thickness of the hard coat layer is set in the range from 5 to 20 μm.

EXAMPLES

Hereinafter, the present invention will be explained in detail with reference to examples. The scope of the present invention may not be limited to the following examples.

Example A series are experimental examples related to the first and third hard coat films. Example B series are experimental examples related to the second hard coat film.

Example A Series

Example A1

(1) Preparation of Irregularly Shaped Silica Fine Particle 6,000 g of ion-exchanged water was added to 2,000 g of the silica fine particles (1) (product name: SI-550; manufactured by: JGC Catalysts and Chemicals Ltd.; average primary particle diameter: 5 nm; $SiO_2$ concentration: 20 wt %; Na in silica: 2,700 ppm), and then, 400 g of a cation-exchange resin (product name: SK-1BH; manufactured by: Mitsubishi Chemical Corporation) was added thereto followed by agitation for 1 hour for dealkalization. Next, after separating the cation-exchange resin, 400 g of an anion-exchange resin (product name: SANUPC; manufactured by: Mitsubishi Chemical Corporation) was added followed by agitation for 1 hour for deanionization. Another 400 g of the cation-exchange resin (product name: SK-1BH; manufactured by: Mitsubishi Chemical Corporation) was added thereto followed by agitation for 1 hour for dealkalization. Thus, a silica fine particle dispersion liquid having a $SiO_2$ concentration of 5 wt % was prepared. The Na content in the silica particles was 200 ppm.

Next, pH of the dispersion liquid was adjusted to pH4.0 by diluted hydrochloric acid followed by treatment in an autoclave at 200° C. for 1 hour. Then, a cation-exchange resin was added at room temperature followed by agitation for 1 hour for dealkalization. After separating the cation-exchange resin, an anion-exchange resin was added followed by agitation for 1 hour for deanionization. Thus, an irregularly shaped silica fine particle dispersion liquid having a $SiO_2$ concentration of 5 wt % was prepared. The average connectivity number of the irregularly shaped silica fine particle was 3.

Next, the $SiO_2$ concentration of the irregularly shaped silica fine particle dispersion liquid having a $SiO_2$ concentration of 5 wt % was concentrated to 10 wt %, and then, the solvent was substituted with methanol by the ultrafiltration membrane method. Thus, an irregularly shaped silica fine particle methanol dispersion liquid having a $SiO_2$ concentration of 10 wt % was prepared.

(2) Preparation of Reactive Irregularly Shaped Silica Fine Particle (A) (1)

1 part by weight of a methacrylic silane coupling agent (γ-methacryloxypropyltrimethoxysilane; product name: KBM-503; manufactured by: Shin-Etsu Chemical Co., Ltd.) was added to 93 parts by weight of the above-prepared irregularly shaped silica fine particle methanol dispersion liquid. After the whole liquid was adjusted to pH=4 with an HCl aqueous solution, heating and agitation were performed at 80° C. for 5 hours. Thus, a γ-methacryloxypropyltrimethoxysilane-treated silica fine particle in which a methacryloyl group is introduced on its surface (reactive irregularly shaped silica fine particle (A) (1)) was obtained. The solvent (methanol) of the prepared liquid was substituted to methyl isobutyl ketone (MIBK). Thus, a MIBK dispersion liquid of the reactive irregularly shaped silica fine particle (A) (1) having a solid content of 40 wt % was obtained.

(3) Preparation of Curable Resin Composition for Hard Coat Layer

Components of the following composition were compounded to prepare a curable resin composition for a hard coat layer.

<Composition of Curable Resin Composition for Hard Coat Layer>

Reactive irregularly shaped silica fine particle (A) (1): 150 parts by weight (solid content: 60 parts by weight)
DPHA (dipentaerythritol hexaacrylate) (manufactured by NIPPON KAYAKU CO., LTD.): 40 parts by weight
Irgacure 184 (product name; manufactured by: Chiba Specialty Chemicals, Inc.; radical polymerization initiator): 4 parts by weight
MIBK: 6 parts by weight (4) Production of Hard Coat Film As a transparent substrate film, a triacetate cellulose film (TAC film) having a layer thickness of 40 μm was used. On one side of the TAC film, the curable resin composition for the hard coat layer prepared in (3) was applied. Drying was performed at 70° C. for 60 seconds in a heat oven to evaporate a solvent in the coating layer, and ultraviolet ray was irradiated by integral exposure amount of 200 mJ/cm$^2$ to cure the coating layer. Thus, a hard coat film, a hard coat layer of which has a layer thickness of 15 μm, was produced.

Example A2

Similarly as Example A1, a hard coat film of Example A2 was produced except that, in the preparation of the irregularly shaped silica fine particle in Example A1, an irregularly shaped silica fine particle of Example A2 was prepared so that a silica fine particle has an average connectivity number of 5.

Example A3

Similarly as Example A1, a hard coat film of Example A3 was produced except that, in the preparation of the irregularly shaped silica fine particle in Example A1, an irregularly shaped silica fine particle of Example A3 was prepared so that a silica fine particle has an average connectivity number of 10.

Example A4

Similarly as Example A2, a hard coat film of Example A4 was produced except that, in the preparation of the curable resin composition for the hard coat layer in Example A2, DPHA was changed to UV-1700B (product name; manufactured by: Nippon Synthetic Chemical Industry Co., Ltd.; 10 functional; molecular weight: 2,000).

Example A5

Similarly as Example A2, a hard coat film of Example A5 was produced except that, in the preparation of the curable resin composition for the hard coat layer in Example A2, DPHA was changed to PETA (pentaerythritol triacrylate).

Example A6

Similarly as Example A2, a hard coat film of Example A6 was produced except that the curable resin composition for the hard coat layer was applied on one side of the TAC film to have a layer thickness of the hard coat layer of 20 μm.

Example A7

Similarly as Example A2, a hard coat film of Example A7 was produced except that components of the following composition were compounded to prepare a curable resin composition for a hard coat layer.
<Composition of Curable Resin Composition for Hard Coat Layer>
  Reactive irregularly shaped silica fine particle (A) (1): 75 parts by weight (solid content: 30 parts by weight)
  DPHA (dipentaerythritol hexaacrylate) (manufactured by NIPPON KAYAKU CO., LTD.): 70 parts by weight
  Irgacure 184 (product name; manufactured by: Chiba Specialty Chemicals, Inc.; radical polymerization initiator): 4 parts by weight
  MIBK: 51 parts by weight

Example A8

Similarly as Example A2, a hard coat film of Example A8 was produced except that components of the following composition were compounded to prepare a curable resin composition for a hard coat layer.
<Composition of Curable Resin Composition for Hard Coat Layer>
  Reactive irregularly shaped silica fine particle (A) (1): 175 parts by weight (solid content: 70 parts by weight)
  DPHA (dipentaerythritol hexaacrylate) (manufactured by NIPPON KAYAKU CO., LTD.): 30 parts by weight
  Irgacure 184 (product name; manufactured by: Chiba Specialty Chemicals, Inc.; radical polymerization initiator): 4 parts by weight

Example A9

(1) Preparation of Irregularly Shaped Silica Fine Particle 6,000 g of ion-exchanged water was added to 2,000 g of the silica fine particles (2) (product name: SI-20P; manufactured by: JGC Catalysts and Chemicals Ltd.; average primary particle diameter: 20 nm; $SiO_2$ concentration: 20 wt %), and then, 400 g of a cation-exchange resin (product name: SK-1BH; manufactured by: Mitsubishi Chemical Corporation) was added thereto followed by agitation for 1 hour for dealkalization. Next, after separating the cation-exchange resin, 400 g of an anion-exchange resin (product name: SANUPC; manufactured by: Mitsubishi Chemical Corporation) was added followed by agitation for 1 hour for deanionization. Another 400 g of the cation-exchange resin (product name: SK-1BH; manufactured by: Mitsubishi Chemical Corporation) was added thereto followed by agitation for 1 hour for dealkalization. Thus, a silica fine particle dispersion liquid having a $SiO_2$ concentration of 5 wt % was prepared. The Na content in the silica particles was 200 ppm.

Next, pH of the dispersion liquid was adjusted to pH4.0 by diluted hydrochloric acid followed by treatment in an autoclave at 200° C. for 1 hour. Then, a cation-exchange resin was added at room temperature followed by agitation for 1 hour for dealkalization. After separating the cation-exchange resin, an anion-exchange resin was added followed by agitation for 1 hour for deanionization. Thus, an irregularly shaped silica fine particle dispersion liquid having a $SiO_2$ concentration of 5 wt % was prepared. The average connectivity number of the irregularly shaped silica fine particle was 5.

Next, the $SiO_2$ concentration of the irregularly shaped silica fine particle dispersion liquid having a $SiO_2$ concentration of 5 wt % was concentrated to 10 wt %, and then, the solvent was substituted with methanol by the ultrafiltration membrane method. Thus, an irregularly shaped silica fine particle methanol dispersion liquid having a $SiO_2$ concentration of 10 wt % was prepared.

(2) Preparation of Reactive Irregularly Shaped Silica Fine Particle (A) (2)

1 part by weight of a methacrylic silane coupling agent (γ-methacryloxypropyltrimethoxysilane; product name: KBM-503; manufactured by: Shin-Etsu Chemical Co., Ltd.) was added to 93 parts by weight of the above-prepared irregularly shaped silica fine particle methanol dispersion liquid. After the whole liquid was adjusted to pH=4 with an HCl aqueous solution, heating and agitation were performed at 80° C. for 5 hours. Thus, a γ-methacryloxypropyltrimethoxysilane-treated silica fine particle in which a methacryloyl group is introduced on its surface (reactive irregularly shaped silica fine particle (A) (2)) was obtained. The solvent (methanol) of the prepared liquid was substituted to methyl isobutyl ketone (MIBK). Thus, a MIBK dispersion liquid of the reactive irregularly shaped silica fine particle (A) (2) having a solid content of 40 wt % was obtained.

(3) Preparation of Curable Resin Composition for Hard Coat Layer

Components of the following composition were compounded to prepare a curable resin composition for a hard coat layer.
<Composition of Curable Resin Composition for Hard Coat Layer>
  Reactive irregularly shaped silica fine particle (A) (2): 150 parts by weight (solid content: 60 parts by weight)
  DPHA (dipentaerythritol hexaacrylate) (manufactured by NIPPON KAYAKU CO., LTD.): 40 parts by weight
  Irgacure 184 (product name; manufactured by: Chiba Specialty Chemicals, Inc.; radical polymerization initiator): 4 parts by weight
  MIBK: 6 parts by weight

(4) Production of Hard Coat Film

As a transparent substrate film, a triacetate cellulose film (TAC film) having a layer thickness of 40 μm was used. On one side of the TAC film, the curable resin composition for the hard coat layer prepared in (3) was applied. Drying was performed at 70° C. for 60 seconds in a heat oven to evaporate a solvent in the coating layer, and ultraviolet ray was irradiated by integral exposure amount of 200 mJ/cm² to cure the coating layer. Thus, a hard coat film, a hard coat layer of which has a layer thickness of 20 μm, was produced.

Example A10

(1) Preparation of Irregularly Shaped Silica Fine Particle 6,000 g of ion-exchanged water was added to 2,000 g of the silica fine particles (3) (product name: SI-45P; manufactured by: JGC Catalysts and Chemicals Ltd.; average primary particle diameter: 45 nm; $SiO_2$ concentration: 20 wt %) and then, 400 g of a cation-exchange resin (product name: SK-1BH; manufactured by: Mitsubishi Chemical Corporation) was added thereto followed by agitation for 1 hour for dealkalization. Next, after separating the cation-exchange resin, 400 g of an anion-exchange resin (product name: SANUPC; manufactured by: Mitsubishi Chemical Corporation) was added followed by agitation for 1 hour for deanionization. Another 400 g of the cation-exchange resin (product name: SK-1BH; manufactured by: Mitsubishi Chemical Corporation) was added thereto followed by agitation for 1 hour for dealkalization. Thus, a silica fine particle dispersion liquid having a $SiO_2$ concentration of 5 wt % was prepared. The Na content in the silica particles was 200 ppm.

Next, pH of the dispersion liquid was adjusted to pH4.0 by diluted hydrochloric acid followed by treatment in an autoclave at 200° C. for 1 hour. Then, a cation-exchange resin was added at room temperature followed by agitation for 1 hour for dealkalization. After separating the cation-exchange resin, an anion-exchange resin was added followed by agitation for 1 hour for deanionization. Thus, an irregularly shaped silica fine particle dispersion liquid having a $SiO_2$ concentration of 5 wt % was prepared. The average connectivity number of the irregularly shaped silica fine particle was 5.

Next, the $SiO_2$ concentration of the irregularly shaped silica fine particle dispersion liquid having a $SiO_2$ concentration of 5 wt % was concentrated to 10 wt %, and then, the solvent was substituted with methanol by the ultrafiltration membrane method. Thus, an irregularly shaped silica fine particle methanol dispersion liquid having a $SiO_2$ concentration of 10 wt % was prepared.

(2) Preparation of Reactive Irregularly Shaped Silica Fine Particle (A) (3)

1 part by weight of a methacrylic silane coupling agent (γ-methacryloxypropyltrimethoxysilane; product name: KBM-503; manufactured by: Shin-Etsu Chemical Co., Ltd.) was added to 93 parts by weight of the above-prepared irregularly shaped silica fine particle methanol dispersion liquid. After the whole liquid was adjusted to pH=4 with an HCl aqueous solution, heating and agitation were performed at 80° C. for 5 hours. Thus, a γ-methacryloxypropyltrimethoxysilane-treated silica fine particle in which a methacryloyl group is introduced on its surface (reactive irregularly shaped silica fine particle (A) (3)) was obtained. The solvent (methanol) of the prepared liquid was substituted to methyl isobutyl ketone (MIBK). Thus, a MIBK dispersion liquid of the reactive irregularly shaped silica fine particle (A) (3) having a solid content of 40 wt % was obtained.

(3) Preparation of Curable Resin Composition for a Hard Coat Layer

Components of the following composition were compounded to prepare a curable resin composition for a hard coat layer.

<Composition of Curable Resin Composition for a Hard Coat Layer>
  Reactive irregularly shaped silica fine particle (A) (3): 150 parts by weight (solid content: 60 parts by weight)
  DPHA (dipentaerythritol hexaacrylate) (manufactured by NIPPON KAYAKU CO., LTD.): 40 parts by weight
  Irgacure 184 (product name; manufactured by: Chiba Specialty Chemicals, Inc.; radical polymerization initiator): 4 parts by weight
  MIBK: 6 parts by weight

(4) Production of Hard Coat Film

As a transparent substrate film, a triacetate cellulose film (TAC film) having a layer thickness of 40 μm was used. On one side of the TAC film, the curable resin composition for the hard coat layer prepared in (3) was applied. Drying was performed at 70° C. for 60 seconds in a heat oven to evaporate a solvent in the coating layer, and ultraviolet ray was irradiated by integral exposure amount of 200 mJ/cm² to cure the coating layer. Thus, a hard coat film, a hard coat layer of which has a layer thickness of 15 μm, was produced.

Example A11

(1) Preparation of Irregularly Shaped Silica Fine Particle 6,000 g of ion-exchanged water was added to 2,000 g of the silica fine particles (4) (product name: SI-80P; manufactured by: JGC Catalysts and Chemicals Ltd.; average primary particle diameter: 80 nm; $SiO_2$ concentration: 20 wt %), and then, 400 g of a cation-exchange resin (product name: SK-1BH; manufactured by: Mitsubishi Chemical Corporation) was added thereto followed by agitation for 1 hour for dealkalization. Next, after separating the cation-exchange resin, 400 g of an anion-exchange resin (product name: SANUPC; manufactured by: Mitsubishi Chemical Corporation) was added followed by agitation for 1 hour for deanionization. Another 400 g of the cation-exchange resin (product name: SK-1BH; manufactured by: Mitsubishi Chemical Corporation) was added thereto followed by agitation for 1 hour for dealkalization. Thus, a silica fine particle dispersion liquid having a $SiO_2$ concentration of 5 wt % was prepared. The Na content in the silica particles was 200 ppm.

Next, pH of the dispersion liquid was adjusted to pH4.0 by diluted hydrochloric acid followed by treatment in an autoclave at 200° C. for 1 hour. Then, a cation-exchange resin was added at room temperature followed by agitation for 1 hour for dealkalization. After separating the cation-exchange resin, an anion-exchange resin was added followed by agitation for 1 hour for deanionization. Thus, an irregularly shaped silica fine particle dispersion liquid having a $SiO_2$ concentration of 5 wt % was prepared. The average connectivity number of the irregularly shaped silica fine particle was 5.

Next, the $SiO_2$ concentration of the irregularly shaped silica fine particle dispersion liquid having a $SiO_2$ concentration of 5 wt % was concentrated to 10 wt %, and then, the solvent was substituted with methanol by the ultrafiltration membrane method. Thus, an irregularly shaped silica fine particle methanol dispersion liquid having a $SiO_2$ concentration of 10 wt % was prepared.

(2) Preparation of Reactive Irregularly Shaped Silica Fine Particle (A) (4)

1 part by weight of a methacrylic silane coupling agent (γ-methacryloxypropyltrimethoxysilane; product name: KBM-503; manufactured by: Shin-Etsu Chemical Co., Ltd.) was added to 93 parts by weight of the above-prepared irregularly shaped silica fine particle methanol dispersion liquid. After the whole liquid was adjusted to pH=4 with an HCl aqueous solution, heating and agitation were performed at 80° C. for 5 hours. Thus, a γ-methacryloxypropyltrimethoxysilane-treated silica fine particle in which a methacryloyl group is introduced on its surface (reactive irregularly shaped silica fine particle (A) (4)) was obtained. The solvent (methanol) of the prepared liquid was substituted to methyl isobutyl ketone (MIBK). Thus, a MIBK dispersion liquid of the reactive irregularly shaped silica fine particle (A) (4) having a solid content of 40 wt % was obtained.

(3) Preparation of Curable Resin Composition for Hard Coat Layer

Components of the following composition were compounded to prepare a curable resin composition for a hard coat layer.
<Composition of Curable Resin Composition for Hard Coat Layer>
  Reactive irregularly shaped silica fine particle (A) (4): 150 parts by weight (solid content: 60 parts by weight)
  DPHA (dipentaerythritol hexaacrylate) (manufactured by NIPPON KAYAKU CO., LTD.): 40 parts by weight
  Irgacure 184 (product name; manufactured by: Chiba Specialty Chemicals, Inc.; radical polymerization initiator): 4 parts by weight
  MIBK: 6 parts by weight (4) Production of Hard Coat Film As a transparent substrate film, a triacetate cellulose film (TAC film) having a layer thickness of 40 μm was used. On one side of the TAC film, the curable resin composition for the hard coat layer prepared in (3) was applied. Drying was performed at 70° C. for 60 seconds in a heat oven to evaporate a solvent in the coating layer, and ultraviolet ray was irradiated by integral exposure amount of 200 mJ/cm² to cure the coating layer. Thus, a hard coat film, a hard coat layer of which has a layer thickness of 15 μm, was produced.

Example A12

(1) Preparation of Irregularly Shaped Silica Fine Particle 6,000 g of ion-exchanged water was added to 2,000 g of the silica fine particles (5) (product name: SNOWTEX ZL; manufactured by Nissan Chemical Industries, Ltd.; average primary particle diameter: 100 nm; pH9 to 10), and then, 400 g of a cation-exchange resin (product name: SK-1BH; manufactured by: Mitsubishi Chemical Corporation) was added thereto followed by agitation for 1 hour for dealkalization. Next, after separating the cation-exchange resin, 400 g of an anion-exchange resin (product name: SANUPC; manufactured by: Mitsubishi Chemical Corporation) was added followed by agitation for 1 hour for deanionization. Another 400 g of the cation-exchange resin (product name: SK-1BH; manufactured by: Mitsubishi Chemical Corporation) was added thereto followed by agitation for 1 hour for dealkalization. Thus, a silica fine particle dispersion liquid having a $SiO_2$ concentration of 5 wt % was prepared. The Na content in the silica particles was 200 ppm.

Next, pH of the dispersion liquid was adjusted to pH4.0 by diluted hydrochloric acid followed by treatment in an autoclave at 200° C. for 1 hour. Then, a cation-exchange resin was added at room temperature followed by agitation for 1 hour for dealkalization. After separating the cation-exchange resin, an anion-exchange resin was added followed by agitation for 1 hour for deanionization. Thus, an irregularly shaped silica fine particle dispersion liquid having a $SiO_2$ concentration of 5 wt % was prepared. The average connectivity number of the irregularly shaped silica fine particle was 5.

Next, the $SiO_2$ concentration of the irregularly shaped silica fine particle dispersion liquid having a $SiO_2$ concentration of 5 wt % was concentrated to 10 wt %, and then, the solvent was substituted with methanol by the ultrafiltration membrane method. Thus, an irregularly shaped silica fine particle methanol dispersion liquid having a $SiO_2$ concentration of 10 wt % was prepared.

(2) Preparation of Reactive Irregularly Shaped Silica Fine Particle (A) (5)

1 part by weight of a methacrylic silane coupling agent (γ-methacryloxypropyltrimethoxysilane; product name: KBM-503; manufactured by: Shin-Etsu Chemical Co., Ltd.) was added to 93 parts by weight of the above-prepared irregularly shaped silica fine particle methanol dispersion liquid. After the whole liquid was adjusted to pH=4 with an HCl aqueous solution, heating and agitation were performed at 80° C. for 5 hours. Thus, a γ-methacryloxypropyltrimethoxysilane-treated silica fine particle in which a methacryloyl group is introduced on its surface (reactive irregularly shaped silica fine particle (A) (5)) was obtained. The solvent (methanol) of the prepared liquid was substituted to methyl isobutyl ketone (MIBK). Thus, a MIBK dispersion liquid of the reactive irregularly shaped silica fine particle (A) (5) having a solid content of 40 wt % was obtained.

(3) Preparation of Curable Resin Composition for Hard Coat Layer

Components of the following composition were compounded to prepare a curable resin composition for a hard coat layer.
<Composition of Curable Resin Composition for Hard Coat Layer>
  Reactive irregularly shaped silica fine particle (A) (5): 150 parts by weight (solid content: 60 parts by weight)
  DPHA (dipentaerythritol hexaacrylate) (manufactured by NIPPON KAYAKU CO., LTD.): 40 parts by weight
  Irgacure 184 (product name; manufactured by: Chiba Specialty Chemicals, Inc.; radical polymerization initiator): 4 parts by weight
  MIBK: 6 parts by weight (4) Production of Hard Coat Film As a transparent substrate film, a triacetate cellulose film (TAC film) having a layer thickness of 40 μm was used. On one side of the TAC film, the curable resin composition for the hard coat layer prepared in (3) was applied. Drying was performed at 70° C. for 60 seconds in a heat oven to evaporate a solvent in the coating layer, and ultraviolet ray was irradiated by integral exposure amount of 200 mJ/cm$^2$ to cure the coating layer. Thus, a hard coat film, a hard coat layer of which has a layer thickness of 15 μm, was produced.

Example A13

(1) Preparation of Irregularly Shaped Silica Fine Particle 6,000 g of ion-exchanged water was added to 2,000 g of the silica fine particles (6) (product name: SI-20P; manufactured by: JGC Catalysts and Chemicals Ltd.; average primary particle diameter: 20 nm; SiO$_2$ concentration: 20 wt %), and then, 400 g of a cation-exchange resin (product name: SK-1BH; manufactured by: Mitsubishi Chemical Corporation) was added thereto followed by agitation for 1 hour for dealkalization. Next, after separating the cation-exchange resin, 400 g of an anion-exchange resin (product name: SAN-UPC; manufactured by: Mitsubishi Chemical Corporation) was added followed by agitation for 1 hour for deanionization. Another 400 g of the cation-exchange resin (product name: SK-1BH; manufactured by: Mitsubishi Chemical Corporation) was added thereto followed by agitation for 1 hour for dealkalization. Thus, a silica fine particle dispersion liquid having a SiO$_2$ concentration of 5 wt % was prepared. The Na content in the silica particles was 200 ppm.

Next, pH of the dispersion liquid was adjusted to pH4.0 by diluted hydrochloric acid followed by treatment in an autoclave at 200° C. for 1 hour. Then, a cation-exchange resin was added at room temperature followed by agitation for 1 hour for dealkalization. After separating the cation-exchange resin, an anion-exchange resin was added followed by agitation for 1 hour for deanionization. Thus, an irregularly shaped silica fine particle dispersion liquid having a SiO$_2$ concentration of 5 wt % was prepared. The average connectivity number of the irregularly shaped silica fine particle was 3.5.

Next, the SiO$_2$ concentration of the irregularly shaped silica fine particle dispersion liquid having a SiO$_2$ concentration of 5 wt % was concentrated to 10 wt %, and then, the solvent was substituted with methanol by the ultrafiltration membrane method. Thus, an irregularly shaped silica fine particle methanol dispersion liquid having a SiO$_2$ concentration of 10 wt % was prepared.

(2) Preparation of Reactive Irregularly Shaped Silica Fine Particle (A) (6)

1 part by weight of a methacrylic silane coupling agent (γ-methacryloxypropyltrimethoxysilane; product name: KBM-503; manufactured by: Shin-Etsu Chemical Co., Ltd.) was added to 93 parts by weight of the above-prepared irregularly shaped silica fine particle methanol dispersion liquid. After the whole liquid was adjusted to pH=4 with an HCl aqueous solution, heating and agitation were performed at 80° C. for 5 hours. Thus, a γ-methacryloxypropyltrimethoxysilane-treated silica fine particle in which a methacryloyl group is introduced on its surface (reactive irregularly shaped silica fine particle (A) (6)) was obtained. The solvent (methanol) of the prepared liquid was substituted to methyl isobutyl ketone (MIBK). Thus, a MIBK dispersion liquid of the reactive irregularly shaped silica fine particle (A) (6) having a solid content of 40 wt % was obtained.

(3) Preparation of Curable Resin Composition for Hard Coat Layer

Components of the following composition were compounded to prepare a curable resin composition for a hard coat layer.

<Composition of Curable Resin Composition for Hard Coat Layer>
Reactive irregularly shaped silica fine particle (A) (6): 55 parts by weight (solid content: 22 parts by weight)
DPHA (dipentaerythritol hexaacrylate) (manufactured by NIPPON KAYAKU CO., LTD.): 78 parts by weight
Irgacure 184 (product name; manufactured by: Chiba Specialty Chemicals, Inc.; radical polymerization initiator): 4 parts by weight
MIBK: 6 parts by weight (4) Production of Hard Coat Film As a transparent substrate film, a triacetate cellulose film (TAC film) having a layer thickness of 40 μm was used. On one side of the TAC film, the curable resin composition for the hard coat layer prepared in (3) was applied. Drying was performed at 70° C. for 60 seconds in a heat oven to evaporate a solvent in the coating layer, and ultraviolet ray was irradiated by integral exposure amount of 200 mJ/cm$^2$ to cure the coating layer. Thus, a hard coat film, a hard coat layer of which has a layer thickness of 15 μm, was produced.

Example A14

Similarly as Example A13, a hard coat film of Example A14 was produced except that, in the preparation of the curable resin composition for the hard coat layer in Example A13, DPHA was changed to PETA.

Example A15

Similarly as Example A13, a hard coat film of Example A15 was produced except that the curable resin composition for the hard coat layer was applied on one side of the TAC film to have a layer thickness of the hard coat layer of 20 μm.

Example A16

Similarly as Example A13, a hard coat film of Example A16 was produced except that components of the following composition were compounded to prepare a curable resin composition for a hard coat layer, and the curable resin composition for the hard coat layer was applied on one side of a TAC film to have a layer thickness of the hard coat layer of 10 μm.

<Composition of Curable Resin Composition for Hard Coat Layer>
Reactive irregularly shaped silica fine particle (A) (6): 92.5 parts by weight (solid content: 37 parts by weight)
DPHA (dipentaerythritol hexaacrylate) (manufactured by NIPPON KAYAKU CO., LTD.): 63 parts by weight
Irgacure 184 (product name; manufactured by: Chiba Specialty Chemicals, Inc.; radical polymerization initiator): 4 parts by weight
MIBK: 6 parts by weight Example A17

Similarly as Example A16, a hard coat film of Example A17 was produced except that the curable resin composition for the hard coat layer was applied on one side of a TAC film to have a layer thickness of the hard coat layer of 12 μm.

Example A18

Similarly as Example A16, a hard coat film of Example A18 was produced except that the curable resin composition for the hard coat layer was applied on one side of the TAC film to have a layer thickness of the hard coat layer of 15 μm.

Example A19

Similarly as Example A18, a hard coat film of Example A19 was produced except that, in the preparation of the curable resin composition for the hard coat layer in Example A18, DPHA was changed to PETA.

Example A20

Similarly as Example A16, a hard coat film of Example A20 was produced except that the curable resin composition for the hard coat layer was applied on one side of the TAC film to have a layer thickness of the hard coat layer of 20 μm.

Example A21

Similarly as Example A13, a hard coat film of Example A21 was produced except that components of the following composition were compounded to prepare a curable resin composition for a hard coat layer, and the curable resin composition for the hard coat layer was applied on one side of the TAC film to have a layer thickness of the hard coat layer of 5 μm.
<Composition of Curable Resin Composition for Hard Coat Layer>
  Reactive irregularly shaped silica fine particle (A) (6): 150 parts by weight (solid content: 60 parts by weight)
  DPHA (dipentaerythritol hexaacrylate) (manufactured by NIPPON KAYAKU CO., LTD.): 40 parts by weight
  Irgacure 184 (product name; manufactured by: Chiba Specialty Chemicals, Inc.; radical polymerization initiator): 4 parts by weight
  MIBK: 6 parts by weight Example A22

Similarly as Example A21, a hard coat film of Example A22 was produced except that the curable resin composition for the hard coat layer was applied on one side of the TAC film to have a layer thickness of the hard coat layer of 7.5 μm.

Example A23

Similarly as Example A21, a hard coat film of Example A23 was produced except that the curable resin composition for the hard coat layer was applied on one side of the TAC film to have a layer thickness of the hard coat layer of 10 μm.

Example A24

Similarly as Example A21, a hard coat film of Example A24 was produced except that the curable resin composition for the hard coat layer was applied on one side of a TAC film to have a layer thickness of the hard coat layer of 12 μm.

Example A25

Similarly as Example A21, a hard coat film of Example A25 was produced except that the curable resin composition for the hard coat layer was applied on one side of the TAC film to have a layer thickness of the hard coat layer of 15 μm.

Example A26

Similarly as Example A25, a hard coat film of Example A26 was produced except that, in the preparation of the curable resin composition for the hard coat layer in Example A25, DPHA was changed to BEAMSET DK1 (product name; manufactured by: Arakawa Chemical Industries, Ltd.; 30 functional or more; average molecular weight: 20,000).

Example A27

Similarly as Example A25, a hard coat film of Example A27 was produced except that, in the preparation of the curable resin composition for the hard coat layer in Example A25, DPHA was changed to UV-1700B (product name; manufactured by: Nippon Synthetic Chemical Industry Co., Ltd.; 10 functional, molecular weight: 2,000).

Example A28

Similarly as Example A21, a hard coat film of Example A28 was produced except that the curable resin composition for the hard coat layer was applied on one side of the TAC film to have a layer thickness of the hard coat layer of 20 μm.

Example A29

Similarly as Example A13, a hard coat film of Example A29 was produced except that components of the following composition were compounded to prepare a curable resin composition for a hard coat layer.
<Composition of Curable Resin Composition for Hard Coat Layer>
  Reactive irregularly shaped silica fine particle (A) (6): 113 parts by weight (solid content: 45 parts by weight)
  Reactive silica fine particle (B) (product name: MIBK-SD; manufactured by: Nissan Chemical Industries, Ltd.; average primary particle diameter: 12 nm; solid content 30%; MIBK solvent; reactive functional group (a'): a methacrylate group): 50 parts by weight (solid content: 15 parts by weight)
  DPHA (dipentaerythritol hexaacrylate) (manufactured by NIPPON KAYAKU CO., LTD.): 40 parts by weight
  Irgacure 184 (product name; manufactured by: Chiba Specialty Chemicals, Inc.; radical polymerization initiator): 4 parts by weight
  MIBK: 6 parts by weight Example A30

Similarly as Example A13, a hard coat film of Example A30 was produced except that components of the following composition were compounded to prepare a curable resin composition for a hard coat layer, and the curable resin composition for the hard coat layer was applied on one side of the TAC film to have a layer thickness of the hard coat layer of 12 μm.
<Composition of Curable Resin Composition for Hard Coat Layer>
  Reactive irregularly shaped silica fine particle (A) (6): 175 parts by weight (solid content: 70 parts by weight)
  DPHA (dipentaerythritol hexaacrylate) (manufactured by NIPPON KAYAKU CO., LTD.): 30 parts by weight Irgacure 184 (product name; manufactured by: Chiba Specialty Chemicals, Inc.; radical polymerization initiator): 4 parts by weight
MIBK: 6 parts by weight Example A31

Similarly as Example A30, a hard coat film of Example A31 was produced except that the curable resin composition for the hard coat layer was applied on one side of the TAC film to have a layer thickness of the hard coat layer of 15 μm.

Example A32

Similarly as Example A30, a hard coat film of Example A32 was produced except that the curable resin composition for the hard coat layer was applied on one side of the TAC film to have a layer thickness of the hard coat layer of 20 μm.

Comparative Example A1

Similarly as Example A1, a hard coat film of Comparative example A1 was produced except that the reactive irregularly shaped silica fine particle (A) (1) was changed to a reactive silica fine particle (B) (product name: MIBK-SD; manufactured by Nissan Chemical Industries, Ltd.; average primary particle diameter: 10 nm).

Comparative Example A2

Similarly as Example A1, a hard coat film of Comparative example A2 was produced except that the reactive irregularly shaped silica fine particle (A) (1) was changed to a reactive silica fine particle (B) (product name: MIBK-SD-L; manufactured by Nissan Chemical Industries, Ltd.; average primary particle diameter: 45 nm).

Comparative Example A3

Similarly as Example A1, a hard coat film of Comparative example A3 was produced except that the reactive irregularly shaped silica fine particle (A) (1) was changed to a reactive silica fine particle (B) (product name: DP1032SIV; manufactured by JGC Catalysts and Chemicals Ltd.; average primary particle diameter: 80 nm).

Comparative Example A4

Similarly as Example A1, a hard coat film of Comparative example A4 was produced except that, in the preparation of the irregularly shaped silica fine particle in Example A1, an irregularly shaped silica fine particle of Comparative example A4 was prepared to have a silica fine particle of an average connectivity number of 50.

Comparative Example A5

(1) Preparation of Irregularly Shaped Silica Fine Particle 6,000 g of ion-exchanged water was added to 2,000 g of the silica fine particles (1) (product name: S1-550; manufactured by: JGC Catalysts and Chemicals Ltd.; average primary particle diameter: 5 nm; $SiO_2$ concentration: 20 wt %; Na in silica: 2,700 ppm), and then, 400 g of a cation-exchange resin (product name: SK-1BH; manufactured by: Mitsubishi Chemical Corporation) was added thereto followed by agitation for 1 hour for dealkalization. Next, after separating the cation-exchange resin, 400 g of an anion-exchange resin (product name: SANUPC; manufactured by: Mitsubishi Chemical Corporation) was added followed by agitation for 1 hour for deanionization. Another 400 g of the cation-exchange resin (product name: SK-1BH; manufactured by: Mitsubishi Chemical Corporation) was added thereto followed by agitation for 1 hour for dealkalization. Thus, a silica fine particle dispersion liquid having a $SiO_2$ concentration of 5 wt % was prepared. The Na content in the silica particles was 200 ppm.

Next, pH of the dispersion liquid was adjusted to pH4.0 by diluted hydrochloric acid followed by treatment in an autoclave at 200° C. for 1 hour. Then, a cation-exchange resin was added at room temperature followed by agitation for 1 hour for dealkalization. After separating the cation-exchange resin, an anion-exchange resin was added followed by agitation for 1 hour for deanionization. Thus, an irregularly shaped silica fine particle dispersion liquid having a $SiO_2$ concentration of 5 wt % was prepared. The average connectivity number of the irregularly shaped silica fine particle was 5.

Next, the $SiO_2$ concentration of the irregularly shaped silica fine particle dispersion liquid having a $SiO_2$ concentration of 5 wt % was concentrated to 10 wt %, and then, the solvent was substituted with methanol by the ultrafiltration membrane method followed by concentration into $SiO_2$ concentration of 40 wt %.

(3) Preparation of Curable Resin Composition for Hard Coat Layer

Components of the following composition were compounded to prepare a curable resin composition for a hard coat layer.
<Composition of Curable Resin Composition for Hard Coat Layer>
  Irregularly shaped silica fine particle (A) (1): 150 parts by weight (solid content: 60 parts by weight)
  DPHA (dipentaerythritol hexaacrylate) (manufactured by NIPPON KAYAKU CO., LTD.): 40 parts by weight
  Irgacure 184 (product name; manufactured by: Chiba Specialty Chemicals, Inc.; radical polymerization initiator): 4 parts by weight
  MIBK: 6 parts by weight (4) Production of Hard Coat Film As a transparent substrate film, a triacetate cellulose film (TAC film) having a layer thickness of 40 μm was used. On one side of the TAC film, the curable resin composition for the hard coat layer prepared in (2) was applied. Drying was performed at 70° C. for 60 seconds in a heat oven to evaporate a solvent in the coating layer, and ultraviolet ray was irradiated by integral exposure amount of 200 mJ/cm$^2$ to cure the coating layer. Thus, a hard coat film, a hard coat layer of which has a layer thickness of 15 μm, was produced.

Comparative Example A6

(1) Preparation of Irregularly Shaped Silica Fine Particle 6,000 g of ion-exchanged water was added to 2,000 g of the silica fine particles (7) (product name: SNOWTEX MP-2040; manufactured by Nissan Chemical Industries, Ltd.; average primary particle diameter: 200 nm), and then, 400 g of a cation-exchange resin (product name: SK-1BH; manufactured by: Mitsubishi Chemical Corporation) was added thereto followed by agitation for 1 hour for dealkalization. Next, after separating the cation-exchange resin, 400 g of an anion-exchange resin (product name: SANUPC; manufactured by: Mitsubishi Chemical Corporation) was added followed by agitation for 1 hour for deanionization. Another 400 g of the cation-exchange resin (product name: SK-1BH; manufactured by: Mitsubishi Chemical Corporation) was added thereto followed by agitation for 1 hour for dealkalization. Thus, a silica fine particle dispersion liquid having a $SiO_2$ concentration of 5 wt % was prepared. The Na content in the silica particles was 200 ppm.

Next, pH of the dispersion liquid was adjusted to pH4.0 by diluted hydrochloric acid followed by treatment in an autoclave at 200° C. for 1 hour. Then, a cation-exchange resin was added at room temperature followed by agitation for 1 hour for dealkalization. After separating the cation-exchange resin, an anion-exchange resin was added followed by agitation for 1 hour for deanionization. Thus, an irregularly shaped silica fine particle dispersion liquid having a $SiO_2$ concentration of 5 wt % was prepared. The average connectivity number of the irregularly shaped silica fine particle was 5.

Next, the $SiO_2$ concentration of the irregularly shaped silica fine particle dispersion liquid having a $SiO_2$ concentration of 5 wt % was concentrated to 10 wt %, and then, the solvent was substituted with methanol by the ultrafiltration membrane method. Thus, an irregularly shaped silica fine particle methanol dispersion liquid having a $SiO_2$ concentration of 10 wt % was prepared.

(2) Preparation of Reactive Irregularly Shaped Silica Fine Particle (A) (7)

1 part by weight of a methacrylic silane coupling agent (γ-methacryloxypropyltrimethoxysilane; product name: KBM-503; manufactured by: Shin-Etsu Chemical Co., Ltd.) was added to 93 parts by weight of the above-prepared irregularly shaped silica fine particle methanol dispersion liquid. After the whole liquid was adjusted to pH=4 with an HCl aqueous solution, heating and agitation were performed at 80° C. for 5 hours. Thus, a γ-methacryloxypropyltrimethoxysilane-treated silica fine particle in which a methacryloyl group is introduced on its surface (reactive irregularly shaped silica fine particle (A) (7)) was obtained. The solvent (methanol) of the prepared liquid was substituted to methyl isobutyl ketone (MIBK). Thus, a MIBK dispersion liquid of the reactive irregularly shaped silica fine particle (A) (7) having a solid content of 40 wt % was obtained.

(3) Preparation of Curable Resin Composition for Hard Coat Layer

Components of the following composition were compounded to prepare a curable resin composition for a hard coat layer.
<Composition of Curable Resin Composition for Hard Coat Layer>
  Reactive irregularly shaped silica fine particle (A) (7): 150 parts by weight (solid content: 60 parts by weight)
  DPHA (dipentaerythritol hexaacrylate) (manufactured by NIPPON KAYAKU CO., LTD.): 40 parts by weight
  Irgacure 184 (product name; manufactured by: Chiba Specialty Chemicals, Inc.; radical polymerization initiator): 4 parts by weight
  MIBK: 6 parts by weight (4) Production of Hard Coat Film As a transparent substrate film, a triacetate cellulose film (TAC film) having a layer thickness of 40 μm was used. On one side of the TAC film, the curable resin composition for the hard coat layer prepared in (3) was applied. Drying was performed at 70° C. for 60 seconds in a heat oven to evaporate a solvent in the coating layer, and ultraviolet ray was irradiated by integral exposure amount of 200 mJ/cm$^2$ to cure the coating layer. Thus, a hard coat film, a hard coat layer of which has a layer thickness of 15 μm, was produced.

Comparative Example A7

(1) Preparation of Irregularly Shaped Silica Fine Particle 6,000 g of ion-exchanged water was added to 2,000 g of the silica fine particles (6) (product name: SI-20P; manufactured by: JGC Catalysts and Chemicals Ltd.; average primary particle diameter: 20 nm; $SiO_2$ concentration: 20 wt %), and then, 400 g of a cation-exchange resin (product name: SK-1BH; manufactured by: Mitsubishi Chemical Corporation) was added thereto followed by agitation for 1 hour for dealkalization. Next, after separating the cation-exchange resin, 400 g of an anion-exchange resin (product name: SANUPC; manufactured by: Mitsubishi Chemical Corporation) was added followed by agitation for 1 hour for deanionization. Another 400 g of the cation-exchange resin (product name: SK-1BH; manufactured by: Mitsubishi Chemical Corporation) was added thereto followed by agitation for 1 hour for dealkalization. Thus, a silica fine particle dispersion liquid having a $SiO_2$ concentration of 5 wt % was prepared. The Na content in the silica particles was 200 ppm.

Next, pH of the dispersion liquid was adjusted to pH4.0 by diluted hydrochloric acid followed by treatment in an autoclave at 200° C. for 1 hour. Then, a cation-exchange resin was added at room temperature followed by agitation for 1 hour for dealkalization. After separating the cation-exchange resin, an anion-exchange resin was added followed by agitation for 1 hour for deanionization. Thus, an irregularly shaped silica fine particle dispersion liquid having a $SiO_2$ concentration of 5 wt % was prepared. The average connectivity number of the irregularly shaped silica fine particle was 1.5.

Next, the $SiO_2$ concentration of the irregularly shaped silica fine particle dispersion liquid having a $SiO_2$ concentration of 5 wt % was concentrated to 10 wt %, and then, the solvent was substituted with methanol by the ultrafiltration membrane method followed by concentration into a $SiO_2$ concentration of 40 wt %.

(2) Preparation of Curable Resin Composition for Hard Coat Layer

Components of the following composition were compounded to prepare a curable resin composition for a hard coat layer.
<Composition of Curable Resin Composition for Hard Coat Layer>
  Irregularly shaped silica fine particle (A) (6): 150 parts by weight (solid content: 60 parts by weight)
  DPHA (dipentaerythritol hexaacrylate) (manufactured by NIPPON KAYAKU CO., LTD.): 40 parts by weight
  Irgacure 184 (product name; manufactured by: Chiba Specialty Chemicals, Inc.; radical polymerization initiator): 4 parts by weight
  MIBK: 6 parts by weight (3) Production of Hard Coat Film As a transparent substrate film, a triacetate cellulose film (TAC film) having a layer thickness of 40 μm was used. On one side of the TAC film, the curable resin composition for the hard coat layer prepared in (2) was applied. Drying was performed at 70° C. for 60 seconds in a heat oven to evaporate a solvent in the coating layer, and ultraviolet ray was irradiated by integral exposure amount of 200 mJ/cm² to cure the coating layer. Thus, a hard coat film, a hard coat layer of which has a layer thickness of 15 μm, was produced.

Comparative Example A8

Similarly as Example A1, a hard coat film of Comparative example A8 was produced except that reactive the irregularly shaped silica fine particle (A) (1) was changed to a silica fine particle (product name: IPA-ST(L); manufactured by Nissan Chemical Industries, Ltd.; average primary particle diameter: 44 nm; colloidal silica; 30% solid content liquid).

Comparative Example A9

Similarly as Example A1, a hard coat film of Comparative example A9 was produced except that components of the following composition were compounded to prepare a curable resin composition for a hard coat layer, and the curable resin composition for the hard coat layer was applied on one side of the TAC film to have a layer thickness of the hard coat layer of 5 μm.
<Composition of Curable Resin Composition for Hard Coat Layer>
  DPHA (dipentaerythritol hexaacrylate) (manufactured by NIPPON KAYAKU CO., LTD.): 100 parts by weight
  Irgacure 184 (product name; manufactured by: Chiba Specialty Chemicals, Inc.; radical polymerization initiator): 4 parts by weight
  MIBK: 6 parts by weight Comparative Example A10

Similarly as Comparative example A9, a hard coat film of Comparative example A10 was produced except that the curable resin composition for the hard coat layer was applied on one side of the TAC film to have a layer thickness of the hard coat layer of 3 μm.

Reference Example A1

Similarly as Example A2, a hard coat film of Reference example A1 was produced except that components of the following composition were compounded to prepare a curable resin composition for a hard coat layer.
<Composition of Curable Resin Composition for Hard Coat Layer>
  Reactive irregularly shaped silica fine particle (A) (1): 50 parts by weight (solid content: 20 parts by weight)
  DPHA (dipentaerythritol hexaacrylate) (manufactured by NIPPON KAYAKU CO., LTD.): 80 parts by weight
  Irgacure 184 (product name; manufactured by: Chiba Specialty Chemicals, Inc.; radical polymerization initiator): 4 parts by weight
  MIBK: 66 parts by weight Reference Example A2

Similarly as Example A2, a hard coat film of Reference example A2 was produced except that components of the following composition were compounded to prepare a curable resin composition for a hard coat layer.
<Composition of Curable Resin Composition for Hard Coat Layer>
  Reactive irregularly shaped silica fine particle (A) (1): 200 parts by weight (solid content: 80 parts by weight)
  DPHA (dipentaerythritol hexaacrylate) (manufactured by NIPPON KAYAKU CO., LTD.): 20 parts by weight
  Irgacure 184 (product name; manufactured by: Chiba Specialty Chemicals, Inc.; radical polymerization initiator): 4 parts by weight Reference Example A3

Similarly as Example A13, a hard coat film of Reference example A3 was produced except that components of the following composition were compounded to prepare a curable resin composition for a hard coat layer, and the curable resin composition for the hard coat layer was applied on one side of the TAC film to have a layer thickness of the hard coat layer of 12 μm.
<Composition of Curable Resin Composition for Hard Coat Layer>
  Reactive irregularly shaped silica fine particle (A) (6): 50 parts by weight (solid content: 20 parts by weight)
  DPHA (dipentaerythritol hexaacrylate) (manufactured by NIPPON KAYAKU CO., LTD.): 80 parts by weight
  Irgacure 184 (product name; manufactured by: Chiba Specialty Chemicals, Inc.; radical polymerization initiator): 4 parts by weight
  MIBK: 6 parts by weight Reference Example A4

Similarly as Example A13, a hard coat film of Reference example A4 was produced except that components of the following composition were compounded to prepare a curable resin composition for a hard coat layer, and the curable resin composition for the hard coat layer was applied on one side of the TAC film to have a layer thickness of the hard coat layer of 10 μm.
<Composition of Curable Resin Composition for Hard Coat Layer>
  Reactive irregularly shaped silica fine particle (A) (6): 55 parts by weight (solid content: 22 parts by weight)
  DPHA (dipentaerythritol hexaacrylate) (manufactured by NIPPON KAYAKU CO., LTD.): 78 parts by weight
  Irgacure 184 (product name; manufactured by: Chiba Specialty Chemicals, Inc.; radical polymerization initiator): 4 parts by weight
  MIBK: 6 parts by weight Reference Example A5

Similarly as Example A13, a hard coat film of Reference example A4 was produced except that components of the following composition were compounded to prepare a curable resin composition for a hard coat layer, and the curable resin composition for the hard coat layer was applied on one side of the TAC film to have a layer thickness of the hard coat layer of 10 μm.
<Composition of Curable Resin Composition for Hard Coat Layer>
  Reactive irregularly shaped silica fine particle (A) (6): 175 parts by weight (solid content: 70 parts by weight)
  DPHA (dipentaerythritol hexaacrylate) (manufactured by NIPPON KAYAKU CO., LTD.): 30 parts by weight Irgacure 184 (product name; manufactured by: Chiba Specialty Chemicals, Inc.; radical polymerization initiator): 4 parts by weight MIBK: 6 parts by weight (Evaluation Method)

The following evaluations were performed to the above Examples, Comparative examples and Reference examples. The results are shown in Tables A1 to A3.

(1) Pencil Hardness

The pencil hardness test (pencil scratch test) defined in JIS K5600-5-4 (1999) was performed applying a load of 500 g by means of a test pencil defined in JIS-S-6006 to measure the highest hardness which causes no scratch, after conditioning the humidity of the produced hard coat film for two hours under the condition of a temperature of 25° C. and a relative humidity of 60%.

(2) Haze

The hard coat film was measured for the haze value (%) by means of a haze meter (product name: HM-150; manufactured by: Murakami Color Research Laboratory Co., Ltd.) in accordance with JIS K-7136.

o: 0.5% or less x: more than 0.5%

(3) Gloss Evaluation

The surface of the produced hard coat film was measured for the gloss value by means of a gloss meter (product name: GMX-203; manufactured by: Murakami Color Research Laboratory Co., Ltd.) under the condition of an incident angle of 60 degree. Higher number refers to higher gloss and lower number refers to lower gloss.

TABLE A1

| | Fine particle | | | | Content (wt %) | | | | |
|---|---|---|---|---|---|---|---|---|---|
| | Type | Average primary particle diameter (nm) | Average connectivity number (particles) | Binder component (C) | of fine particle to total solid content in curable resin composition | Thickness (μm) | Pencil hardness | Haze | 60° gloss |
| Example A1 | Reactive irregularly shaped silica fine particle | 5 | 3 | DPHA | 57.7 | 15 | 5H | o | 150 |
| Example A2 | Reactive irregularly shaped silica fine particle | 5 | 5 | DPHA | 57.7 | 15 | 5H | o | 150 |
| Example A3 | Reactive irregularly shaped silica fine particle | 5 | 10 | DPHA | 57.7 | 15 | 5H | o | 150 |
| Example A4 | Reactive irregularly shaped silica fine particle | 5 | 5 | UV1700B | 57.7 | 15 | 5H | o | 150 |
| Example A5 | Reactive irregularly shaped silica fine particle | 5 | 5 | PETA | 57.7 | 15 | 5H | o | 150 |
| Example A6 | Reactive irregularly shaped silica fine particle | 5 | 5 | DPHA | 57.7 | 20 | 6H | o | 150 |
| Example A7 | Reactive irregularly shaped silica fine particle | 5 | 5 | DPHA | 28.8 | 15 | 5H | o | 150 |
| Example A8 | Reactive irregularly shaped silica fine particle | 5 | 5 | DPHA | 67.3 | 15 | 5H | o | 150 |
| Example A9 | Reactive irregularly shaped silica fine particle | 20 | 5 | DPHA | 57.7 | 20 | 6H | o | 150 |
| Example A10 | Reactive irregularly shaped silica fine particle | 45 | 5 | DPHA | 57.7 | 15 | 5H | o | 150 |
| Example A11 | Reactive irregularly shaped silica fine particle | 80 | 5 | DPHA | 57.7 | 15 | 5H | o | 150 |
| Example A12 | Reactive irregularly shaped silica fine particle | 100 | 5 | DPHA | 57.7 | 15 | 5H | o | 150 |
| Example A13 | Reactive irregularly shaped silica fine particle | 20 | 3.5 | DPHA | 21.2 | 15 | 5H | o | 150 |
| Example A14 | Reactive irregularly shaped silica fine particle | 20 | 3.5 | PETA | 21.2 | 15 | 5H | o | 150 |
| Example A15 | Reactive irregularly shaped silica fine particle | 20 | 3.5 | DPHA | 21.2 | 20 | 5H | o | 150 |
| Example A16 | Reactive irregularly shaped silica fine particle | 20 | 3.5 | DPHA | 35.6 | 10 | 5H | o | 150 |
| Example A17 | Reactive irregularly shaped silica fine particle | 20 | 3.5 | DPHA | 35.6 | 12 | 5H | o | 150 |
| Example A18 | Reactive irregularly shaped silica fine particle | 20 | 3.5 | DPHA | 35.6 | 15 | 5H | o | 150 |
| Example A19 | Reactive irregularly shaped silica fine particle | 20 | 3.5 | PETA | 35.6 | 15 | 5H | o | 150 |
| Example A20 | Reactive irregularly shaped silica fine particle | 20 | 3.5 | DPHA | 35.6 | 20 | 6H | o | 150 |
| Example A21 | Reactive irregularly shaped silica fine particle | 20 | 3.5 | DPHA | 57.7 | 5 | 5H | o | 150 |
| Example A22 | Reactive irregularly shaped silica fine particle | 20 | 3.5 | DPHA | 57.7 | 7.5 | 5H | o | 150 |
| Example A23 | Reactive irregularly shaped silica fine particle | 20 | 3.5 | DPHA | 57.7 | 10 | 5H | o | 150 |
| Example A24 | Reactive irregularly shaped silica fine particle | 20 | 3.5 | DPHA | 57.7 | 12 | 6H | o | 150 |
| Example A25 | Reactive irregularly shaped silica fine particle | 20 | 3.5 | DPHA | 57.7 | 15 | 6H | o | 150 |

TABLE A1-continued

|  | Fine particle | | | | Content (wt %) of fine particle to total solid content in curable resin composition | Thickness (μm) | Pencil hardness | Haze | 60° gloss |
|---|---|---|---|---|---|---|---|---|---|
|  | Type | Average primary particle diameter (nm) | Average connectivity number (particles) | Binder component (C) |  |  |  |  |  |
| Example A26 | Reactive irregularly shaped silica fine particle | 20 | 3.5 | BEAMSET DK1 | 57.7 | 15 | 6H | ○ | 150 |
| Example A27 | Reactive irregularly shaped silica fine particle | 20 | 3.5 | UV1700B | 57.7 | 15 | 6H | ○ | 150 |
| Example A28 | Reactive irregularly shaped silica fine particle | 20 | 3.5 | DPHA | 57.7 | 20 | 6H | ○ | 150 |
| Example A29 | Reactive irregularly shaped silica fine particle | 20 | 3.5 | DPHA | 43.3 | 15 | 5H | ○ | 150 |
|  | Reactive silica fine particle | 12 | 0 |  | 14.4 |  |  |  |  |
| Example A30 | Reactive irregularly shaped silica fine particle | 20 | 3.5 | DPHA | 67.3 | 12 | 5H | ○ | 150 |
| Example A31 | Reactive irregularly shaped silica fine particle | 20 | 3.5 | DPHA | 67.3 | 15 | 6H | ○ | 150 |
| Example A32 | Reactive irregularly shaped silica fine particle | 20 | 3.5 | DPHA | 67.3 | 20 | 6H | ○ | 150 |

TABLE A2

|  | Fine particle | | | | Content (wt %) of fine particle to total solid content in curable resin composition | Thickness (μm) | Pencil hardness | Haze | 60° gloss |
|---|---|---|---|---|---|---|---|---|---|
|  | Type | Average primary particle diameter (nm) | Average connectivity number (particles) | Binder component (C) |  |  |  |  |  |
| Comp. example A1 | Reactive silica fine particle | 10 | 1 | DPHA | 57.7 | 15 | 4H | ○ | 150 |
| Comp. example A2 | Reactive silica fine particle | 45 | 1 | DPHA | 57.7 | 15 | 4H | ○ | 150 |
| Comp. example A3 | Reactive silica fine particle | 80 | 1 | DPHA | 57.7 | 15 | 4H | ○ | 150 |
| Comp. example A4 | Reactive irregularly shaped silica fine particle | 5 | 50 | DPHA | 57.7 | 15 | 5H | X | 130 |
| Comp. example A5 | Irregularly shaped silica fine particle | 5 | 5 | DPHA | 57.7 | 15 | 3H | ○ | 150 |
| Comp. example A6 | Reactive irregularly shaped silica fine particle | 200 | 5 | DPHA | 57.7 | 15 | 5H | X | 130 |
| Comp. example A7 | Irregularly shaped silica fine particle | 20 | 1.5 | DPHA | 57.7 | 15 | 3H | ○ | 150 |
| Comp. example A8 | Silica fine particle | 44 | 1 | DPHA | 57.7 | 15 | 3H | ○ | 150 |
| Comp. example A9 | — | — | — | DPHA | — | 5 | 3H | ○ | 150 |
| Comp. example A10 | — | — | — | DPHA | — | 3 | 3H | ○ | 150 |

TABLE A3

|  | Fine particle | | | | Content (wt %) of fine particle to total solid content in curable resin composition | Thickness (μm) | Pencil hardness | Haze | 60° gloss |
|---|---|---|---|---|---|---|---|---|---|
|  | Type | Average primary particle diameter (nm) | Average connectivity number (particles) | Binder component (C) |  |  |  |  |  |
| Ref. example A1 | Reactive irregularly shaped silica fine particle | 5 | 5 | DPHA | 19.2 | 15 | 4H | ○ | 150 |
| Ref. example A2 | Reactive irregularly shaped silica fine particle | 5 | 5 | DPHA | 76.9 | 15 | 4H | ○ | 150 |
| Ref. example A3 | Reactive irregularly shaped silica fine particle | 20 | 3.5 | DPHA | 19.2 | 12 | 4H | ○ | 150 |
| Ref. example A4 | Reactive irregularly shaped silica fine particle | 20 | 3.5 | DPHA | 21.2 | 10 | 4H | ○ | 150 |
| Ref. example A5 | Reactive irregularly shaped silica fine particle | 20 | 3.5 | DPHA | 67.3 | 10 | 4H | ○ | 150 |

*In Tables A1 to A3, average connectivity number of 1 means monodisperse particle; and the reactive silica fine particle means a silica particle at least a part of the surface of a silica fine particle being a core of which is covered by an organic component, and the surface of which has a reactive functional group introduced by the organic component.

Also, the relationship between the content of the reactive irregularly shaped silica fine particle with respect to the total solid content in the curable resin composition and the pencil hardness of the obtained hard coat film when the layer thickness of the hard coat layer is 10 μm and 15 μm respectively is shown in Table A4. The evaluation was performed by the pencil hardness test (a load of 500 g) defined in JIS K5600-5-4 (1999) to measure the highest hardness which causes no scratch. Further, five lines were drawn by a pencil of the hardness. Then, presence of scratches on the hard coat layer was visually observed. The hard coat layer with less than three lines of scratches among five lines passed the evaluation.

TABLE A4

| Layer thickness (μm) | Content (wt %) of fine particle with respect to total solid content in curable resin composition | | | | | |
|---|---|---|---|---|---|---|
| | 21.2 | 35.6 | 40.4 | 57.7 | 67.3 | 76.9 |
| 15 Pencil hardness | 3/5H | 4/5H | 1/6H | 4/6H | 3/6H | 2/5H |
| 10 (number of lines not causing scratch/pencil hardness) | 2/5H | 3/5H | 4/5H | 5/5H | 2/5H | 1/5H |

(Summary of Results)

As shown in Tables A1 to A3, the pencil hardness of Examples A1 to A32 containing the irregularly shaped silica fine particle having a connectivity number of 3 to 20 in the hard coat layer was 5 H or 6 H and excellent. Also, the haze value of Examples A1 to A32 was 0.5% or less and excellent.

To the contrary, the pencil hardness of Comparative examples A1 to A3 using the reactive silica fine particle having a connectivity number of 1 was 4 H, and was low compared to that of the above Examples. The pencil hardness of Comparative example A4 using the reactive irregularly shaped silica fine particle having a connectivity number of 50 was 5 H and excellent, however, the haze value was more than 0.5%. The pencil hardness of Comparative example A5 using the irregularly shaped silica fine particle having a connectivity number of 5 and not having a reactive functional group on its surface, Comparative example A7 using the irregularly shaped silica fine particle having a connectivity number of 1.5 and not having a reactive functional group on its surface, and Comparative example A8 using the silica fine particle not having a reactive functional group on its surface was 3H, and was lower than that of the above Examples. The pencil hardness of Comparative example AG using the reactive irregularly shaped silica fine particle having the reactive functional group introduced on the surface of the irregularly shaped silica fine particle constituted with five silica fine particles having an average primary particle diameter of 200 nm connected to each other was 5 H and excellent, however, the haze value was more than 0.5%.

The pencil hardness of Comparative examples A9 and A10 not containing the irregularly shaped silica fine particle in the hard coat layer was 3 H, and lower than that of the above Examples.

Example B Series

As a spherical reactive silica fine particle (B-1), MIBK-SDL (product name; manufactured by: Nissan Chemical Industries, Ltd.; average primary particle diameter: 40 nm; solid content: 30%; MIBK solvent; reactive functional group (b): a methacrylate group) was used.

As a spherical reactive silica fine particle (B-2), MIBK-SD (product name; manufactured by: Nissan Chemical Industries, Ltd.; average primary particle diameter: 12 nm; solid content: 30%; MIBK solvent; reactive functional group (b): a methacrylate group) was used.

As a spherical reactive silica fine particle (B-3), MIBK-SDZL (product name; manufactured by: Nissan Chemical Industries, Ltd.; average primary particle diameter: 80 nm; solid content: 30%; MIBK solvent; reactive functional group (b): a methacrylate group) was used.

As a spherical reactive silica fine particle (B-4), a reactive silica fine particle (average primary particle diameter: 40 nm; solid content: 30%; MIBK solvent; reactive functional group (b): an acrylate group) was used.

As a spherical reactive silica fine particle (B-5), a reactive silica fine particle (average primary particle diameter: 500 nm; solid content: 30%; MIBK solvent; reactive functional group (b): a methacrylate group) was used.

As a spherical silica fine particle, IPA-STL (product name; manufactured by: Nissan Chemical Industries, Ltd.; average primary particle diameter: 40 nm; solid content: 30%; MIBK solvent; no reactive functional group) was used.

As a reactive irregularly shaped silica fine particle (A-1), a reactive irregularly shaped silica fine particle constituted with 4 particles having an average primary particle diameter of 30 nm connected to each other by inorganic chemical bonding (average secondary particle diameter: 100 nm; solid content: 40%; MIBK solvent; reactive functional group (a): a methacrylate group) was used.

As a reactive irregularly shaped silica fine particle (A-2), a reactive irregularly shaped silica fine particle constituted with particles having an average primary particle diameter of 32 nm connected to each other by inorganic chemical bonding (average secondary particle diameter: 80 nm; solid content: 40%; MIBK solvent; reactive functional group (a): a methacrylate group) was used.

As a reactive irregularly shaped silica fine particle (A-3), a reactive irregularly shaped silica fine particle constituted with 8 particles having an average primary particle diameter of 30 nm connected to each other by inorganic chemical bonding (average secondary particle diameter: 200 nm; solid content: 40%; MIBK solvent; reactive functional group (a): a methacrylate group) was used.

As a reactive irregularly shaped silica fine particle (A-4), a reactive irregularly shaped silica fine particle constituted with 7 particles having an average primary particle diameter of 20 nm connected to each other by inorganic chemical bonding (average secondary particle diameter: 100 nm; solid content: 40%; MIBK solvent; reactive functional group (a): an acrylate group) was used.

As a reactive irregularly shaped silica fine particle (A-5), a reactive irregularly shaped silica fine particle constituted with 50 particles having an average primary particle diameter of 30 nm connected to each other by inorganic chemical bonding (average secondary particle diameter: 1,000 nm; solid content: 40%; MIBK solvent; reactive functional group (a): a methacrylate group) was used.

As an aggregate of a silica fine particle, IPA-STUP (product name; manufactured by: Nissan Chemical Industries, Ltd.; average secondary particle diameter: 100 nm; solid content: 40%; MIBK solvent; no reactive functional group) was used.

As a binder component (C-1), dipentaerythritol hexaacrylate (DPHA) manufactured by NIPPON KAYAKU CO., LTD. was used.

As a binder component (C-2), pentaerythritol triacrylate (PETA) manufactured by NIPPON KAYAKU CO., LTD. was used.

As a binder component (C-3), ultraviolet ray1700B (product name; manufactured by: Nippon Synthetic Chemical Industry Co., Ltd.) was used.

As a binder component (C-4), BS371 (product name; manufactured by: Arakawa Chemical Industries, Ltd.) was used.

As a binder component (C-5), polyfunctional methacrylate (DPMHA) manufactured by NIPPON KAYAKU CO., LTD. was used.

As a polymerization initiator, Irgacure 184 (product name; manufactured by: Chiba Specialty Chemicals, Inc.) was used.

As a leveling agent, MEGAFACE MCF350-5 (product name; manufactured by: DIC Corporation) was used.

As a transparent substrate film, a TAC film (layer thickness: 40 μm; triacetyl cellulose resin film; product name: KC4UY; manufactured by: KONICA MINOLTA OPTO, INC.) was used.

Abbreviations for the compound are as follows:
PETA: pentaerythritol triacrylate
DPHA: dipentaerythritol hexaacrylate
MIBK: methyl isobutyl ketone
IPA: isopropanol
TAC: triacetyl cellulose (Preparation of Curable Resin Composition for Hard Coat Layer)

Curable resin compositions 1 to 21 were respectively prepared by compounding components of the following composition. Table B1 shows the following: the average primary particle diameter of particle (B) contained in each curable resin composition; the average secondary particle diameter of the reactive irregularly shaped silica fine particle (A); the type of the binder component (C); the ratio of the particle (B), the reactive irregularly shaped silica fine particle (A) and the binder component (C).

(Curable Resin Composition for Hard Coat Layer 1)
Spherical reactive silica fine particle (B-1): 83 parts by weight (solid content: 25 parts by weight)
Reactive irregularly shaped silica fine particle (A-1): 63 parts by weight (solid content: 25 parts by weight)
Binder component (C-1): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 2)
Spherical reactive silica fine particle (B-2): 83 parts by weight (solid content: 25 parts by weight)
Reactive irregularly shaped silica fine particle (A-1): 63 parts by weight (solid content: 25 parts by weight)
Binder component (C-1): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 3)
Spherical reactive silica fine particle (B-3): 83 parts by weight (solid content: 25 parts by weight)
Reactive irregularly shaped silica fine particle (A-1): 63 parts by weight (solid content: 25 parts by weight)
Binder component (C-1): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 4)
Spherical reactive silica fine particle (B-1): 83 parts by weight (solid content: 25 parts by weight)
Reactive irregularly shaped silica fine particle (A-2): 63 parts by weight (solid content: 25 parts by weight)
Binder component (C-1): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 5)
Spherical reactive silica fine particle (B-1): 83 parts by weight (solid content: 25 parts by weight)
Reactive irregularly shaped silica fine particle (A-3): 63 parts by weight (solid content: 25 parts by weight)
Binder component (C-1): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 6)
Spherical reactive silica fine particle (B-1): 83 parts by weight (solid content: 25 parts by weight)
Reactive irregularly shaped silica fine particle (A-1): 63 parts by weight (solid content: 25 parts by weight)
Binder component (C-2): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 7)
Spherical reactive silica fine particle (B-1): 83 parts by weight (solid content: 25 parts by weight)
Reactive irregularly shaped silica fine particle (A-1): 63 parts by weight (solid content: 25 parts by weight)
Binder component (C-3): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 8)
Spherical reactive silica fine particle (B-1): 83 parts by weight (solid content: 25 parts by weight)
Reactive irregularly shaped silica fine particle (A-1): 63 parts by weight (solid content: 25 parts by weight)
Binder component (C-4): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 9)
Spherical reactive silica fine particle (B-4): 83 parts by weight (solid content: 25 parts by weight)
Reactive irregularly shaped silica fine particle (A-4): 63 parts by weight (solid content: 25 parts by weight)
Binder component (C-1): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 10)
Spherical reactive silica fine particle (B-1): 83 parts by weight (solid content: 25 parts by weight)
Reactive irregularly shaped silica fine particle (A-1): 63 parts by weight (solid content: 25 parts by weight)
Binder component (C-5): 50 parts by weight
Irgacure 184: 4 parts by weight MEGAFACE MCF350-5: 0.2 parts by weight (solid content)
MIBK: 54 parts by weight (Curable Resin Composition for Hard Coat Layer 11)
Spherical reactive silica fine particle (B-1): 117 parts by weight (solid content 35 parts by weight)
Reactive irregularly shaped silica fine particle (A-1): 88 parts by weight (solid content: 35 parts by weight)
Binder component (C-1): 30 parts by weight
Irgacure 184:4 parts by weight
MEGAFACE MCF350-5: 0.2 parts by weight (solid content)
MIBK: 54 parts by weight (Curable Resin Composition for Hard Coat Layer 12)
Spherical reactive silica fine particle (B-1): 67 parts by weight (solid content: 20 parts by weight)
Reactive irregularly shaped silica fine particle (A-1): 50 parts by weight (solid content: 20 parts by weight)
Binder component (C-1): 60 parts by weight
Irgacure 184: 4 parts by weight
MEGAFACE MCF350-5: 0.2 parts by weight (solid content)
MIBK: 54 parts by weight (Curable Resin Composition for Hard Coat Layer 13)
Spherical reactive silica fine particle (B-1): 133 parts by weight (solid content: 40 parts by weight)
Reactive irregularly shaped silica fine particle (A-1): 25 parts by weight (solid content: 10 parts by weight)
Binder component (C-1): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 14)
Spherical reactive silica fine particle (B-1): 33 parts by weight (solid content: 10 parts by weight)
Reactive irregularly shaped silica fine particle (A-1): 100 parts by weight (solid content: 40 parts by weight)
Binder component (C-1): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 15)
Spherical reactive silica fine particle (B-1): 166 parts by weight (solid content: 50 parts by weight)
Binder component (C-1): 50 parts by weight
Irgacure 184: 4 parts by weight
MEGAFACE MCF350-5: 0.2 parts by weight (solid content)

(Curable Resin Composition for Hard Coat Layer 16)
Spherical reactive silica fine particle (B-1): 166 parts by weight (solid content: 50 parts by weight)
Reactive irregularly shaped silica fine particle (A-1): 125 parts by weight (solid content: 50 parts by weight)
Irgacure 184: 4 parts by weight
MEGAFACE MCF350-5: 0.2 parts by weight (solid content)

(Curable Resin Composition for Hard Coat Layer 17)
Spherical silica fine particle: 83 parts by weight (solid content: 25 parts by weight)
Reactive irregularly shaped silica fine particle (A-1): 63 parts by weight (solid content: 25 parts by weight)
Binder component (C-1): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 18)
Spherical reactive silica fine particle (B-1): 83 parts by weight (solid content: 25 parts by weight)
Aggregate: 63 parts by weight (solid content: 25 parts by weight)
Binder component (C-1): 50 parts by weight
Irgacure 184: 4 parts by weight
MEGAFACE MCF350-5: 0.2 parts by weight (solid content)
MIBK: 54 parts by weight (Curable Resin Composition for a Hard Coat Layer 19)
Spherical reactive silica fine particle (B-5):83 parts by weight (solid content: 25 parts by weight)
Reactive irregularly shaped silica fine particle (A-1): 63 parts by weight (solid content: 25 parts by weight)
Binder component (C-1): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 20)
Spherical reactive silica fine particle (B-1): 83 parts by weight (solid content: 25 parts by weight)
Reactive irregularly shaped silica fine particle (A-5): 63 parts by weight (solid content: 25 parts by weight)
Binder component (C-1): 50 parts by weight
Irgacure 184: 4 parts by weight
MEGAFACE MCF350-5: 0.2 parts by weight (solid content)
MIBK: 54 parts by weight (Curable Resin Composition for Hard Coat Layer 21)
Spherical reactive silica fine particle (B-1): 150 parts by weight (solid content: 45 parts by weight)
Reactive irregularly shaped silica fine particle (A-1): 113 parts by weight (solid content: 45 parts by weight)
Binder component (C-1): 10 parts by weight
Irgacure 184: 4 parts by weight
MEGAFACE MCF350-5: 0.2 parts by weight (solid content)

(Curable Resin Composition for Hard Coat Layer 22)
Spherical reactive silica fine particle (B-1): 17 parts by weight (solid content: 5 parts by weight)
Reactive irregularly shaped silica fine particle (A-1): 13 parts by weight (solid content: 5 parts by weight)
Binder component (C-1): 90 parts by weight
Irgacure 184: 4 parts by weight
MEGAFACE MCF350-5: 0.2 parts by weight (solid content)
MIBK: 120 parts by weight

TABLE B1

| | Curable resin composition for hard coat layer | Spherical reactive silica fine particle (B) | | Reactive irregularly shaped silica fine particle (A) | |
|---|---|---|---|---|---|
| | | Average primary particle diameter (nm) | Reactive functional group (b)* | Average primary particle dameter (nm) | Average secondary particle diameter (nm) |
| Example B1 | 1 | 40 | M | 30 | 100 |
| Example B2 | 2 | 12 | M | 30 | 100 |
| Example B3 | 3 | 80 | M | 30 | 100 |
| Example B4 | 4 | 40 | M | 20 | 80 |
| Example B5 | 5 | 40 | M | 30 | 200 |
| Example B6 | 6 | 40 | M | 30 | 100 |
| Example B7 | 7 | 40 | M | 30 | 100 |
| Example B8 | 8 | 40 | M | 30 | 100 |
| Example B9 | 9 | 40 | A | 20 | 100 |
| Example B10 | 10 | 40 | M | 30 | 100 |
| Example B11 | 11 | 40 | M | 30 | 100 |
| Example B12 | 12 | 40 | M | 30 | 100 |
| Example B13 | 13 | 40 | M | 30 | 100 |
| Example B14 | 14 | 40 | M | 30 | 100 |
| Example B15 | 1 | 40 | M | 30 | 100 |
| Example B16 | 1 | 40 | M | 30 | 100 |
| Example B17 | 1 | 40 | M | 30 | 100 |
| Example B18 | 1 | 40 | M | 30 | 100 |
| Comp. example B1 | 15 | 40 | M | — | — |
| Comp. example B2 | 16 | 40 | M | 30 | 100 |
| Comp. example B3 | 17 | 40 | None | 30 | 100 |
| Comp. example B4 | 18 | 40 | M | — | 100 |
| Comp. example B5 | 19 | 500 | M | 30 | 100 |
| Comp. example B6 | 20 | 40 | M | 30 | 1000 |
| Comp. example B7 | 1 | 40 | M | 30 | 100 |
| Ref. example B1 | 21 | 40 | M | 30 | 100 |
| Ref. example B2 | 22 | 40 | M | 30 | 100 |

| | Reactive irregularly shaped silica fine particle (A) | Binder component (C) | | Total amount (wt %) of (A) and (B) with respect to total solid content in curable resin composition |
|---|---|---|---|---|
| | Reactive functional group (a)* | Type | Reactive functional group (c)* | |
| Example B1 | M | DPHA | A | 47.9 |
| Example B2 | M | DPHA | A | 47.9 |
| Example B3 | M | DPHA | A | 47.9 |
| Example B4 | M | DPHA | A | 47.9 |
| Example B5 | M | DPHA | A | 47.9 |
| Example B6 | M | PETA | A | 47.9 |
| Example B7 | M | UV1700B | A | 47.9 |
| Example B8 | M | BS371 | A | 47.9 |
| Example B9 | A | DPHA | A | 47.9 |
| Example B10 | M | DPMHA | M | 47.9 |
| Example B11 | M | DPHA | A | 67.2 |
| Example B12 | M | DPHA | A | 38.4 |
| Example B13 | M | DPHA | A | 47.9 |
| Example B14 | M | DPHA | A | 47.9 |
| Example B15 | M | DPHA | A | 47.9 |
| Example B16 | M | DPHA | A | 47.9 |
| Example B17 | M | DPHA | A | 47.9 |
| Example B18 | M | DPHA | A | 47.9 |
| Comp. example B1 | — | DPHA | A | 47.9 |
| Comp. example B2 | M | — | — | 96.0 |
| Comp. example B3 | M | DPHA | A | 47.9 |
| Comp. example B4 | None | DPHA | A | 47.9 |
| Comp. example B5 | M | DPHA | A | 47.9 |
| Comp. example B6 | M | DPHA | A | 47.9 |
| Comp. example B7 | M | DPHA | A | 47.9 |
| Ref. example B1 | M | DPHA | A | 86.4 |
| Ref. example B2 | M | DPHA | A | 9.6 |

*In a reactive functional group, M means methacrylate and A means acrylate.

Example B1

Production of Hard Coat Film

On one side of a TAC film, the curable resin composition for the hard coat layer 1 was applied. Drying was performed at 70° C. for 60 seconds in a heat oven to evaporate a solvent in the coating layer, and ultraviolet ray was irradiated by integral exposure amount of 200 mJ/cm² to cure the coating layer. Thus, a hard coat film of Example B1, a hard coat layer of which has a layer thickness of 15 μm and a projection height of 10 nm, was produced.

Examples B2 to B14

Similarly as Example B1, hard coat films of Examples B2 to B14 were respectively produced except that the composition of the curable resin composition for the hard coat layer 1 was change to those shown in Table 1.

Examples B15 and B16

Similarly as Example B1, hard coat films of Examples B15 and B16 were respectively produced except that the projection height was changed to those shown in Table B1.

Examples B17 and B18

Similarly as Example B1, hard coat films of Examples B17 and B18 were respectively produced except that the layer thickness was changed to those shown in Table B1.

Comparative Examples B1 to B6

Similarly as Example B1, hard coat films of Comparative examples B1 to B6 were respectively produced except that the composition of the curable resin composition for the hard coat layer 1 was change to those shown in Table B1.

Comparative Example B7

Similarly as Example B1, a hard coat film of Comparative example B7 was produced except that the projection height was changed to 70 nm.

Reference Examples B1 and B2

Similarly as Example B1, hard coat films of Reference examples B1 to B2 were respectively produced except that the composition of the curable resin composition for the hard coat layer 1 was change to those shown in Table B1.

(Evaluation of Hard Coat Film)

The pencil hardness, steel wool resistance, haze and gloss value of the hard coat films produced in Examples B1 to B18, Comparative examples B1 to B7 and Reference examples B1 and B2 were evaluated as below. The results are shown in Table B2.

(Evaluation: Pencil Hardness)

The pencil hardness test (pencil scratch test) defined in JIS K5600-5-4 (1999) was performed applying a load of 4.9 N by means of a test pencil defined in JIS-S-6006 to evaluate the highest pencil hardness which causes no scratch, after conditioning the humidity of the produced hard coat film for two hours under the condition of a temperature of 25° C. and a relative humidity of 60%.

(Evaluation: Steel Wool Resistance)

The produced hard coat film was fractioned with #0000 steel wool applying a load of 500 g/cm² for 10 trips at a speed of 100 mm/sec. Then, presence of scratch was visually observed, and evaluated according to the following criteria.
  o: there was no scratch
  x: there was a scratch (Evaluation: Haze)

The produced hard coat film was measured for the haze value (%) by means of a haze meter (product name: HM-150; manufactured by: Murakami Color Research Laboratory Co., Ltd.) in accordance with JIS K-7136.
  o: 1.0% or less
  x: more than 1.0%

(Evaluation: Gloss)

The surface of the produced hard coat film was measured for the gloss value by means of a gloss meter (product name: GMX-203; manufactured by: Murakami Color Research Laboratory Co., Ltd.) under the condition of an incident angle of 60 degree. Higher number refers to higher gloss and lower number refers to lower gloss.

TABLE B2

| | Height of projection (nm) | Thickness (μm) | Pencil hardness | SW resistance | Haze | 60° gloss |
|---|---|---|---|---|---|---|
| Example B1 | 10 | 15 | 5H | o | o | 150 |
| Example B2 | 10 | 15 | 5H | o | o | 150 |
| Example B3 | 10 | 15 | 5H | o | o | 150 |
| Example B4 | 10 | 15 | 5H | o | o | 150 |
| Example B5 | 10 | 15 | 5H | o | o | 150 |
| Example B6 | 10 | 15 | 5H | o | o | 150 |
| Example B7 | 10 | 15 | 5H | o | o | 150 |
| Example B8 | 10 | 15 | 5H | o | o | 150 |
| Example B9 | 10 | 15 | 5H | o | o | 150 |
| Example B10 | 10 | 15 | 5H | o | o | 150 |
| Example B11 | 10 | 15 | 5H | o | o | 150 |
| Example B12 | 10 | 15 | 5H | o | o | 150 |
| Example B13 | 10 | 15 | 5H | o | o | 150 |
| Example B14 | 10 | 15 | 5H | o | o | 150 |
| Example B15 | 2 | 15 | 5H | o | o | 150 |
| Example B16 | 40 | 15 | 5H | o | o | 150 |
| Example B17 | 10 | 10 | 5H | o | o | 150 |
| Example B18 | 10 | 20 | 6H | o | o | 150 |
| Comp. example B1 | 10 | 15 | 4H | o | o | 150 |
| Comp. example B2 | 10 | 15 | H | x | x | 130 |
| Comp. example B3 | 10 | 15 | 3H | x | o | 150 |
| Comp. example B4 | 10 | 15 | 3H | x | o | 150 |
| Comp. example B5 | 10 | 15 | 4H | x | x | 150 |
| Comp. example B6 | 10 | 15 | 5H | x | x | 130 |
| Comp. example B7 | 70 | 15 | 4H | x | o | 150 |
| Ref. example B1 | 10 | 15 | 2H | x | x | 150 |
| Ref. example B2 | 10 | 15 | 2H | o | o | 150 |

Table B2 shows that the hard coat films of Examples B1 to B18 were excellent in pencil hardness, steel wool resistance and haze.

However, the pencil hardness of Comparative example B1 containing no reactive irregularly shaped silica fine particle (A) was low by 4 H.

The pencil hardness of Comparative example B3 containing no binder component (C) was H, which is low, and the steel wool resistance and haze were inferior.

The pencil hardness of each of Comparative example B2 using the spherical silica fine particle having no reactive functional group instead of the spherical reactive silica fine particle (B) and Comparative example B4 using the aggregate having no reactive functional group instead of the reactive irregularly shaped silica fine particle (A) was low by 3 H, and the steel wool resistance was inferior due to insufficient crosslinking.

The steel wool resistance and haze of each of Comparative example B5 using the spherical reactive silica fine particle (B) having a large average primary particle diameter and Comparative example B6 using the reactive irregularly shaped silica fine particle (A) having a large average secondary particle diameter were inferior.

The pencil hardness of Comparative example B7 having high projection height as 70 nm was low by 4 H, and the steel wool resistance was inferior.

The pencil hardness of Reference example B1, the total amount of the reactive silica fine particle (B) and the reactive irregularly shaped silica fine particle (A) in the curable resin composition exceeding 70 wt %, was low, and the steel wool resistance and haze were inferior. The pencil hardness of Reference example B2, the total amount of the reactive silica fine particle (B) and the reactive irregularly shaped silica fine particle (A) in the curable resin composition being less than 30 wt %, was low.

The invention claimed is:

1. A hard coat film having a hard coat layer which is provided on one side of a transparent substrate film,
wherein the hard coat layer is a cured product of a curable resin composition for the hard coat layer comprising a reactive silica fine particle (B) and a reactive irregularly shaped silica fine particle (A) constituted with 3 to 20 silica fine particles having an average primary particle diameter of 20 to 30 nm connected to each other by inorganic chemical bonding and having a reactive functional group (a) introduced by a silane coupling agent comprising one or more selected from the group consisting of 3-methacryloxypropyltriethoxysilane, 3-acryloxypropyltriethoxysilane, 3-methacryloxypropyltrimethoxysilane, and 3-acryloxypropyltrimethoxysilane on its surface, and a binder component (C) having a reactive functional group (c) having cross-linking reactivity with the reactive functional group (a), said reactive functional group (a) and said reactive functional group (c) being ethylenically unsaturated bonds, each of said reactive functional groups (a) and (c) having cross-linking reactivity with each other,
wherein an irregularly shaped silica fine particle, which is at least a part of the reactive irregularly shaped silica fine particles (A) cross-linked to the binder component (C), is contained in the hard coat layer,
wherein a layer thickness of the hard coat layer is 5 µm or more and 15 µm or less;
wherein the reactive irregularly shaped silica fine particles (A) and aggregates thereof are uniformly distributed in the hard coat layer;
wherein a content of the reactive irregularly shaped silica fine particle (A) is in a range of 20 to 70 wt % with respect to a total solid content of the curable resin composition for the hard coat layer;" has been deleted and replaced by "and the reactive silica fine particle (B) is in a range of 20 to 70 wt % with respect to the total weight of the hard coat layer and the content of the irregularly shaped silica particle is 50% or more with respect to a total weight of the irregularly shaped silica particle and the silica fine particle (B); is in a range of 20 to 70 wt % with respect to a total solid content of the curable resin composition for the hard coat layer; and
wherein, when the layer thickness of the hard coat layer is 5 µm or more and 10 µm or less, the content of the reactive irregularly shaped silica fine particle (A) is in a range of 35 to 65 wt % with respect to the total solid content of the curable resin composition for the hard coat layer, or
wherein, when the layer thickness of the hard coat layer is more than 10 µm and 15 µm or less, the content of the reactive irregularly shaped silica fine particle (A) is in a range of 20 to 70 wt % with respect to the total solid content of the curable resin composition for the hard coat layer, wherein hardness of the hard coat layer when a pencil hardness test in accordance with JIS K5600-5-4(1999) is performed with a load of 500 g or 4.9 N is 5H or more.

* * * * *